United States Patent
Doss et al.

(12) 
(10) Patent No.: US 6,389,013 B1
(45) Date of Patent: May 14, 2002

(54) OC3 DELIVERY UNIT; LOW LEVEL MAINTENANCE BUS

(75) Inventors: Dwight W. Doss, Richardson; Raymond L. Hogg, Wylie; David W. Wynn, Garland; Michael K. Blanchard, Plano; Byron T. Butterfield; David C. Cummings, both of Richardson, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/052,699

(22) Filed: Mar. 31, 1998

(51) Int. Cl.[7] .......................... H04L 12/50; H04Q 11/00
(52) U.S. Cl. .................. 370/364; 370/419; 370/225
(58) Field of Search ................... 370/384, 357, 370/359, 360, 362, 363, 364, 386, 387, 388, 389, 392, 398, 419, 422, 428, 429, 257, 220, 225

(56) References Cited

U.S. PATENT DOCUMENTS

| | | | | |
|---|---|---|---|---|
| 4,628,504 A | * | 12/1986 | Brown | 370/458 |
| 4,947,459 A | * | 8/1990 | Nelson et al. | 455/612 |
| 5,526,344 A | * | 6/1996 | Diaz et al. | 370/364 |
| 5,526,349 A | * | 6/1996 | Diaz et al. | 370/392 |
| 5,555,244 A | * | 9/1996 | Gupta et al. | 370/397 |
| 5,566,169 A | * | 10/1996 | Rangan et al. | 370/366 |
| 5,809,021 A | * | 9/1998 | Diaz et al. | 370/364 |
| 5,838,677 A | * | 11/1998 | Koizaki et al. | 370/389 |
| 5,970,072 A | * | 10/1999 | Gammenthaler et al. | 370/537 |
| 6,002,689 A | * | 12/1999 | Christie et al. | 370/401 |
| 6,175,565 B1 | * | 1/2001 | McKinnon et al. | 370/354 |

* cited by examiner

*Primary Examiner*—David R. Vincent
*Assistant Examiner*—Bob A. Phunkulh
(74) *Attorney, Agent, or Firm*—Baker Botts L.L.P.

(57) ABSTRACT

A method of providing a back up communications link for control messages within a delivery unit. The primary means of transport for both network data and control data within the delivery unit is by means of ingress and egress buses between application modules of the delivery unit. However, control messages from a unit controller can also be delivered by means of a separate link, typically to a bus control module.

9 Claims, 28 Drawing Sheets

| | | | | |
|---|---|---|---|---|
| WORD 1 | FRAMING PATTERN (15 BITS) | | | FRM PAR |
| WORD 2 | ADD PAR | DEVICE ADDRESS (10 BITS, 5 BIT ADDRESS DUPLICATED) | COMMAND CODE (4 BITS) | CMD PAR |
| WORD 3 | SW MESSAGE DATA | | | MSG PAR |
| ⋮ | | | | |
| WORD 14 | SW MESSAGE DATA | | | MSG PAR |
| WORD 15 | SW MESSAGE DATA | FRAME COUNT (7 BITS) | | CNT PAR |
| WORD 16 | HEADER LRC (16 BITS) | | | |

*FIG. 4*  40

|◄——————— 125 MICROSECONDS ———————►|
| FRAME HEADER (32 BYTES) | PAD (8 BYTES) | DATAGRAM SLOT #1 (64 BYTES) | DATAGRAM SLOT #2 (64 BYTES) | ⋯ | DATAGRAM SLOT #50 (64 BYTES) |

*FIG. 5*  50

|◄——————— 125 MICROSECONDS ———————►|
| FRAME HEADER (32 BYTES) | DATAGRAM SLOT #1 (64 BYTES) | DATAGRAM SLOT #2 (64 BYTES) | ⋯ | DATAGRAM SLOT #202 (64 BYTES) |

*FIG. 6*  60

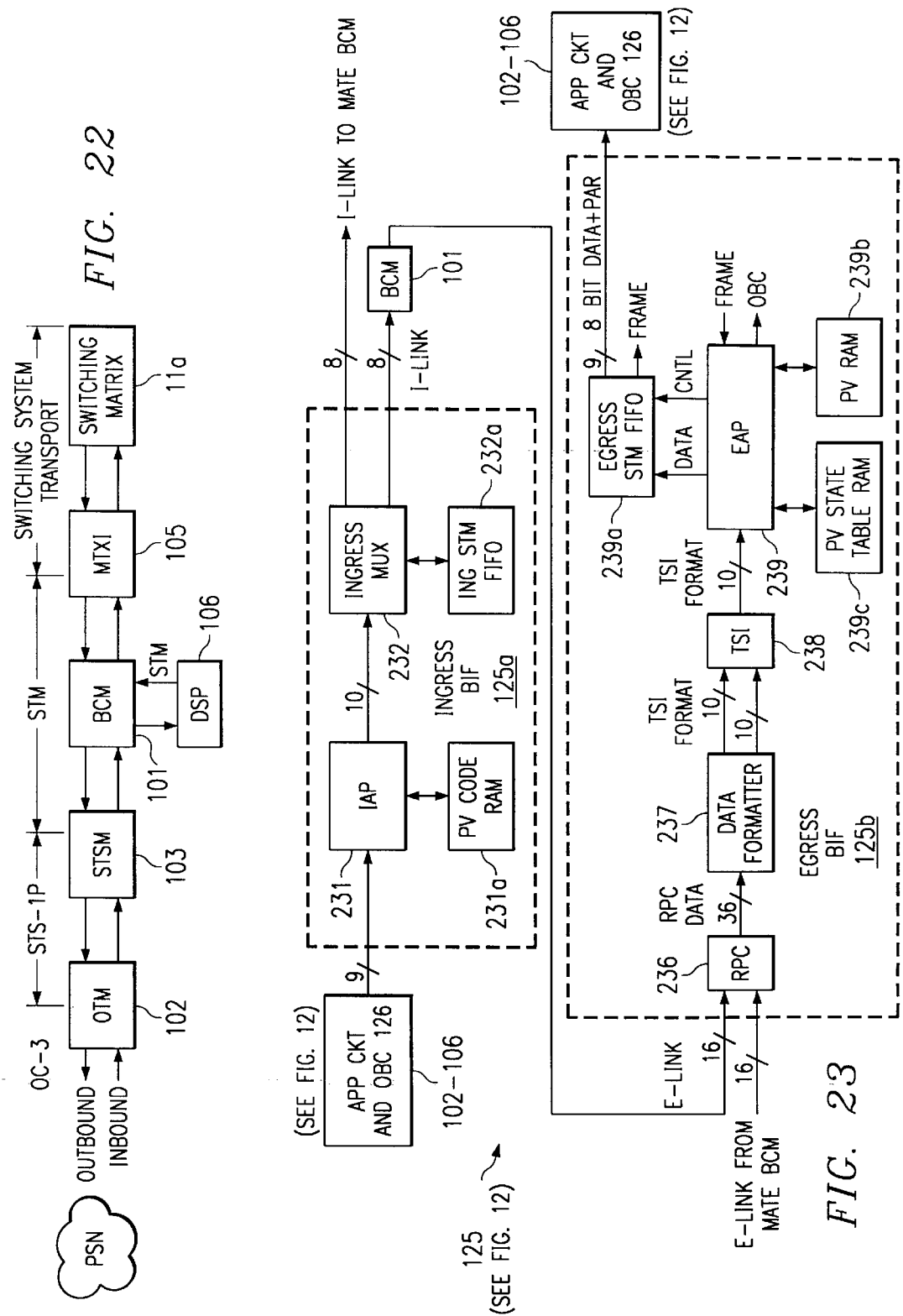

| STM SLOT | SPP | SSP | IPP | ISP | STM AUTO | iPL AUTO | A/B | STM FIFO | iPL FIFO |
|---|---|---|---|---|---|---|---|---|---|
| YES | YES | X | X | X | X | X | SPP | YES | NO |
| YES | NO | YES | X | X | YES | X | SSP | YES | NO |
| YES | NO | X | YES | X | NO | X | SPP IPP | YES | YES |
| YES | NO | X | NO | YES | NO | YES | SPP ISP | YES | YES |
| YES | NO | X | NO | NO | NO | YES | SPP | YES | NO |
| YES | NO | X | NO | X | NO | NO | SPP | YES | NO |
| YES | NO | NO | YES | X | YES | X | SPP IPP | YES | YES |
| YES | NO | NO | NO | YES | YES | YES | SPP ISP | YES | YES |
| YES | NO | NO | NO | NO | YES | YES | SPP | YES | NO |
| YES | NO | NO | NO | X | YES | NO | SPP | YES | NO |
| NO | X | X | YES | X | X | X | IPP | NO | YES |
| NO | X | X | NO | YES | X | YES | ISP | NO | YES |
| NO | X | X | NO | NO | X | YES | NONE | NO | NO |
| NO | X | X | NO | X | X | NO | NONE | NO | NO |

*FIG. 25A*

| COLUMN | YES | NO |
|---|---|---|
| STM SLOT | THE STM BIT IS SET IN THE STM TABLE | THE STM BIT IS NOT SET IN THE STM TABLE |
| SPP | FOR THE PREFERRED STM PLANE: THE PTI FIELD INDICATES STM AND NO ERRORS ARE REGISTERED (BUS SLOT OR CRC). | FOR THE PREFERRED STM PLANE: THE PTI FIELD DOES NOT INDICATE STM OR A BUS SLOT OR CRC ERROR IS BEING REGISTERED. |
| SSP | FOR THE STANDBY STM PLANE: THE PTI FIELD INDICATES STM AND NO ERRORS ARE REGISTERED (BUS SLOT OR CRC). | FOR THE STANDBY STM PLANE: THE PTI FIELD DOES NOT INDICATE STM OR A BUS SLOT OR CRC ERROR IS BEING REGISTERED. |
| IPP | FOR THE PREFERRED iPL PLANE: THE PTI FIELD INDICATES iPL, THE iPL ADDRESS IS LOCAL AND NO CRC ERROR IS REGISTERED | FOR THE PREFERRED iPL PLANE: THE PTI FIELD DOES NOT INDICATE iPL OR THE iPL ADDRESS IN NOT LOCAL OR A CRC ERROR IS BEING REGISTERED. |
| ISP | FOR THE STANDBY iPL PLANE: THE PTI FIELD INDICATES iPL, THE iPL ADDRESS IS LOCAL AND NO CRC ERROR IS REGISTERED | FOR THE STANDBY iPL PLANE: THE PTI FIELD DOES NOT INDICATE iPL OR THE iPL ADDRESS IN NOT LOCAL OR A CRC ERROR IS BEING REGISTERED. |
| STM AUTO | THE STM PLANE SELECTION MODE BIT IN THE STM TABLE IS SET TO ENABLE AUTOMATIC PLANE SWITCHING | THE STM PLANE SELECTION MODE BIT IN THE STM TABLE IS NOT SET TO ENABLE AUTOMATIC PLANE SWITCHING |
| iPL AUTO | THE iPL PLANE SELECTION MODE BIT IN THE RPC CONTROL REG IS SET TO ENABLE AUTOMATIC PLANE SWITCHING | THE iPL PLANE SELECTION MODE BIT IN THE RPC CONTROL REG IS NOT SET TO ENABLE AUTOMATIC PLANE SWITCHING |

*FIG. 25B*

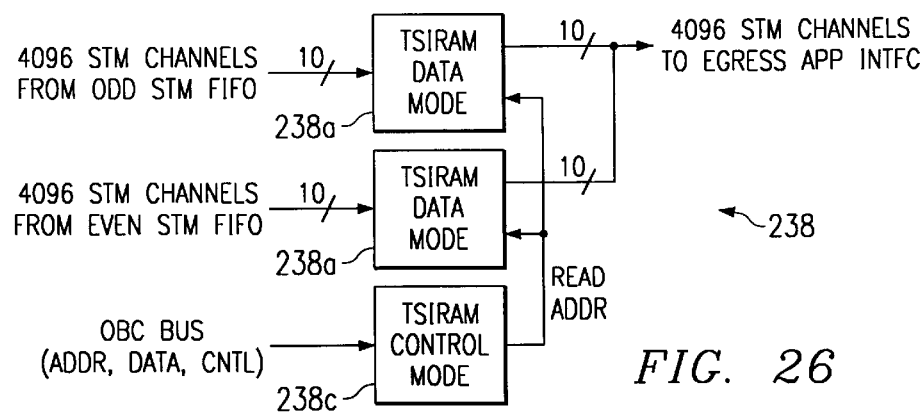

*FIG. 26*

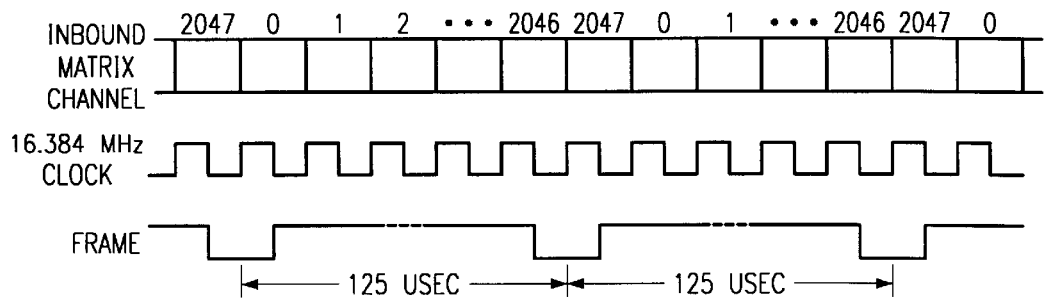
FIG. 31G
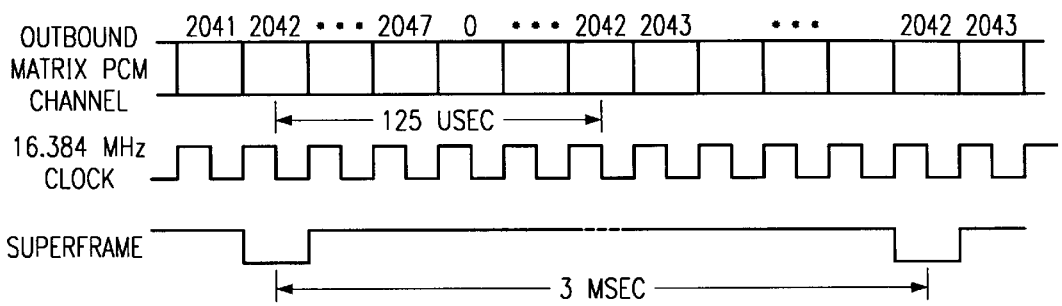
FIG. 31H
FIG. 32
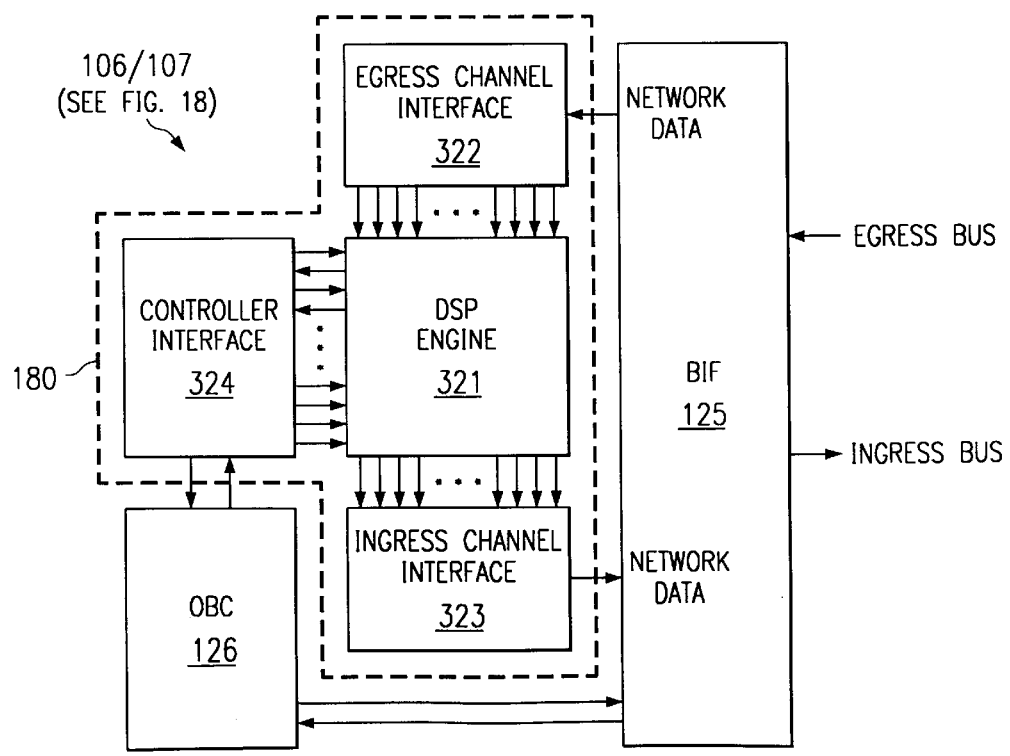

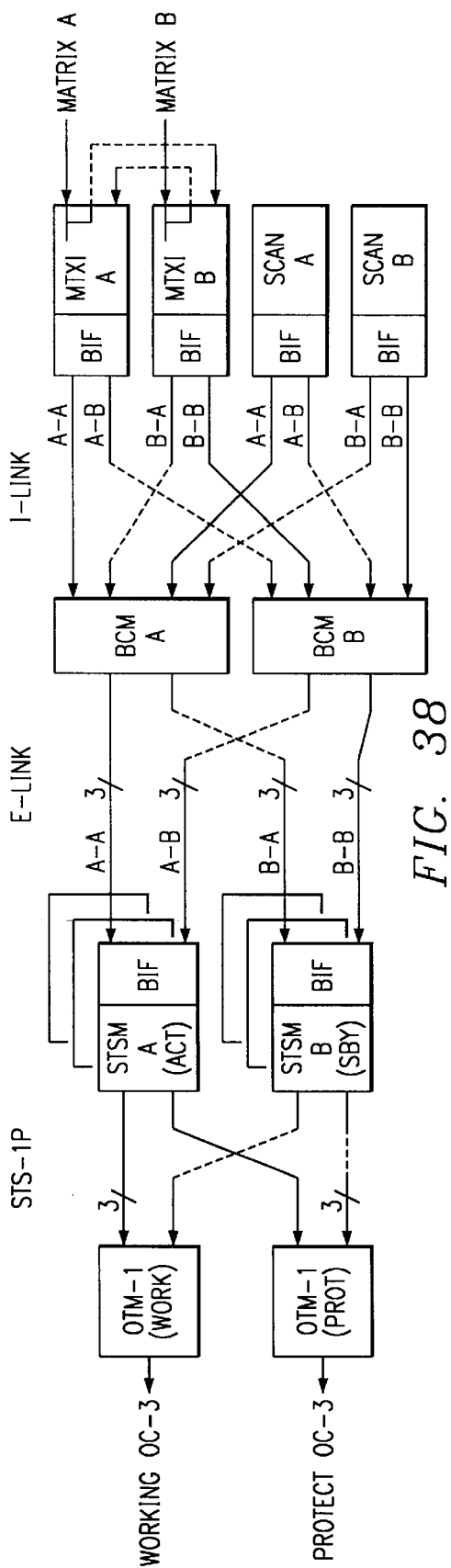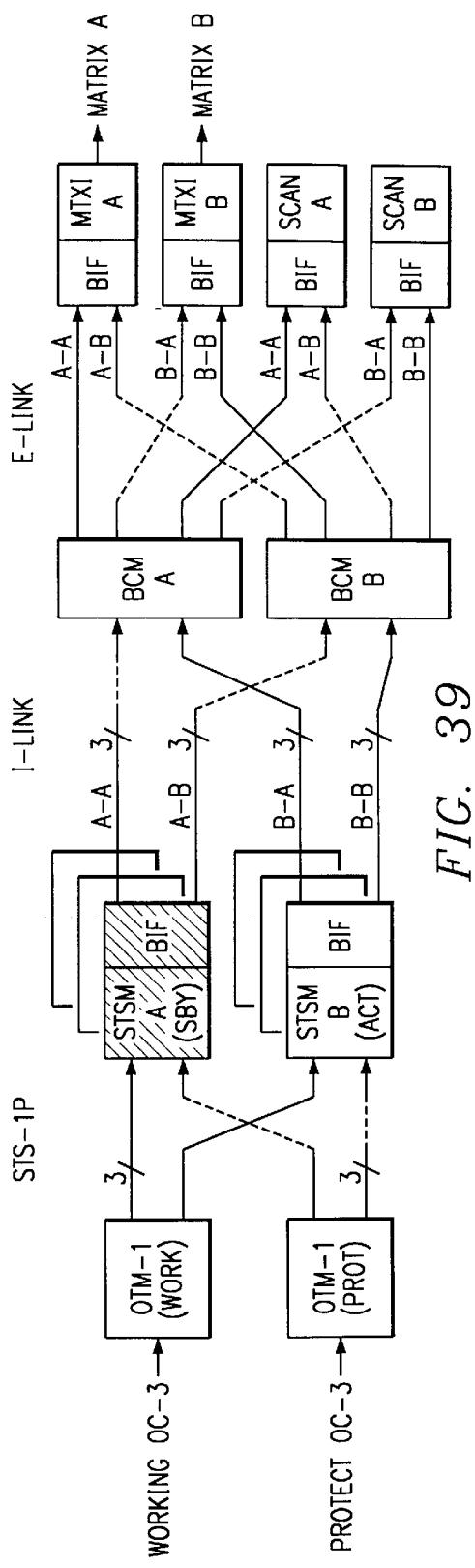

OC3 DELIVERY UNIT; LOW LEVEL MAINTENANCE BUS

TECHNICAL FIELD OF THE INVENTION

The present invention relates generally to telephone networks, and more particularly to an interface between fiber optic transport media and a switching system designed for electrical signals.

BACKGROUND OF THE INVENTION

As multimedia applications increase the demand for high-bandwidth, high-bit-rate communications, fiber optics technology is rapidly advancing to supply the capacity. A family of standards for optical fiber transmissions is known as the Synchronous Optical Network (SONET) standards. SONET was born as an extension to the DS1 hierarchy, which is a hierarchy of "electrical" as opposed to "optical" signals and consists of levels of signals formed by multiplexing lower level TDM (time division multiplex) signals.

The SONET standard establishes a multiplexing format for using any number of 51.84 Mbits/s signals as building blocks. An OC-3 (Optical Carrier, Level 3) is a 155.52 Mbits/s signal (3×51.84 Mbits/s), and its electrical signal counterpart is referred to as an STS-1 signal. The STS-1 signal carries a DS3 signal or a number of DS1 or other lower level signals. A SONET STS-3 signal is created by concatenating STS-1 signals. Each SONET STS-N electrical signal has a corresponding OC-N "optical signal". The OC-N signals are created by converting the STS-N electrical signal to an optical signal.

Although optical switching techniques have been developed, telecom companies are eager to provide as much performance as possible from their existing infrastructure. Switching systems based on the DS1 electrical signal hierarchy are in place and continue to be used for signals carrying that type of signal. Essentially these switching systems use DS0 data, which is derived from the DS1 hierarchy. For example, a DS1 signal is comprised of 24 multiplexed DS0 voice channels. Thus, there is a demand for interfaces that will permit SONET signals to be switched through switching systems designed for the DS1 hierarchy of signals.

SUMMARY OF THE INVENTION

One aspect of the invention is a method of transporting data in a delivery unit that interfaces telecommunications media that carries network data to a switching system that switches network data channels. The primary transport is performed by transporting network data between application modules of said delivery unit by means of ingress and egress buses to and from a bus control module, said ingress and egress buses carrying both control data and network data. However, an alternate transport means is also available for control data, and is accomplished by the following steps: originating a control message at a unit controller module of the delivery unit; establishing a maintenance communications link between the unit controller module and the bus control module that is separate from the ingress and egress buses, and delivering the control message to said bus control module via this maintenance communications link.

An advantage of the invention is that if there is a failure in the transport paths to the bus control module, it may nevertheless receive control messages. It can be reset or receive other messages for handling fault detection and recovery.

BRIEF DESCRIPTION OF THE DRAWINGS

FIG. 4 illustrates the header format for an SBB-LS frame.

FIG. 5 illustrates the format of an ingress bus frame.

FIG. 6 illustrates the format of an egress bus frame.

FIGS. 21 and 22 illustrate the transport of public switched network (PSN) data between the modules of delivery unit.

FIG. 23 illustrates network data transport between the BCM and application modules that handle STM network data.

FIGS. 25A and 25B illustrate the RPC discriminator function.

FIG. 26 is a block diagram of the TSI (time slot interchange) of the egress BIF of FIG. 23.

FIG. 31G illustrates inbound timing for MTXI transport.

FIG. 31H illustrates outbound timing for MTXI transport.

FIGS. 32 and 33 illustrates network data transport within the DSPs.

FIGS. 37 and 38 illustrate redundancy within the delivery unit and the associated interconnections, inbound and outbound, respectively.

FIGS. 39 and 40 illustrate an example of transport connnections after a failure of a copy of an STSM, inbound and outbound, respectively.

DETAILED DESCRIPTION OF THE INVENTION

Contents of Description

1. Distributed Switching System Overview
2. Delivery Unit Architecture; Frames, Shelves, Backplanes, Cards, and Redundancy
3. Delivery Unit Data Transport Overview
4. Delivery Unit Timing and Synchronization Overview
5. Data Transport Formats
6. Delivery Unit Modules (Cards)
   6.1 Common Circuits
   6.2 OTM
   6.3 STSMs
   6.4 MTXI
   6.5 DSPs
   6.6 Unit Controller
   6.7 BCM
7. Network Data Paths; Overview
   7.1 BIF Transport
   7.2 BCM Transport
   7.3 OTM Transport
   7.4 STSM Transport
   7.5 MTXI Transport
   7.6 DSP Transport
8. Network Data Fault Coverage
   8.1 STM Transport
   8.2 Standards-Based Demultiplex
   8.3 Standards-Based Multiplex
   8.4 Switching Matrix Fault Coverage
   8.5 DSP Fault Coverage
   8.6 Expansion Shelf Fault Coverage
9. Network Data Redundancy Control
10. Control Data Transport, Fault Coverage, and Redundancy Control

1. Distributed Switching Systems Overview

Figure 1:
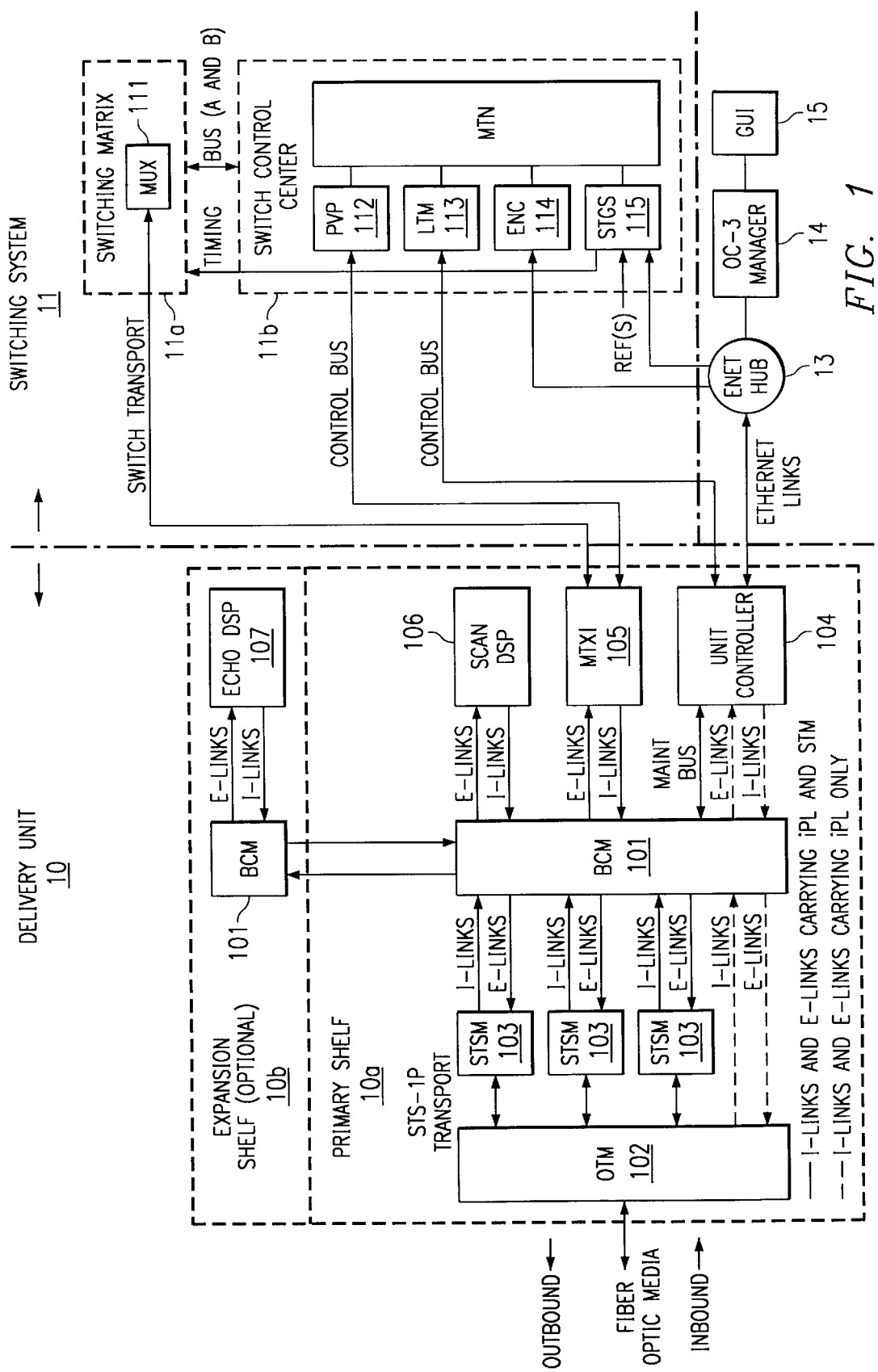
FIG. 1 is a block diagram of a delivery unit in accordance with the invention, as well as a switching system with which it is used.

FIG. 1 is a block diagram of a delivery unit 10 in accordance with the invention, as well as a switching system 11 with which it is used. Delivery unit 10 is typically an element of a distributed telecommunications system having a number of delivery units 10 connected to a switching system 11. Each delivery unit 10 provides the message transport mechanism for telephone calls. The delivery units 10 are in data communication with, but functionally and physically separate from, switching system 11. This permits switching system 11 to support different types of delivery units 10. Each type of delivery unit 10 might then provide a different service, such as for video, wireless (personal communications and cellular services), wire line telephone services, or any combination of these services.

An example of switching system 11 is the DEX600E switching system (Megahub) manufactured by DSC Corporation. Switching system 11 is a tandem switching system, which means that its function is to set up a path from a specific incoming (originating) transit line to an outgoing transit line. Within the public telephone network, the term "tandem" typically refers to intermediate switching within an exchange area. Switching system 11 is comprised of a switching matrix 11a and a switch control center 11b. It is designed for DS0 data obtained from the DS1 electrical signal hierarchy discussed in the Background.

Delivery unit 10 is a trunk interface between SONET optical transmission media and switching system 11. Its OTM (optical termination module) 102 and STSMs (SONET STS-1 modules) 103 are termination modules of a public switched network transported by fiber optic media. OTM 102 and STSMs 103 convert and de-multiplex the OC-3 signals into DS0 channels for processing within delivery unit 10 and transport to switching system 11. After being switched by switching matrix 11a, the DS0 channels are transported back to delivery unit 10 for OC3 transport or to other traffic carrying equipment. Other main components of delivery unit 10 are bus control modules (BCMs) 101, unit controller 104, matrix interface (MTXI) 105, scan DSP 106, and echo DSP 107. Egress busses (E-links) and ingress busses (I-links) provide internal connections and carry both "network data" (DS0 channels) and "control data" (as those terms are defined herein).

The transport mechanisms used by delivery unit 10 are those defined by a SBB-LS (system building block, low speed) architecture. The SBB-LS transport is characterized by its support of both STM (synchronous transfer mode) and iPL (integrated packet layer) subframe transport within ingress and egress bus frames. As explained below in connection with FIGS. 3–11, STM subframes carry network data whereas iPL subframes carry control data.

The "building block" aspect of the SBB-LS architecture provides a common platform upon which modifications and future improvements can be made. For example, modifications for signals above and below OC-3 (having higher or lower data rates) can be made using the same SBB-LS components.

It should be understood that the data rates and data widths described herein are for purposes of example only. Data rates different that standard OC3 could be accommodated by scaling, and the internal buses could carry different size bit streams at different rates than those described herein.

2. Delivery Unit Architecture: Frames, Shelves, Backplanes, Cards, and Redundancy Each of the various components 101–107 of delivery unit 10 is manufactured using printed circuit board manufacturing techniques and is referred to herein as a "card". Cards other than BCM 101 are referred to herein as "application cards". In FIG. 1, the application cards are cards 102–107.

Cards 101–106, those of the primary shelf 10a, fit into a connector slot of a "backplane" for that shelf. Similarly, the cards 101 and 107 of the secondary shelf fit into connector slots of a backplane for that shelf. Thus, a backplane and its cards comprise a "shelf". As indicated in FIG. 1, primary shelf 10a holds all cards other than those used for echo cancellation, i.e., a BCM 101 and application cards 102–106. In the embodiment of FIG. 1, if delivery unit 10 is to have echo cancellation functionality, an expansion shelf 10b is added and has a second BCM 101 and a number of echo cancellation DSPs 107. In other embodiments, an echo cancellation card could be added to the primary shelf 10a. Further, a secondary shelf could have some any combination of a BCM 101 and application cards.

To simplify explanation, delivery unit 10 is described herein in terms of only primary shelf 10a, except where explicitly described otherwise.

Delivery unit 10 has redundant copies of all cards 101–106 in primary shelf 10a. Each set of copies, with its interconnections, is a "plane" of delivery unit 10. However, to simplify explanation, delivery unit 10 is described in terms of singular elements. Thus, for example, OTM 102 is described as a single (redundant) OTM 102 even though there are two copies. Where a distinction between planes is made, the planes and their cards will be referred to as "A and B planes" or "A and B copies".

3. Delivery Unit Data Transport Overview

In the inbound direction, OTM 102 terminates OC-3 signals from the public switched network (PSN). It demultiplexes STS-3 electrical signals to three STS-1 signals. It terminates STS-3 section and line overhead and monitors STS-1 path performance. It generates internal STS-1 frames (referred to herein as STS-LP frames) that carry STS-1 SPEs (synchronous payload envelopes) to STSMs 103. In the outbound direction, OTM 102 receives STS-1P frames from STSMs 103, and inserts overhead for STS-3 section and line and part of the path. The resulting signal is a standard SONET STS-3 signal, which is converted to an optical signal for transport to the PSN.

In the inbound direction, each of the three STSMs 103 terminates one of the three STS-1P signal streams from OTM 102. The STS-1P signals are de-multiplexed to extract their DS0 payloads and channel-associated signaling. In the outbound direction, DS0 signals received from BCM 101 are multiplexed and mapped into STS-1 SPEs for transport to OTM 102 in STS-1P frames. STS-1 signals carrying various mapping formats are accommodated, such as DS3, asynchronous VT1.5, and byte synchronous VT1.5 SPEs.

An egress bus (comprised of E-links) and an ingress bus (comprised of I-links) transport both network data (in STM subframes) and control data (in iPL subframes) within delivery unit 10. The ingress bus provides point-to-point I-links to BCM 101 from application cards 103–106 within shelf 10a. Ingress data are transported on 8-bit wide data streams operating at a 25.92 MHZ rate to provide a bandwidth of approximately 200 Md/s. The egress bus provides point-to-point E-links from BCM 101 to application cards 103–106 within shelf 10a. Egress signals are transported on 16-bit wide data streams operating at a 51.84 MHZ rate to provide a bandwidth of approximately 800 Mb/s. The frame rates of both the ingress and the egress bus are synchronized to an 8 Khz frame rate (a 125 µs frame period).

BCM 101 arbitrates ingress bus traffic and aggregates ingress bus traffic to a single egress bus. This egress bus is fanned out to other cards 103–106 in shelf 10a. For purposes of this description, all data transport is assumed to be within the primary shelf 10a via its BCM 101, with the understanding that if delivery unit 10 has an expansion shelf, data transport between shelves is via BCMs of both shelves on special high speed optical links. BCM 101 also distributes timing and low level control signals.

Unit controller 104 performs line/trunk processing functions, and controls administration and maintenance within delivery unit 10. I-links and E-links between unit controller 104 and BCM 101 carry only control data (in iPL subframes) because unit controller 104 does not access DS0 channels. Unit controller 104 communicates with other cards of delivery unit 10 via iPL subframes. A low-level maintenance bus (LLMB) between unit controller 104 and BCM 101 is used for resetting BCM 101 and for fault isolation. Unit controller 104 is connected to a line/trunk manager (LTM) 113 in switch control center 11b. Messages regarding call processing functions for delivery unit 10 are transported between unit controller 104 and LTM 113. Unit controller 104 also provides an ethernet connection via an ethernet hub 13 for communicating with OC-3 manager 14, which has a graphics user interface (GUI) 15. The OC-3 manager 14 is a "service unit" whose functions include connection setup and release, billing administration, and file management.

Scan DSP 106 implements a signal processing "scan" function on the DS0 (network) data, which detects network data representing DTMF signaling and dial tones. It reports this data to unit controller 104 via BCM 101. E-links and I-links carry DS0 channels and control messages between scan DSP 106 and BCM 101.

MTXI 105 provides protocol and transport format conversions for transport between delivery unit 10 and switching system 11. Inbound and outbound links between MTXI 105 and switching matrix 11a carry 2048 DS0 channels at 16.384 MHZ. MTXI 105 is also connected to a path verification processor (PVP) 112 of switch control center 11b for communicating messages regarding low level fault detection/isolation for switching matrix channels.

The control hierarchy is such that unit controller 104 is subordinate to LTM 113 for call processing functions and to OC-3 manager 14 for administration and maintenance functions. In general terminology, OC-3 manager 14 is a "upper level manager" for providing upper level administration and maintenance functions relative to the mid-level functions of delivery unit 10. MTXI 105 is subordinate to PVP 112 for low level activity associated with data integrity and connections to switching matrix 11a. *All other cards of delivery unit 10 are subordinate to unit controller 104 for administration, maintenance, and high level control activity. Unit controller 104 monitors the status of other cards of delivery unit 10 and reports any anomalies to OC-3 manager 14. BCM 101 contains shelf controller circuitry for low level maintenance and control functions. OTM 102, STSMs 103, MTXI 105,*

*and scan DSP 106 are subordinate to BCM 101 and each have a local on-board controller (see FIG. 13) for executing maintenance and control functions.*

If echo cancellation is implemented, an expansion shelf 10*b* is added to delivery unit 10. As illustrated, expansion shelf 10*b* has its own BCM 101 as well as echo cancellation DSP 107.

4. Delivery Unit Timing and Synchronization Overview

As illustrated in FIG. 1, switching system 11 has a SONET system timing generator (STGS) 115, which in the example of FIG. 1, resides in switch control center 11*b*. STGS 115 generates timing signals from which delivery unit 10 and switching system 11 derive their timing. STGS 115 selects between one or more reference signals received for synchronizing its generated timing signals in accordance with SONET specifications. These reference signals may be provided by signals generated external to switching system 11 and delivery unit 10 or the may be derived from the OC-3 network signals terminated at delivery unit 10. STGS 115 also filters the timing signal to provide a high quality timing signal out.

Figure 2:
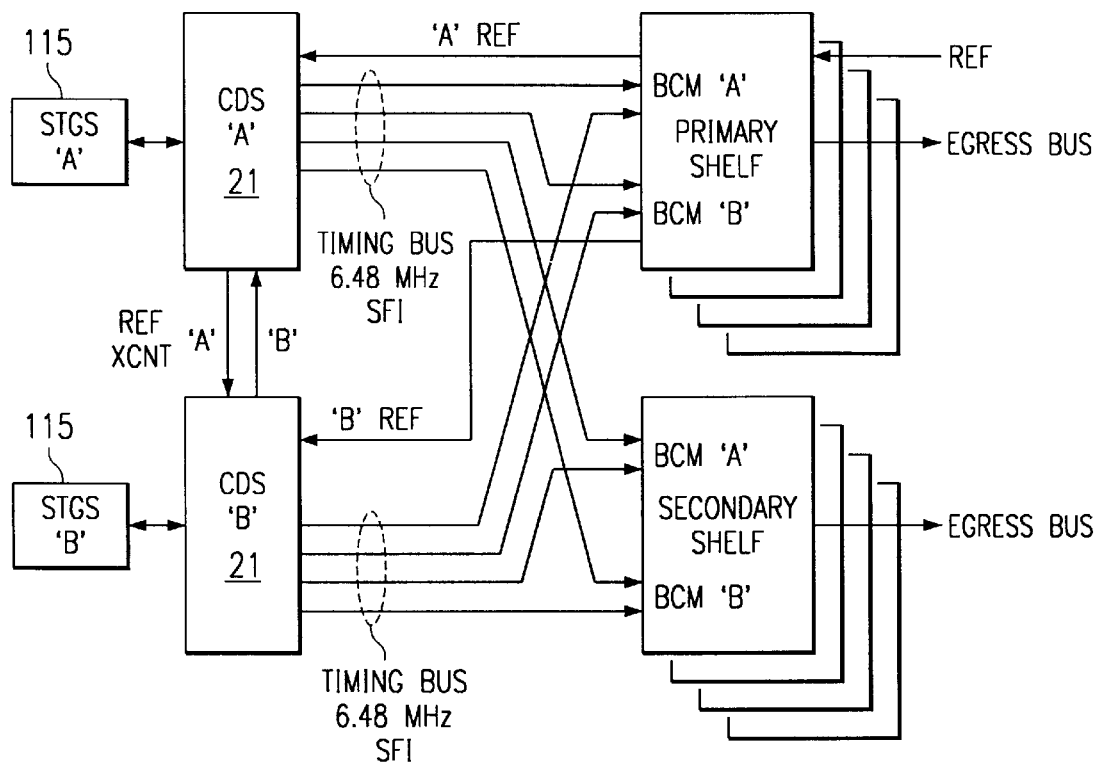
FIG. 2 illustrates the timing distribution structure of the delivery unit.

FIG. 2 illustrates the timing distribution structure of delivery unit 10. As in FIG. 1, the delivery unit 10 of FIG. 2 has multiple shelves, each having a redundant (A and B copies) BCM 101. In the example of FIG. 2, reference signals for STGS 115 are derived from the network signals terminated by delivery unit 10.

SONET clock distributor (CDS) 21 is a card that fits into a slot of the backplane of delivery unit 10. Two such cards are used for redundancy. A single redundant CDS 21 may serve multiple shelves.

STGS 115 delivers a timing bus to CDS 21. The timing bus is connected to the CDSs 21 in a simplex arrangement (A to A and B to B). The timing bus includes a 6.48 MHZ clock and encoded framing signal aligned with the 6.48 MHZ clock. The framing signal is sent as a superframe indicator (SFI) pattern that defines frame alignment, such that the frame alignment may be phase locked with timing of switching matrix 11. Both the clock and the framing (SFI) signal are used to derive other timing signals used within delivery unit 10. As explained below, CDS 21 distributes the timing bus to BCMs 101.

A feature of delivery unit 10 is the transport of timing signals from STGS 115 directly to delivery unit 10, on a timing bus that is separate from the network data bus. As explained below, the STGS clock is a "high rate" clock (6.48 MHZ), which reduces the amount of multiplication required to provide the timing for delivery unit 10. This in turn, reduces the likelihood of jitter. The direct high-rate timing link to delivery unit 10 also reduces noise in the timing signal.

STGS 115 receives reference signals from CDS 21. At each copy (A and B) of redundant STGS 115, the reference signal is used as a reference to a PLL (phase 10*c* ked loop). The outputs of the PLLs are cross-coupled between the STGSs 115. Each STGS 115 can independently select the local signal or those received from the mate STGS 115.

At the redundant (A and B copies) CDS 21, the timing bus received from the associated SSTG 115 is distributed to the connected BCMs 101. CDS 21 distributes the timing bus to as many as eight shelves, four of which are primary shelves 10*a* and four of which are secondary shelves 10*b*. The timing bus is transmitted to both the A and B copies of BCM 101.

CDS 21 receives reference timing signals from the BCMs 101 of as many as four shelves. From these, a main reference timing signal is selected for transport from CDS 21 to STGS 115. The timing reference signals selected at a redundant CDS 21 are cross-coupled so that each copy of CDS 21 has access to the reference signal selected by its mate as well as to its own reference signal. Each CDS 21 also receives an alternate reference from its mate CDS 21, such that each CDS 21 delivers two references to its STGS 115, that is, both a primary and a secondary reference.

The timing signal connections between STGS 115 and CDS 21, and between CDS 21 and BCMs 101 are by means of dedicated timing links. The connection between a CDS 21 and a BCM 101 on the same shelf may be by means of a backplane connection or via direct cabling/coax.

At a BCM 101, the timing bus from the A or B CDS 21 is selected for driving the BCMs local application circuitry and for transport to application cards 102–106. Timing signals are transmitted from a BCM 101 to application cards 102–106 (if the primary shelf) on the egress buses. At each application card, A or B timing signals are selected for driving the card's local application circuitry. The application cards also use the selected timing signals to generate ingress bus timing signals back to BCM 101. In this manner, the timing of application cards 102–106 is synchronized to the timing of BCM 101. Timing signals from BCM 101 are also used to synchronize MTXI 105 to switching matrix 11*a*.

5. Data Transport Formats

Delivery unit 10 uses two basic types of internal transport, referred to herein as the "STS-1P transport" and the "SBB-LS transport". A third type of transport is used between MTXI 105 and switching matrix 11*a*, and is discussed below in the section entitled "Network Data Transport; MTXI Transport".

Referring again to FIG. 1, transport between OTM 102 and STSMs 103 is by means of STS-1P frames, which are similar to SONET STS-1 frames. Other transport within delivery unit 10 is between application cards 102–106, via BCM 101, by means of SBB-LS frames on ingress and egress buses (I-links and E-links).

For SBB-LS transport, BCM 101 multiplexes ingress bus signals to an egress bus frame. The egress bus is fanned out for transmission (broadcast) to application cards 102–106. All application cards 102–106 have access to all subframes generated by all cards via the broadcast nature of the egress bus. Bus interface circuits at each card select STM subframes containing network data (DS0 channels) to be processed by that card. For control messages, each iPL subframe contains a control data payload (for internal control, administration, and maintenance messages) and a header whose destination addresses determine the card or cards that receive iPL subframes.

The STS-1P frame format is the same as that of the STS-1 frame but additional (non-standard) data is carried in some of the section and line overhead fields. The A1 and A2 fields of the section overhead and the H1, H2, and H3 fields of the line overhead are the same as for SONET standard STS-1 overhead. The additional fields include an envelope capacity bit interleaved parity (EC-BIP) field and a control (CNTL) field. The EC-BIP field and the control field occupy fields corresponding to the B2 and K2 fields of the standard STS-1 frame, respectively. The EC-BIP calculation is consistent with the BIP-8 calculation for the standard B2 field, but the frame fields covered by the EC-BIP are different from those covered by the B2 field.

Figure 3:
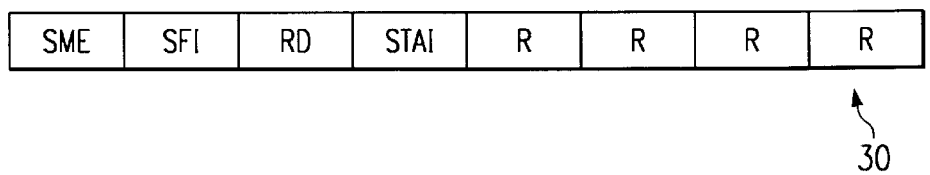
FIG. 3 illustrates the format of the control field of an STS-1P frame.

FIG. 3 illustrates the format of the control field 30 of an STS-1P frame. The STAI bit is used in the inbound direction to pass an alarm indication from OTM 102 to STSMs 103, and is used by STSMs 103 for controlling an automatic protection switching (APS) function. The STAI bit is not used in the outbound direction. The SFI bit is a superframe indicator. The SME, RD, and R bits are not used.

The SBB-LS format is used on ingress and egress buses (I-links and E-links), which transport their data in 125 microsecond (μs) frames. Each SBB-LS frame has a frame header and a number of subframes.

FIG. 4 illustrates the header 40 for an SBB-LS frame. Header 40 carries synchronization data and may also carry low level commands and control messages ("software message data"). Header 40 is organized as sixteen 16-bit words. The framing pattern field carries a framing pattern, used to detect phase errors between the data stream and a frame sync signal. The device address field is used to address devices to which a low-level command or a software control message is to be sent. The command code field contains low level commands such as reset and restart. The software message data field contains software-defined control messages.

After the header 40 of an SBB-LS frame, there are a number of subframes. Each subframe carries a datagram having 64 bytes of data. Three types of datagrams are defined. Synchronous transfer mode (STM) datagrams carry DS0 data, which is pulse code modulated voice data. In the example of this description, each STM datagram carries 48 DS0 channels. Internal packet layer (iPL) datagrams carry data used for interprocessor communication between cards within delivery unit 10. Idle datagrams are those that are neither STM nor iPL datagrams. Within an SBB-LS frame, the types of datagrams in the subframes may be mixed between STM, iPL, and Idle datagrams.

FIG. 5 illustrates the format of an ingress bus frame 50. The ingress bus frame contains a 32-byte header 40, an 8-byte pad, and 50 datagram slots. Each slot contains a subframe that transports a 64 byte datagram. The bandwidth of the ingress bus would accommodate 2400 channels (50 subframes×48 channels/slot) if all subframes carried DS0 signals. However, the bandwidth within application cards is limited to 2048 channels. The bandwidth above this 2048 channel limit (7 subframes) is available for transporting iPL subframes.

FIG. 6 illustrates the format of an egress bus frame 60. The egress bus frame contains a 32-byte header 40 and 202 datagram slots. Each slot contains a subframe that transports a 64 byte datagram. Only 200 of the slots are actually used for datagram transport. Because each STM subframe has the capacity to carry 48 DS0 signals, the total capacity of the egress bus is 9600 DS0 channels if all subframes carry full STM datagrams. However, circuits of BIF 125 associated with egress bus access limit capacity to 8192 channels. In the example of this description, only full STM subframes are used, and thus the number of DS0 channels is reduced to 8160 (170 subframes×48 channels/subframe). The additional bandwidth above that required to transport the 8160 DS0 channels (30 subframes) is available for iPL subframe transport.

Figure 7:
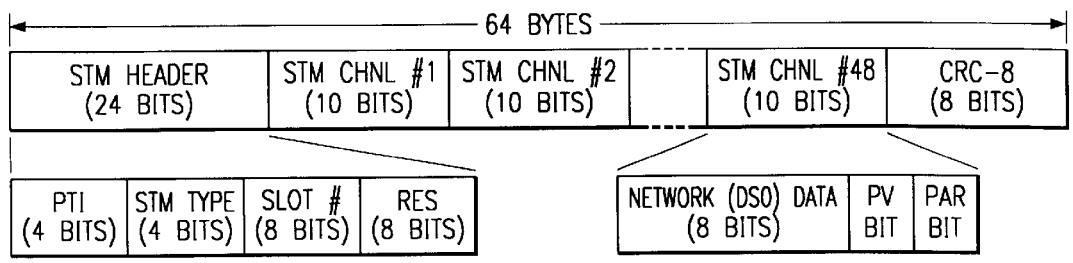
FIG. 7 illustrates the format for a subframe of FIGS. 5 and 6 when it carries network (DS0) data.

FIG. 7 illustrates the format for a subframe of FIGS. 5 and 6 when it carries network (DS0) data. These subframes are referred to as "STM subframes". Each STM subframe has a 24-bit header, 48 STM channel fields containing 10 bits per channel, and an 8-bit CRC (cyclic redundancy check) code calculated over the other fields of the subframe.

The STM header has a 4-bit packet type indicator (PTI) field, a 4-bit STM type field, an 8-bit slot number, and an 8-bit reserved field. The PTI field distinguishes STM subframes from iPL and Idle subframes. The STM type is reserved. The slot number field carries the number of the egress subframe assigned to the datagram. The slot number is used for detecting certain types of transport faults.

STM channels, of which there are 48 per STM datagram, each carry 8 bits of network (DS0) data, a path verification (PV) bit, and a parity bit covering the other 9 bits. The transmitted PV code is unique for each STM channel. Each channel's PV code and other PV data are transported in that channel's PV bit, one bit per frame, over a 48 frame PV superframe. As explained below in connection with FIG. 23, this PV code is used for STM transport within delivery unit 10; a different PV code is used for transport between MTXI 105 and switching matrix 11a.

Figure 8:
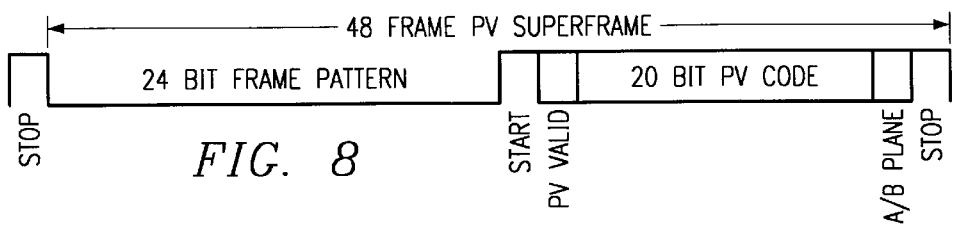
FIG. 8 illustrates the 48-frame format of the PV (path verification) superframe.

FIG. 8 illustrates the 48-frame format of the PV superframe. A synchronization pattern is carried with each PV code so that a global superframe is not required. The PV frame pattern consists of 24 consecutive zeros at the beginning of the frame, and is followed by a START bit. A PV valid bit indicates when the PV code field contains valid information. The 20-bit PV code uniquely identifies the STM channel. An A/B plane bit indicates the plane on which the signal originated. The PV superframe is terminated with a STOP bit.

Figure 9:
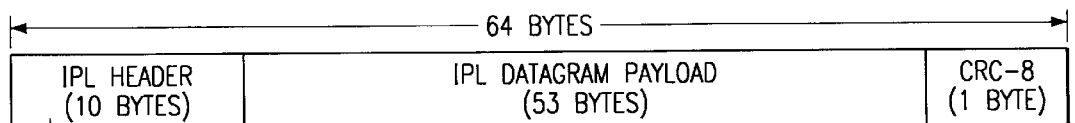
FIGS. 9 and 10 illustrate the format for a subframe of FIGS. 5 and 6 when it carries control (iPL) data, specifically, the iPL subframe and its header, respectively.
Figure 10:
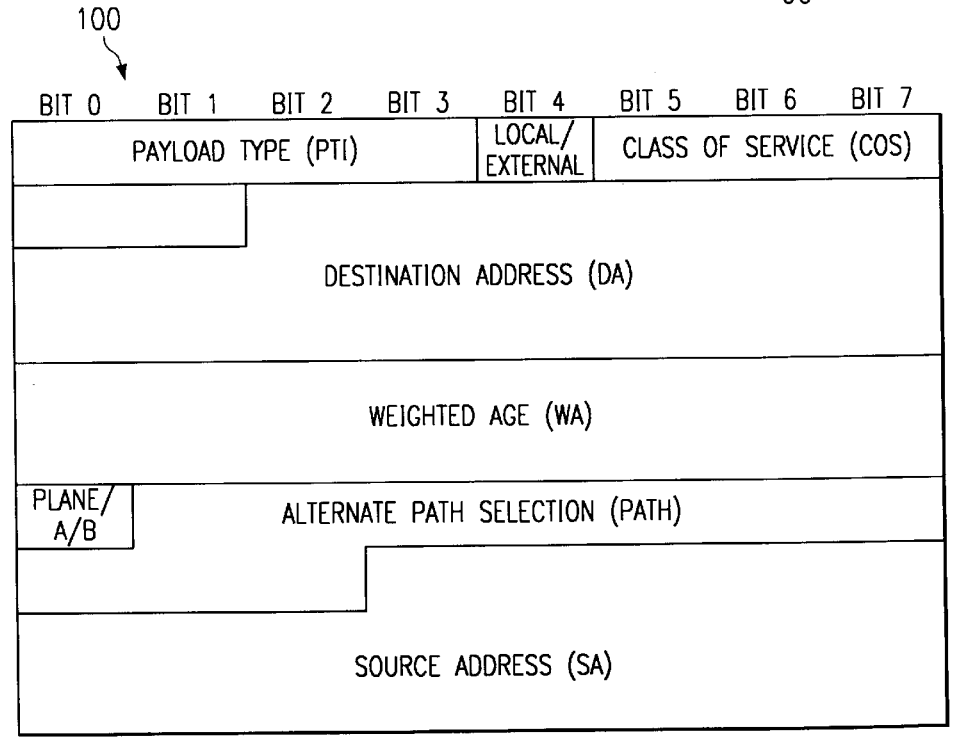

FIGS. 9 and 10 illustrate the format for a subframe of FIGS. 5 and 6 when it contains control (iPL) data, specifically, the subframe 90 and its header 100, respectively. The iPL subframe 90 contains a 10-byte header, a 53-byte payload, and a 1-byte (8 bit) CRC code calculated over the other 63 bytes of data. The payload type (PTI) field distinguishes iPL datagrams from STM and Idle datagrams. The destination address field routes a datagram to a destination SBB-LS processor. The source address field identifies the SBB-LS processor sending the datagram. For shelf 10a, the "SBB-LS processors" are the processor in unit controller 104 (see FIG. 19) and the processor in the controller (OBC) of other cards 101, 102, 103, 105, and 106 (see FIGS. 12 and 13).

Control messages transported between SBB-LS processors typically exceed the payload capacity of a single iPL subframe. Thus, at the source processor, large messages are partitioned into segments. The segments are reassembled at the destination processor. Information required for segmentation and reassembly (SAR) is carried in a secondary header located in the payload field of the iPL datagram. The secondary header is compatible with ATM transport.

Figure 11:
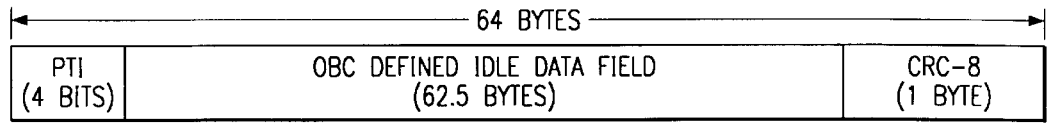
FIG. 11 illustrates the format for a subframe of FIGS. 5 and 6 when it is an Idle subframe.

FIG. 11 illustrates the format for a subframe of FIGS. 5 and 6 when it is an Idle subframe 110. Idle subframes 100 fill unused ingress and egress subframes. CRC-8 codes are used for fault coverage. The header for Idle subframes contains the payload type (PTI) field, which identifies the subframe as an Idle subframe.

6.1 Delivery Unit Cards; Common Circuits

Figure 12:
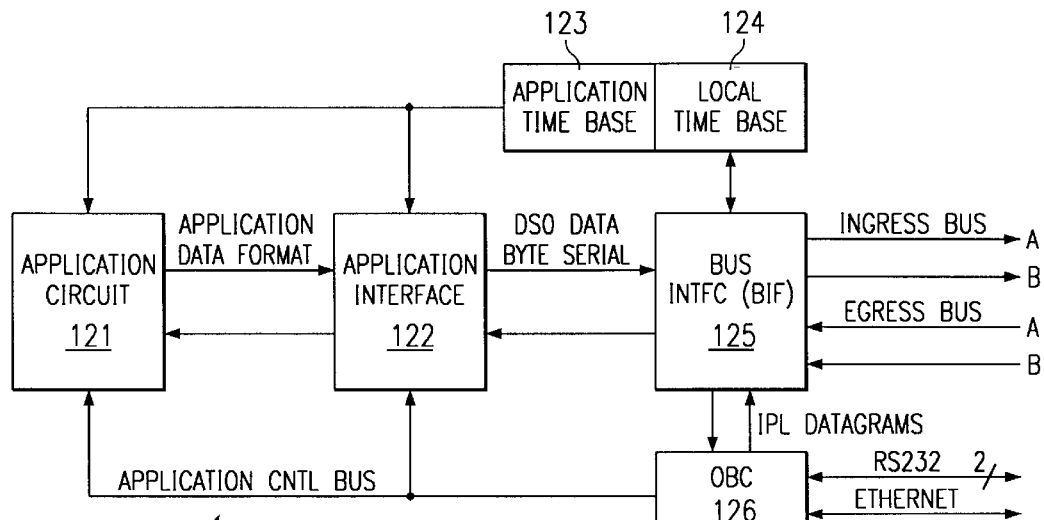
FIG. 12 illustrates a "generic" card, which could be any one of the delivery unit modules of FIG. 1 other than the unit controller.

FIG. 12 illustrates a "generic" card 120, which could be any one of cards 101–107 of FIG. 1 other than unit controller 104. Some of its internal elements are different depending on the card to which generic card 120 is adapted. These elements are the application circuit 121, application interface 122, and local time base 123. The application circuit 121 provides whatever functionality is specified for the card. Application interface 122 provides protocol or transport format conversions required for connecting its application circuit 121 to the bus interface 125. These elements 121 and 122 are explained below in connection with FIGS. 14–18, for each card.

Other elements of the generic card 120 of FIG. 12 are common to application cards 101–107 other than unit controller 104. These common circuits are: local timebase 124, bus interface (BIF) 125, and onboard controller (OBC) 126. These circuits are referred to herein as the "common" SBB-LS circuits. OTM 102, BCM 101, and unit controller 104 have BIFs that are a subset of BIF 125 because these cards terminate iPL subframes but not STM subframes.

Local timebase 124 receives a 51.84 MHZ clock and associated frame signal from BCM 101 on the egress bus via BIF 125. For redundancy, two sets of timing signals (A and B) from redundant BCM 101 are tested and one set is selected. Local timebase 124 generates timing signals to be used by BIF 125 and creates application-specific timing signals for the local application circuit 121. Timing signals associated with BIF 125 are common for all application cards 102–106 and a common method of distributing timing is used. In some cases, application circuit 121 and/or application interface 122 require special timing signals based on an application timebase 123 that derives the special timing signals from local timebase 124.

BIF 125 provides the interface to the ingress and egress buses. BIF 125 routes iPL subframes to and from OBC 126. It also originates and terminates STM subframes as well as routes them.

For iPL datagrams originating at its local OBC 126, BIF 125 multiplexes them onto the ingress bus with STM datagrams under control of BCM 101 on an available bandwidth basis. BIF 125 generates an iPL request to BCM 101 and an arbiter circuit on BCM 101 generates an iPL grant to the requesting BIF 125 when capacity in a BCM buffer is available. For iPL datagrams arriving at an application card, the local BIF 125 identifies the subframe as an iPL subframe and examines the destination field of the header to determine if that card is addressed. If the address does not match, the subframe is discarded; if the address matches, the subframe is transported to the local OBC 126.

BIF 125 also originates and terminates STM subframes. For STM subframes to be transported from a card, BIF 125 maps DS0 channels received from the application circuit 121 into the payload of STM subframes and buffers them for transport in ingress frames. For subframes arriving at a card on the egress bus, BIF 125 separates STM subframes from iPL subframes. It terminates the STM subframes and extracts the DS0 channels carried in the subframe payload. DS0 channels to be processed by application circuit 121 are switched to a byte-serial data stream for transmission to the application interface 122. BIF STM transport is discussed in detail below in the section entitled "Network Data Transport; BIF Transport".

For redundancy, BIF 125 connects to redundant egress and ingress buses (A and B) for connection to the redundant BCM 101. Subframes received on the redundant egress buses are monitored for error conditions and subframes from one of the buses are selected for processing based on the results of the error monitoring. Automatic plane switching is provided when enabled by OBC 126. The ingress bus generated on BIF 125 is transported to both copies of BCM 101 on separate physical media.

Figure 13:
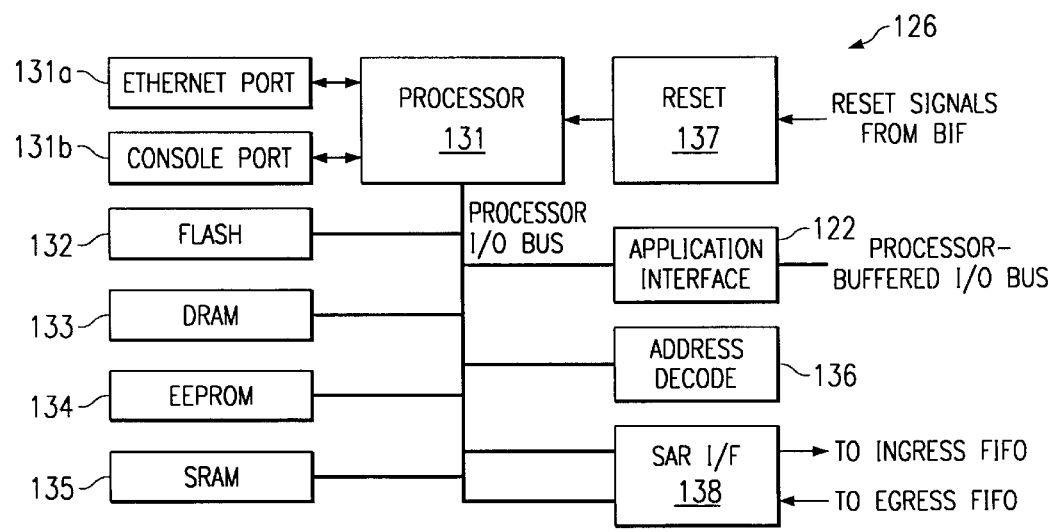
FIG. 13 is a block diagram of the OBC (on board controller) of the delivery unit modules of FIG. 1.

FIG. 13 is a block diagram of OBC 126. OBC 126 provides direct access to its card for administration, maintenance, and control. OBC 126 communicates with other cards via iPL datagrams. The use of a common circuit for all OBCs 126 provides a common communication and control interface for all cards. The common functions performed by OBCs 126 include initialization, configuration, and performance monitoring of their respective cards.

OBC 126 has a processor 131, such as the Motorola MPC860 communication controller. It also has FLASH memory 132, DRAM 133, and EEPROM 134. FLASH memory 132 stores a boot code, which may be the same for all or some OBC's 126 thereby providing a common embedded software environment. Application code and data are downloaded to DRAM 133 using boot code provided in FLASH memory 132. The EEPROM 134 stores configuration information.

Processor 131 has two ports 131a and 131b. Port 131a is an ethernet port. Port 131b is a serial communication port for debug. The capability to reset processor 131 is provided through console port 131b during development.

OBC 126 controls and monitors its local application circuit 121 (see FIG. 12) through application interface 122. An address and decode unit 136 decodes addresses and chip select signals and handles addressing for the OBC registers.

OBC 126 responds to three types of resets: restart, soft reset, and hard reset. The resets can be initiated remotely, manually, or self-initiated by processor 131.

For remotely initiated resets to an application card, reset logic 137 receives a reset message from BCM 101. The control message is received at the card's BIF 125 on the egress bus in an SBB frame header 40 (see FIG. 4). Manual resets are by means of a local push-button switch, and are also handled by reset logic 137. For BCM 101, reset logic 137 also handles reset messages transported on the LLMB.

For control messages in general, the segmentation and reassembly (SAR) function of OBC 126 is handled by processor 131. For outgoing messages, the SAR function separates messages containing more than 53 bytes into 53 byte data segments, maps the segments into iPL datagrams, and transports them to the local BIF 125. For incoming messages, the SAR function receives iPL datagrams from its local BIF 125, terminates them, and reassembles message segments into the original message, which is then interpreted by processor 131. The reassembly is accomplished using information carried in the header (see FIGS. 9 and 10). The section entitled "Control Data Transport and Fault Coverage", discusses control data transport in further detail.

SAR interface 138 handles transport of iPL datagrams to and from BIF 125. In alternate embodiments of OBC 126, the SAR function could be handled by hardware rather than software and SAR interface 138 would include appropriate SAR circuitry.

Various circuits of OBC 126 are especially suitable for implementation with FPGAs (field programmable gate arrays). These include address and control unit 136, reset logic 137, and SAR interface 138.

Figure 13A:
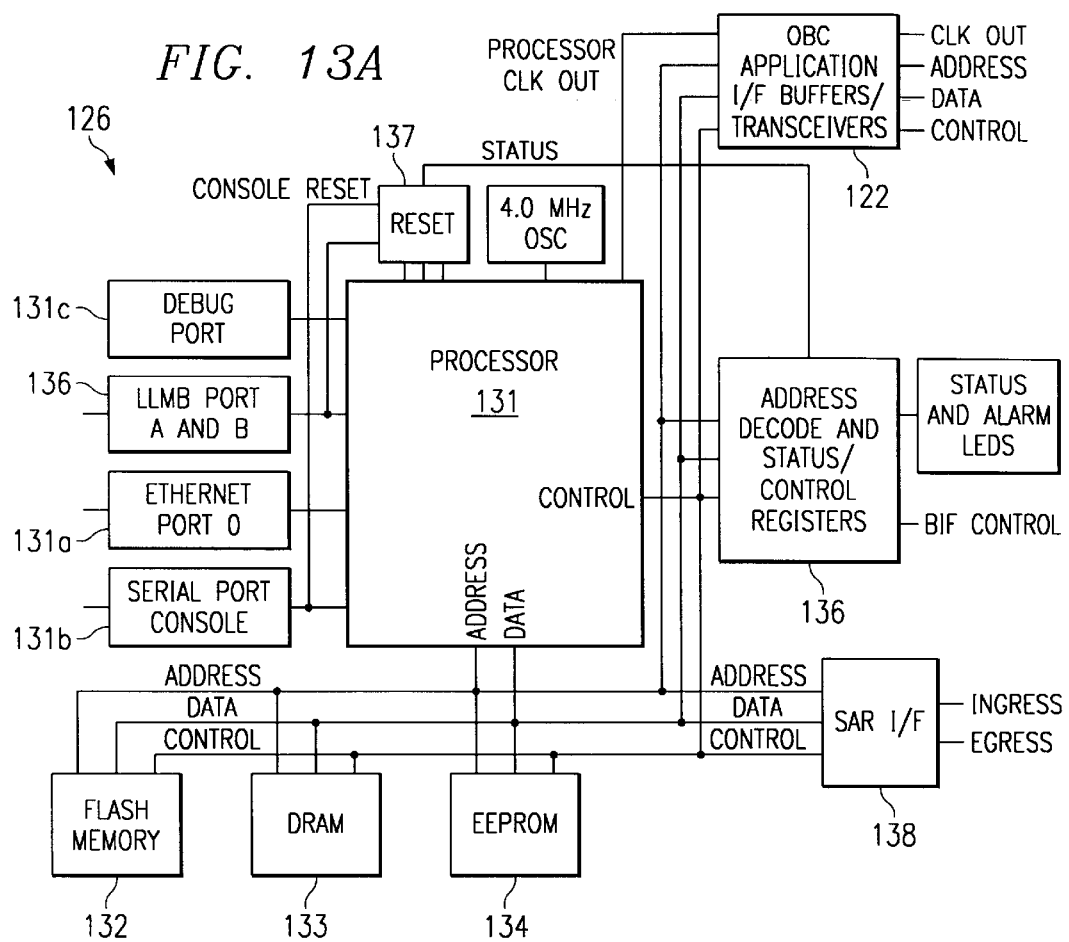
FIG. 13A is a block diagram of the OBC (on board controller) of the bus control module of FIG. 1.

FIG. 13A illustrates the OBC 126 of BCM 101. It has the same components as the OBC 126 of FIG. 13, but its processor 131 has a special low level maintenance bus (LLMB) interface 136, which connects BCM 101 to unit controller 104 via backplane connectors and redundant LLMB for the purpose of communicating reset signals and low level maintenance signals. The LLMB is discussed below in the section entitled "Delivery Unit Cards; Unit Controller". LLMB interface 136 has redundant microcontrollers that decode messages arriving on the redundant LLMB. The messages may cause power on, soft reset, restart, or a processor test. The microcontroller decodes a slot and shelf address delivered with the message.

OBC 126 may be implemented as a daughter board as well as an on-board circuit, and in the embodiment of this description, is a daughterboard to BCM 101. In other embodiments, it may be implemented as a daughterboard to application cards that have insufficient physical area for the OBC 126 or that are upgraded.

6.2 Delivery Unit Cards; OTM

Figure 14:
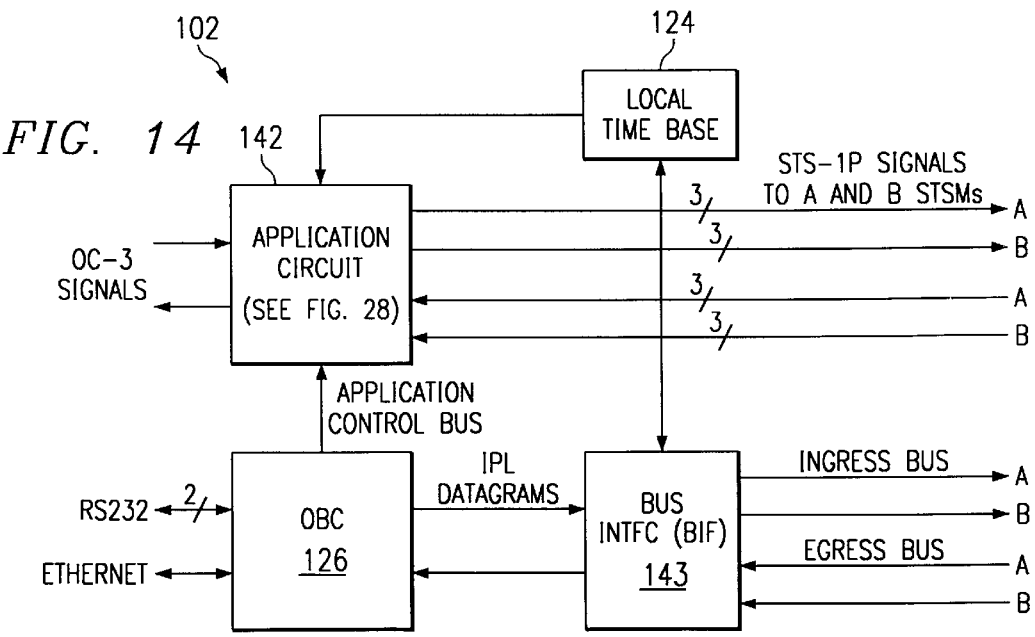
FIG. 14 is a block diagram of the OTM (optical termination module) of FIG. 1.

FIG. 14 is a block diagram of OTM 102. Its OBC 126 and local timebase interface 124 are the same as those described above in connection with FIGS. 12 and 13. Its BIF 143 is a subset of the BIF 125 described above in connection with FIG. 12. BIF 143 supports routing of iPL subframes, but does terminate STM subframes.

In the inbound direction, application circuit 142 of OTM 102 terminates OC-3 signals. Specifically, it originates and terminates STS-3 section and line overhead. It performs STS-1 path performance monitoring. It maps STS-1 SPEs into pseudo STS-1 frames (non-standard section and line overhead). Additional information is inserted into certain overhead fields to create the STS-1P frames. The three STS-1P frames are transmitted to redundant copies of three STSM cards 103.

In the outbound direction, OTM 102 receives STS-1P signals from the A and B copies of the three STSMs 103. The received A and B signals are monitored. The signal from one copy is selected for processing based on error monitoring. The selected signals are multiplexed into a STS-3 frame and appropriate overhead fields are inserted to create a standard STS-3 frame. The STS-3 frame is converted to an OC-3 signal for transport to the PSN.

OTM 102 is further described below in connection with FIG. 28, with emphasis on its STS signal transport functionality.

6.3 Delivery Unit Cards; STSMs

Figure 15:
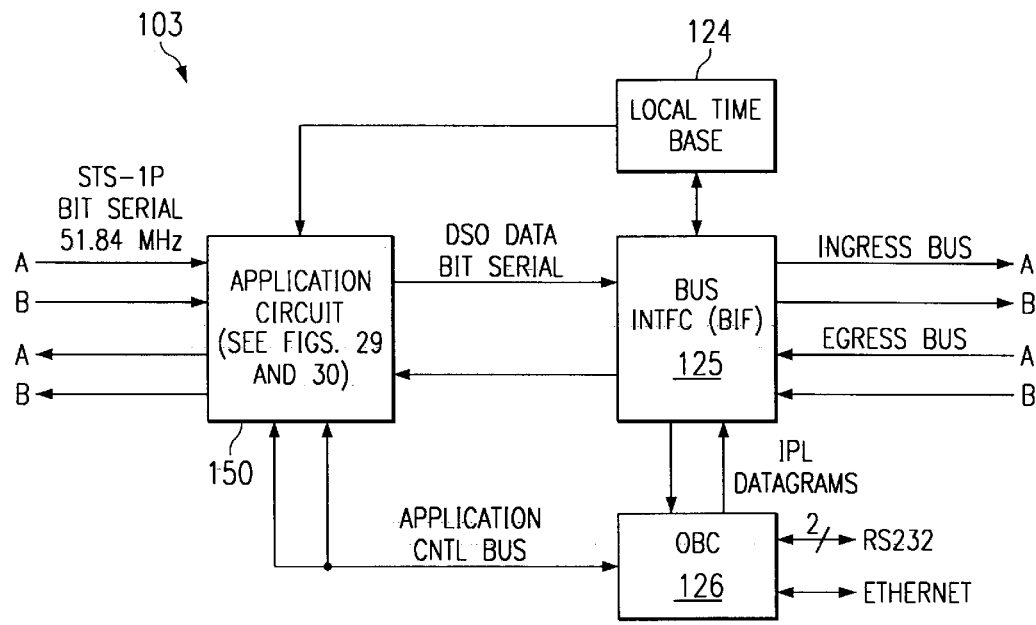
FIG. 15 is a block diagram of one of the STSMs (SONET STS-1 modules) of FIG. 1.

FIG. 15 is a block diagram of an STSM 103. Its local timebase 124, BIF 125, and OBC 126 are described above in connection with FIGS. 12 and 13.

STSM 103 originates and terminates STS-1P signals carrying various types of payloads. Performance monitoring and alarm processing are provided for all levels of signals. DS3 and VT1.5 mapped STS-1 SPEs are accommodated. For VT1.5 mapped STS-1 SPEs, both asynchronous and byte-synchronous mappings are supported and the two mappings can coexist in the same STS-1 SPE.

In the inbound direction, application circuit 150 receives STS-1P signals from OTM 102 (copies A and B). The STS-1P signals are demultiplexed down to asynchronous or byte-synchronous DS1 signals, then the DS1s are framed to extract the DS0 channels. It also monitors the redundant signals for errors and selects one copy for processing based on error monitoring.

In the outbound direction, application circuit 150 multiplexes DS0 channels and maps the resulting signals into STS-1 SPEs. Appropriate alarm and performance monitoring overhead signals are inserted into the various outbound signals. The resulting STS-1P signal is transmitted to OTM 102 (copies A and B) on separate physical links. Signaling information defined by OBC 126 is also inserted into outbound DS0 channels. Application circuit 150 also provides conversion to bit-serial transport from the byte-serial transport of BIF 125, as well as per channel amplitude attenuation.

STSMs 103 are further described below in connection with FIG. 29, with emphasis on their network data transport function.

6.4 Delivery Unit Cards; MTXI

Figure 16:
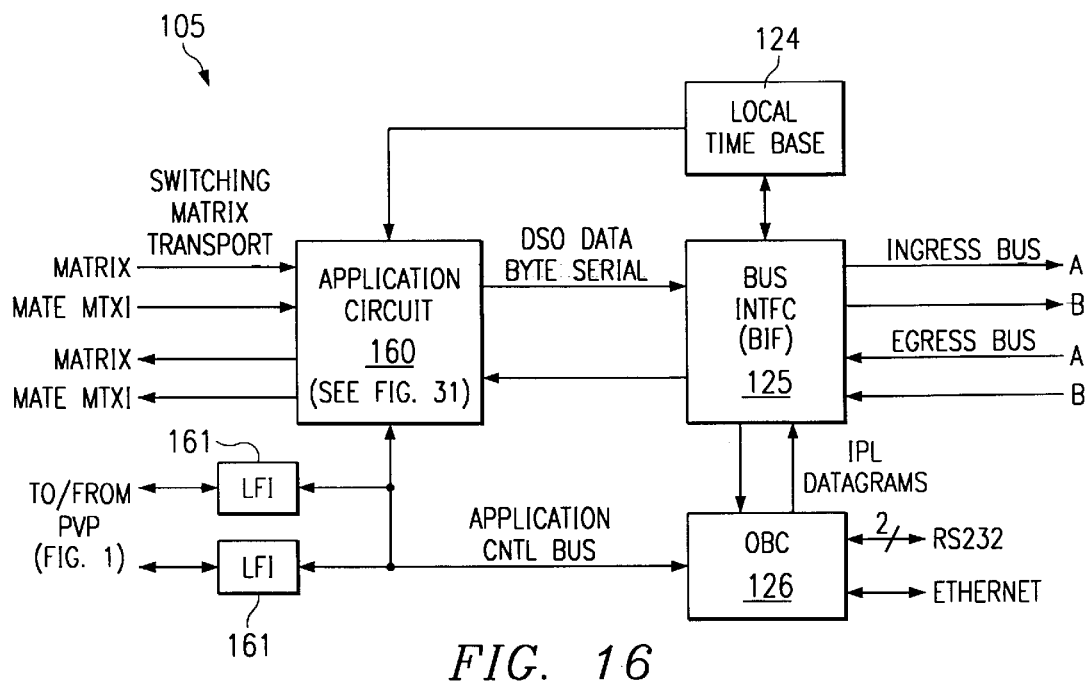
FIG. 16 is a block diagram of the MTXI (matrix interface) of FIG. 1.

FIG. 16 is a block diagram of MTXI 105. MTXI 105 has the common circuits illustrated in FIG. 12, that is, the local timebase 124, BIF 125, and OBC 126.

In the inbound direction, MTXI 105 terminates the SBB-LS channels that carry DS0 channels within delivery unit 10 (as STM datagrams). In the outbound direction, MTXI 105 terminates switching matrix transport channels that carry DS0 channels within switching matrix 11a. Its application circuit 160 performs conversions between the switching matrix transport format and the SBB-LS transport format.

MTXI 105 accommodates a path verification (PV) mechanism (different from the STM PV mechanism discussed above in connection with FIGS. 7 and 8) for fault coverage of matrix transport channels. For this purpose, MTXI 105 is subordinate to PVP 112 in switch control center 11b, with which it communicates using a control bus via redundant LIFO/FIFOs (LFIs) 161.

Figure 17:
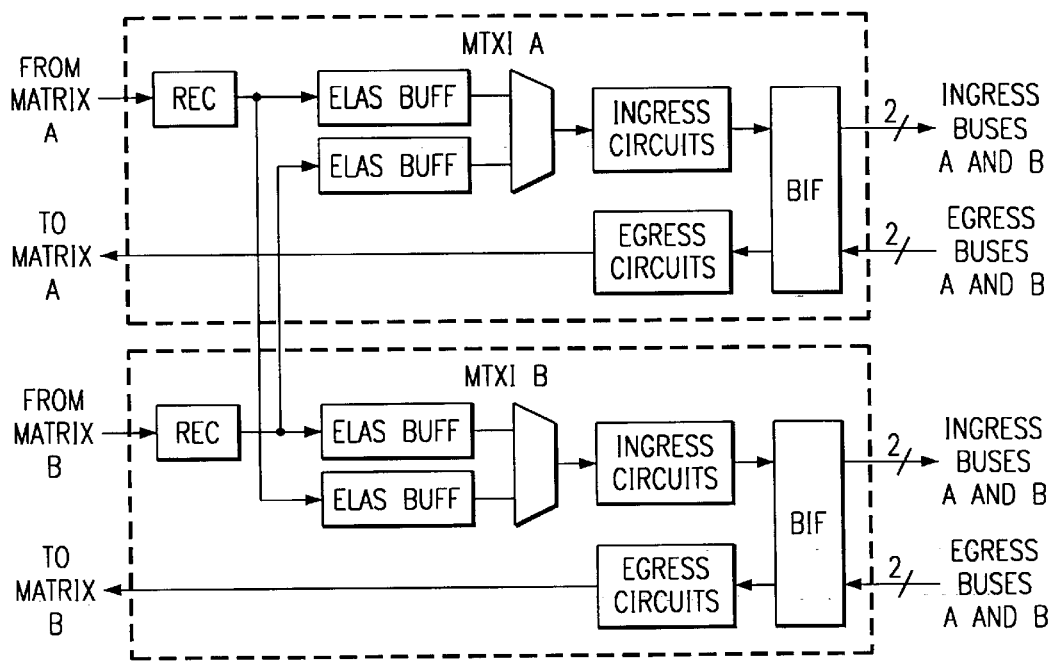
FIG. 17 illustrates cross-coupling of redundant copies of the MTXI.

FIG. 17 illustrates a cross-coupling arrangement, whereby A and B copies of redundant MTXI 105 are connected to the redundant planes of switching matrix 11a in a planar arrangement (A connected to A and B connected to B). Outbound data received at each copy of MTXI 105 are buffered and transmitted to the mate copy of MTXI 105. This cross-coupling arrangement provides both copies of MTXI 105 with access to data received from both matrix planes 11a. Full cross-coupling is provided between MTXI 105 and PVP 112 in switching system 11 through separate cables.

MTXI 105 is discussed in further detail in Part 7.5, with emphasis on its network data transport function.

6.5 Delivery Unit Cards; DSP Cards

Referring again to FIG. 1, delivery unit 10 has two types of DSP cards, a scan card 106 (in primary shelf 10a) and an echo cancellation card 107 (in expansion shelf 10b). Access to DSP cards 106 and 107 for transport of both network data (in STM datagrams) and control data (in iPL datagrams) is via ingress and egress buses connected to BCM 101. Both types of DSP cards 106 and 107 use the same module, configured and programmed for the appropriate application.

Figure 18:
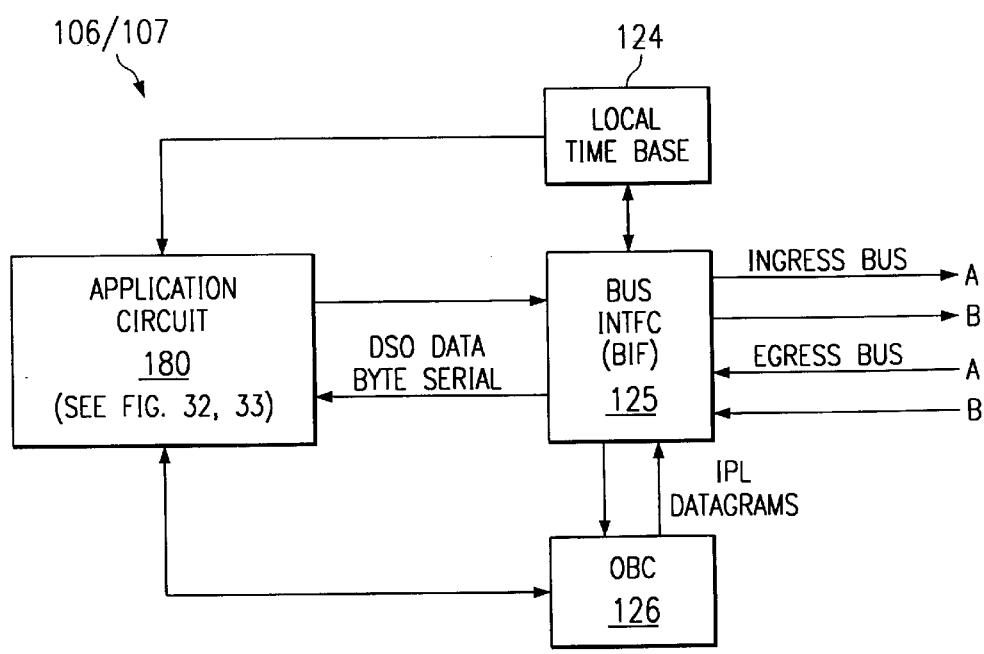
FIG. 18 is a block diagram of a DSP (digital signal processing) module of FIG. 1.

FIG. 18 is a block diagram of a DSP card, which may be either DSP card 106 or DSP card 107. For simplicity of description, it is referenced herein as DSP 106. It has the common circuits of FIG. 12, that is, a local timebase 124, BIF 125, and OBC 126.

In the inbound direction, BIF 125 terminates the egress bus and extracts STM and iPL subframes. Any iPL datagrams addressed to scan DSP 106 are passed to OBC 126. STM subframes are terminated to extract DS0 channels for access by application circuit 180. As explained below in connection with FIGS. 32 and 33, application circuit 180 has a number of DSP processors for performing tone detection (scan) processing (in the case of DSP card 106) or echo cancellation (in the case of DSP card 107). It also has circuitry for converting between the byte-serial format associated with BIF 125 and the bit-serial format associated with DSP processing.

In the outbound direction, the processed DS0 channels are mapped into STM datagrams by BIF 125. BIF 125 also multiplexes any iPL datagrams generated by OBC 126 with the STM datagrams for transport to other cards within delivery unit 10 on the ingress bus.

DSP cards 106 and 107 are discussed in further detail in connection with FIGS. 32 and 33, with particular emphasis on network data transport.

6.6 Delivery Unit Cards; Unit Controller

Figure 19:
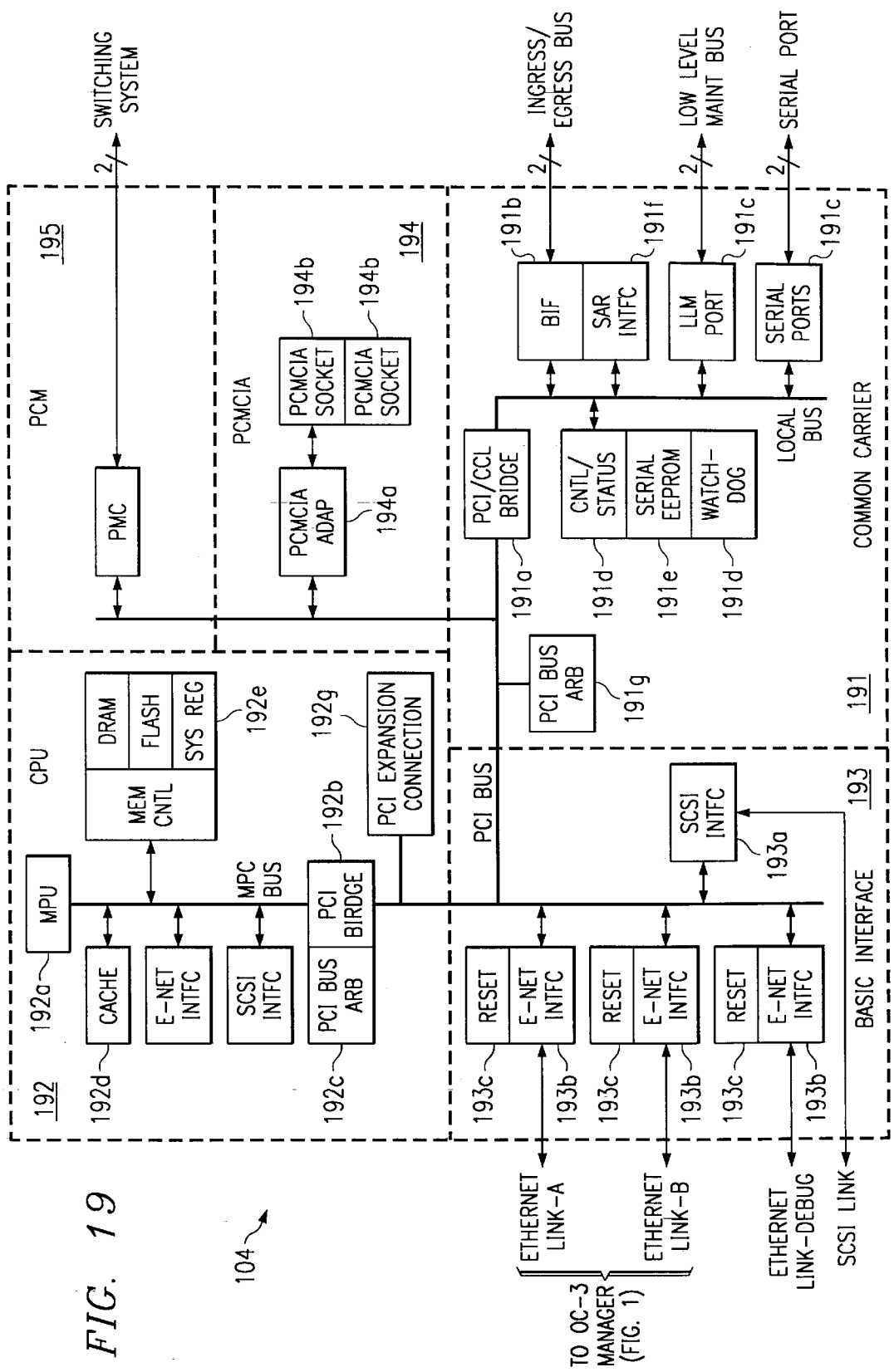
FIG. 19 is a block diagram of the unit controller of FIG. 1.

FIG. 19 is a block diagram of unit controller 104, which may also be referred to as a high density line/trunk processor. It is implemented with a "RISC processor" card, which is a common application card that is easily adapted for various processing applications in delivery unit 10. For example, the same RISC processor card could be used to implement a "super controller" for multiple shelves. It communicates within shelf 10a with iPL datagrams on ingress and egress bus via BCM 101. As explained below, it has both "standard" and "expansion" interfaces for external communications.

Unit controller 104 has a common carrier card 191 and four daughter cards 192–195. These daughter cards include a CPU card 192, basic interface card 193, PCMCIA card 194, and PMC card 195. PCMCIA card 194 and PMC card 195 are expansion interfaces, in the sense that they are optional interfaces that may be used depending on the application of the card. Communications within unit controller 104 are by means of a peripheral component interconnect (PCI) bus.

Common carrier card 191 provides connectors and support for the four daughter cards 192–195. It incorporates a number of I/O functions and other miscellaneous functions. The functional blocks on common carrier 191 connect to a local bus, which is interfaced to the PCI bus through PCI bridge 191a. The PCI bus is consistent with today's high speed peripheral interconnection specification but other expansion bus designs could be substituted. PCI bridge 191a may be implemented with a Tundra QSPAN ASIC. Connection to the daughter cards 192–195 is provided by the PCI bus. Access to the PCI bus is provided through a PCI bus arbiter 191e, is which accommodates a maximum of 8 PCI bus masters.

BIF 191b permits unit controller 104 to communicate with other cards of delivery unit 10 via iPL datagrams. BIF 191b is a subset of the standard BIF 125 (see FIG. 12) because unit controller 104 does not use STM datagrams. SAR interface 191f provides protocol and format conversions for the iPL datagrams (see FIG. 12).

Common carrier card 191 has four asynchronous serial ports 191c. Two of the ports are low level maintenance bus (LLME) ports for a LLMB between unit controller 104 and BCM 101. The other two ports 191c provide RS-232 physical interfaces and are used for debug.

The LLMB connection permits unit controller 104 to reset BCM 101 without using the iPL data transport paths. Once reset, BCM 101 can then support communication within shelf 10a by means of iPL datagrams.

Common carrier card 191 has control and status registers 191d, which may be implemented as a FPGA. Access for general control and status, reset, watchdog timer, and power monitoring functions are provided.

CPU card 192 has a RISC processor 192a. An example of a suitable processor is a Genesis-2, manufactured by Motorola Corporation with a 603 eV PowerPC processor and an external cache 192d. Processor memory 192 includes at least 32 megabytes of DRAM and 1 megabyte of flash memory.

A PCI host bridge 192b provides a PCI bus interface. A 15-channel interrupt controller is incorporated within PCI host bridge 192b.

Basic interface card 193 contains a SCSI interface 193a and three ethernet interfaces 193b. All of the interfaces are connected to the PCI bus for access by CPU 192. Two of the ethernet ports 193b are used for connection to OC-3 manager 14 (see FIG. 1), and the third is used for debug. The three ethernet interfaces 193b support both 100BASE-TX and 10BASE-T operation and auto negotiation is provided between the two transport rates. A reset monitor associated with each ethernet port 193b permits unit controller 104 to be remotely reset via an ethernet link. The reset monitor supports a hard reset, a soft reset and a restart.

PCMCIA interface card 194 is based on a CL-PD6729 host adapter 194a and supports two PCMCIA sockets 194b. PCMCIA interface 194 can accommodate memory expansion, a disk drive (IDE compatible), and I/O devices such as modems.

PMC card 195 provides the interface to LTM card 113 of switch control center 11b (see FIG. 1). Card 195 connects to other elements of unit controller 104 via the PCI bus. A Tundra QSPAN ASIC may be used for the interface to the PCI bus. Two LIFO ASICs are used for the interfaces to buses connected to LTM 113. DMA capability is provided for access to the transmit and receive LIFOs in the LIFO ASICs.

6.7 Delivery Unit Cards; BCM

Figure 20:
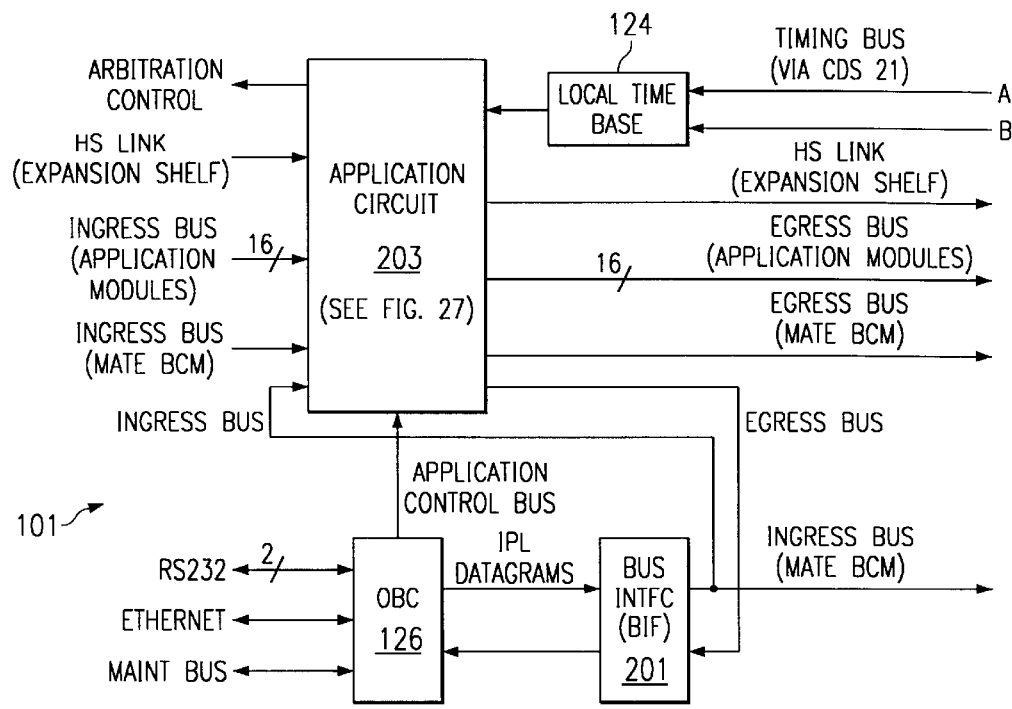
FIG. 20 is a block diagram of the BCM (bus control module) of FIG. 1.

FIG. 20 is a block diagram of BCM 101. BCM 101 uses the common local timebase 124 and OBC 126 discussed above in connection with FIG. 12. However, BCM 101 uses a BIF 201 that is a subset of the standard BIF 125. BIF 201 does not terminate STM subframes, but it does provide access for OBC 126 to ingress and egress buses for transport of iPL subframes.

The application circuit 203 of BCM 101 provides four primary SBB-LS functions. First, it multiplexes data received on ingress buses from all application cards 102–106 to a common egress bus for transport to all application cards 102–106. Second, it controls ingress bus access for STM subframes via STM enable signals. Third, it controls ingress bus access for iPL subframes via grant signals generated by arbitration circuits in response to access request signals. Fourth, it distributes timing in one direction by receiving system timing signals from STGS 115 (via CDS 21) and delivering them to application cards 102–106, and in the other direction by delivering reference timing signals to CDS 21 for delivery to STSG 115.

As stated above in the section entitled "Delivery Unit Cards; Standard Circuits", the OBC 126 of BCM 101 has a micro-processor based LLMB interface 136 (see FIG. 13) for connecting to a low level maintenance bus (LLMB). The primary function of the LLMB is to provide a means for Unit controller 104 to reset BCM 101. Low level maintenance communications may be also accommodated, such as for fault isolation. The LLMB is a serial communications link and the physical interface is RS-485 compatible.

The network transport functions of BCM 101 are discussed below in the section entitled "Network Data Transport; BCM Transport". The control data transport functions of BCM 101 are discussed below in the section entitled "Control Data Transport and Fault Coverage".

If delivery unit 10 has an expansion shelf 10b, both BCMs 101 are equipped with special circuitry for a high speed intershelf link.

7. Network Data Paths; Overview

Figure 21:
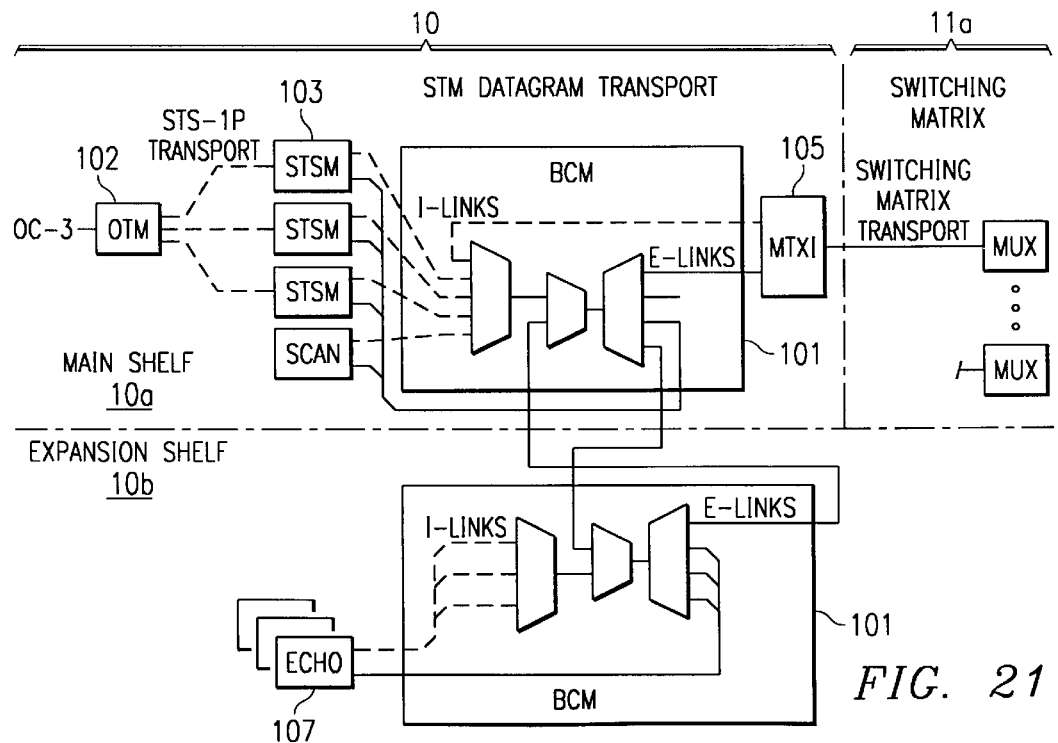

FIG. 21 illustrates the transport within delivery unit 10 of public switched network (PSN) data. This data is referred to herein as "network data". The term "network data" identifies signals that carry DS0 data. Within delivery unit 10, network data is carried on STM subframes (see FIG. 7) and is distinguished from "control data" carried in iPL subframes (see FIGS. 9 and 10). Transport of control data is discussed below in the section entitled "Control Data Transport and Fault Coverage".

Network signals arriving at a termination unit (OTM 102 and STSMs 103) from the PSN are de-multiplexed to individual DS0 channels and transported to switching matrix 11a or to a DSP unit 106 or 107 for signal processing. The transport structure within delivery unit 10 is referred to herein as the SBB-LS (system building block—low speed) transport structure. After switching, the SBB-LS transport structure transports the DS0 channels back to a termination unit (OTM 102 or STSM 103).

As indicated in FIG. 21, at BCM 101, E-links are connected so that data carried on I-links can be multiplexed to E-links. For each shelf 10a or 10b, this arrangement provides total connectivity between all application cards connected to a BCM 101. That is, all application cards 102–106 on the primary shelf 10a have this connectivity to their local BCM 101; and the application card 107 on the secondary shelf has this connectivity to its local BCM 101.

FIG. 22 illustrates network data transport through delivery unit 10, showing both inbound and outbound data paths. Referring to both FIGS. 1 and 22, in the inbound direction, OC-3 optical signals and STS-3 section and line overhead signals are terminated at OTM 102. The three STS-1 SPE signals are mapped into STS-1P frames, using standard SONET pointer processing, for transport to STSMs 103. Each STSM 103 terminates the STS-1 path and processes the payload to extract DS0 channels. The DS0 channels are mapped into STM subframes and transported to MTXI 105 or to a DSP card 106 or 107 via BCM 101. At a DSP card 106 or 107, STM subframes are terminated and the DS0 signals are processed. DS0 signals processed by DSP card 106 or 107 are mapped into STM subframes. MTXI 105 receives the processed STM subframes, terminates them by extracting the DS0 channels, and maps the DS0 signals into the switching matrix format.

In the outbound direction, MTXI 105 terminates the switching matrix format. It maps DS0 channels into STM subframes. DS0 channels received at an STSM 103 are multiplexed into the appropriate higher level signal (DS1, DS3, or VT1.5). These signals are mapped into STS-1 SPE signals. The STS-1 SPE signals are then mapped into STS-1P frames for transport to OTM 102. At OTM 102, the STS-1P frames are mapped into standard STS-3 frames. The resulting STS-3 frames are converted to an optical signal for transport to the PSN.

For each application card 102–107, BCM 101 provides low level control and bandwidth allocation for network data transport.

7.1 Network Data Transport; BIF Transport

FIG. 23 illustrates network data transport between BCM 101 and application cards that handle STM network data (STSMs 103, MTXI 105, and DSP card 106) via their local BIFs 125. As explained above in connection with FIGS. 12, 15, 16, and 18, STSM 103, MTXI 105, and DSPs 106 and 107 each have a standard BIF 125.

Each BIF 125 has an ingress BIF 125a and an egress BIF 125b. The ingress BIF 125a sends STM subframes to BCM 101 on the ingress bus (I-links). The egress BIF 125a receives STM subframes from BCM 101 via the egress bus (E-links) Transport from ingress BIFs 125a on I-links is controlled by BCM 101. BCM 101 combines data transported on all links to form the egress bus (E-links) for transport to egress BIFs 125b.

At ingress BIF 125a, ingress application interface (IAP) 231 receives DS0 channels from the card's application circuit (see FIG. 12) as a 9-bit data stream, where each 9 bits comprises an 8-bit DS0 channel and a parity bit. A frame signal and a data valid signal are transported with the received data so that a variable number of channels (2048 maximum) and bus rates (16.384 MHZ maximum) can be accommodated at the input to IAP 231.

IAP 231 terminates the received DS0 parity and creates STM channels to carry the DS0 channels. Each STM channel is 10 bits wide, and consists of the DS0 data for that channel, a path verification (PV) bit, and a parity bit covering the other 9 bits (see FIG. 7).

IAP 231 performs a path verification generator function by inserting a PV bit into each channel of an STM subframe. As discussed above in connection with FIGS. 7 and 8, over a 48 frame superframe, the PV bits form a 48 bit "PV word". The PV bit may be part of the framing pattern, the START bit, or the STOP bit, and is inserted in its proper position relative to the superframe. The values inserted in the PV valid, PV code, and A/B plane fields are maintained by OBC 126 and are read from a PV code RAM 231a. RAM 231a has a location for each of the 2048 channels accommodated by ingress BIF 125a. A parity bit covering the 8 DS0 data bits is generated and stored in the ninth bit as data is written into RAM 231a by the local OBC 126. The parity bit is checked as the data is read, and parity errors are reported to the local OBC 126 through registers in ingress BIF 125a.

Ingress multiplexer 232 receives the 10-bit wide STM channels from IAP 231. The parity bit is checked and errors are reported. Although parity carried in the STM channels is tested at ingress multiplexer 232, STM channel parity is not generally supported. The count of STM channels received within a frame period is incremented as the channels are received, and the received count is compared with an ingress channel count register loaded by the local OBC 126.

An ingress channel number error is generated for access by OBC 126 if the two counts do not match. Clock and frame signals used to transport data from IAP 231 to ingress multiplexer 232 are also monitored and clock and frame errors are reported when they are detected.

Ingress multiplexer 232 maps STM channels into STM datagrams that carry 48 STM channels (see FIG. 7). As described above in connection with FIG. 7, the STM subframes created by ingress multiplexer 232 contain a 3-byte header field, a 60-byte data field, and a 1-byte CRC-8 field covering the other 63 bytes. The first header byte contains a 4-bit PTI code, which is from a register written by OBC 126. The second header byte contains the egress bus slot number that identifies the egress STM subframe. Bus slot numbers are stored in a bus slot table having 50 entries, one for each subframe of an ingress frame. Bus slot table values are maintained by the local OBC 126. The third byte of the header is reserved. Ingress multiplexer 232 has a bus slot enable table for assigning STM datagrams to subframes. As stated above, each ingress frame has a number of subframes for STM datagrams and a number of subframes for iPL datagrams (see FIG. 5). Error conditions associated with bus slot enabling and other error conditions associated with ingress BIF 125a are discussed below in the section entitled "Network Data Fault Coverage; STM Transport".

Ingress multiplexer 232 has a state machine that sequentially reads the header data from the registers and writes the data into an STM subframe buffer. After the header is written, the subframe payload is read from STM FIFO 232a. At this point, because STM datagrams are transported on 8-bit data streams, the received 10-bit data stream is converted to an 8-bit data stream. Using conversion registers, ingress multiplexer 232 maps 48 10b it data slots into 60 8-bit data slots. Parity is checked as data is read from STM FIFO 232a and errors are reported to the local OBC 126. The data is written into the STM subframe buffer. A CRC-8 code is calculated as each byte is written and the CRC byte is written into the buffer following the data.

After the STM subframes are created, ingress multiplexer 232 maps them to ingress bus frames for transport to BCM 101 on I-links. The ingress bus frame has a 32-byte header 40, an 8-byte pad, and 50 subframes that can carry STM subframes or iPL subframes (see FIGS. 4 and 5). Any data that is to be transported in the frame header 40 is stored in a buffer maintained by the local OBC 126. Ingress multiplexer 232 reads the header and writes the header transmit registers. STM datagrams are read from an STM subframe buffer and written into the transmit registers during their assigned subframe. iPL datagrams may be transported in ingress subframes that are not occupied by STM datagrams. Idle datagrams are transmitted in subframes that do not contain STM or iPL datagrams.

Network data transport within BCM 101 is described below in the section entitled "Network Data Transport; BCM Transport". As explained therein, BCM 101 controls access to the ingress bus and combines data for transport on the egress bus.

Each application card receives the data at its egress BIF 125b. A redundant path combiner (RPC) 236 terminates E-links from BCM 101.

Figure 24:
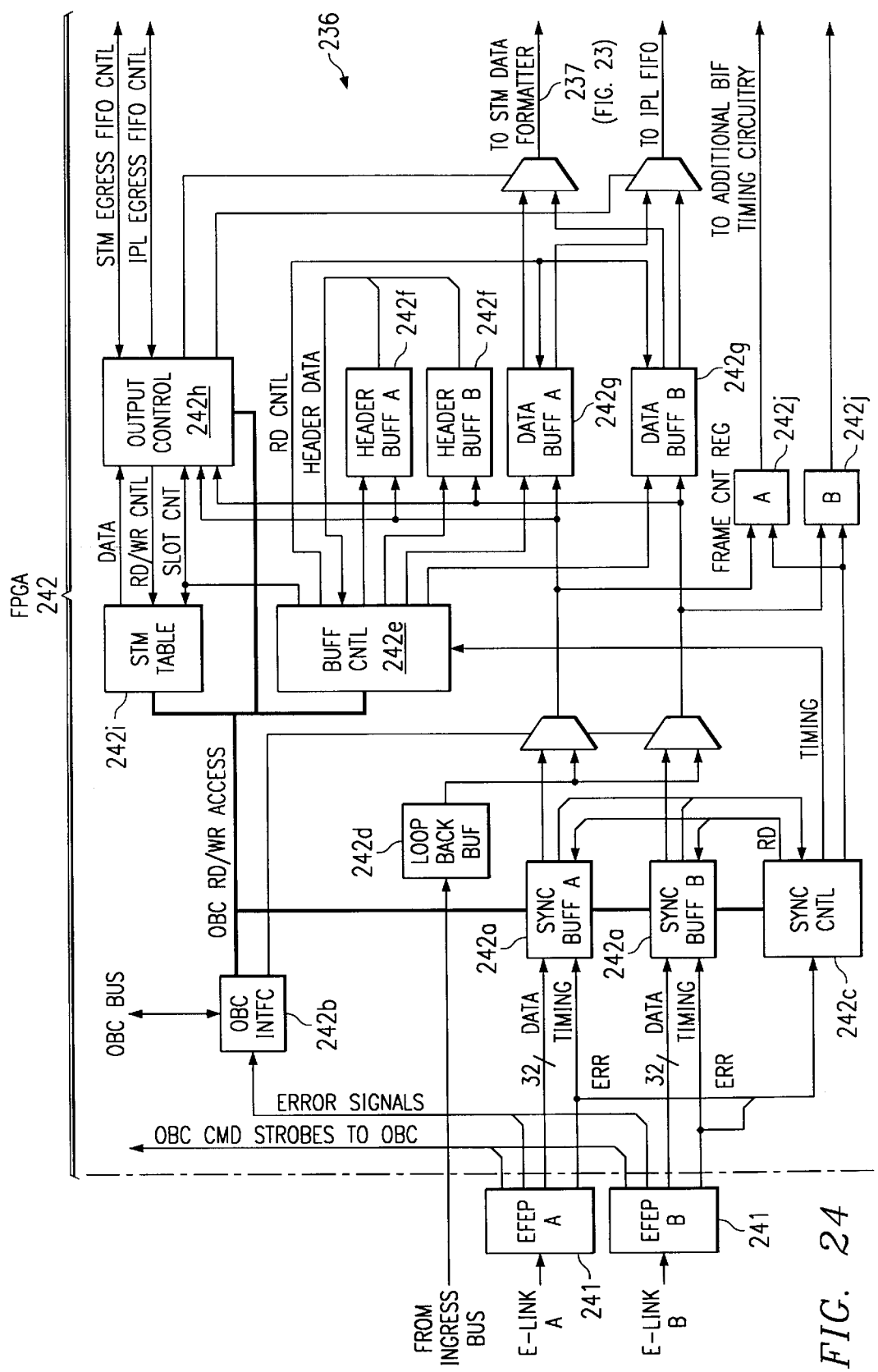
FIG. 24 is a block diagram of the RPC (redundant path combiner) of the egress BIF (bus interface) of FIG. 23.

FIG. 24 is a block diagram of RPC 236 of egress BIF 125b. Egress front end processors (EFEPs) 241 receive E-links from A and B copies of BCM 101. EFEPs 241 locate the frame pattern for the associated egress bus and generate timing signals for the RPC 236. The 16-bit data streams received on the E-links are converted to a 32-bit stream operating at one half the E-link clock rate for transmission to sync buffers 242a. Once frame synchronization is achieved, any bit errors detected in the received frame pattern are reported as pattern errors. If the received frame pattern is not in phase with the EFEP 241, a EFEP frame error is reported. The recovered frame signals are transported to the RPC 236 with the 32-bit wide data stream. Detected error signals are made available to the local OBC 126 via an OBC interface 242b.

The EFEPs 241 decode the device address field and the command field of the frame header (see FIG. 4). The device address field contains two copies of the device address. An EFEP address error is registered when the two copies of the address do not match. If no error is registered and the address matches the physical address of the application card or the global address, the command field is decoded and appropriate signals are transmitted to the local OBC 126. The commands include the following: hard reset, soft reset, restart, and software message present.

A pair of sync buffers 242a receive data from EFEPs 241a. The data are written into sync buffers 242a with timing signals received with the data. Data are read out of sync buffers 242a using a local timebase from sync control 242c, derived from the received timing signals such that the two data streams read from sync buffers 242a are in phase. Registers in sync control 242c permit OBC 126 to define the off-set between the write and read frames of sync buffers 242a and the maximum skew permitted between frame signals received on the A and B copies of the E-links. The phase relationship of the two frame signals is monitored by logic in sync control 242c. An RPC skew error is indicated if the skew between the two frames exceeds that permitted by a maximum skew register. An RPC alignment error is registered if the frame signals read from the A and B sync buffers 242a are not in phase. Also, a counter measures the number of clocks between received frames. An RPC frame error is generated if an incorrect number of clocks occurs between successive frame pulses. These generated error flags and the error flags received from EFEPs 241a are available to the local OBC 126 via OBC interface 242b.

OBC interface 242b has a loopback register that permits the execution of an ingress bus to egress bus loopback. Subframes received from the ingress BIF 125a are continuously written into loopback buffer 242d. When the loopback enable bit is set in the loopback register, subframes are read from loopback buffer 242d rather from than the sync buffers 242a. A loop read alignment error is generated if the frame read out of the loopback buffer is not aligned. A loop write alignment error is generated if the frame written into the loopback buffer is not aligned.

RPC 236 also has a buffer control 242e, which controls the writing of data into the header buffers 242f and the data buffers 242g and also controls the reading of data from the data buffers 242g. Timing for the buffer control 242e is based on timing signals received from sync control 242c. Egress bus headers 40 (see FIG. 4) are written into the corresponding header buffers 242f. The remaining data fields of the egress frames are written into the data buffers 242g. The buffer control 242e also has a bus slot counter, which defines the current egress bus slot number (0 through 201).

Header buffers 242f within RPC 236 are implemented with 32×8 dual port memories. Data in header buffers 242f are accessible by OBC 126 via the OBC interface 242b and buffer control 242e. Data buffers 242g are implemented with 32×32 bit dual port memories, which are organized into two memory pages. Data is read from one page as data is being written into the other page.

RPC 236 also has an output control 242h, which controls the selection of output data from data buffers 242g and controls the steering of data to iPL FIFOs (see FIG. 43) or to data formatter 147 of egress BIF 125b. As SBB subframes are written into buffers 242g, output control 242h monitors the PTI field of the header to determine the subframe type.

For the STM data streams, two STM FIFOs (designated even and odd) are provided in the data formatter 147. STM subframes are alternately written into these FIFOs by output control 242h throughout an egress frame. Data sent from the RPC 236 to the STM FIFOs are transported on 32-bit data paths. Four additional bits generated by the RPC 236 are transported with the data and loaded into the STM FIFOs. These four additional bits include: 1) a start-of-packet bit set to a value of one during the time that the first 32-bit word of each STM subframe is being transported; 2) a start-of-frame bit set to a value of one during the time that the first 32-bit word of the first and second STM subframes of an egress bus frame is being transported to indicate the beginning of the frame; 3) an end-of-frame bit set to a value of one during the time that the last two STM subframes of an egress bus frame is being transported to indicate the last STM subframes carried in a frame; 4) a parity bit generated over the 32-bit data is transported with each STM word. The start-of-packet bit separates data associated with particular datagrams as the data is read from the STM FIFOs. The start-of-frame and end-of-frame bits separate data associated with particular egress frames.

Output control 242h generates a formatter frame signal for establishing the frame phase relationship of the write and read operations of the STM FIFOs. The offset between the egress bus framing and the formatter frame signal is controlled by a formatter frame offset register that is initialized by OBC 126. A formatter offset error is generated if the value written into the offset register is out of range.

Output control 242h also monitors certain frame and subframe overhead signals to determine the integrity of the data received on the egress buses. The results of the monitoring functions and the contents of data written into the STM table 242i and into control registers 242j by OBC 126 determine A/B plane selection and the steering of STM data to STM FIFOs in data formatter 237.

STM table 242i contains a 6-bit value for each of the 202 egress subframes. Three of the bits are control bits that are written by OBC 126. These three control bits are: 1) an STM bit that when set, permits the receipt of STM data in the associated subframe; 2) an STM preference plane bit, which indicates the preferred plane (A or B) from which data is to be selected; 3) an STM plane selection mode bit that enables or disables automatic plane switching when errors are detected on the currently active plane and when set by OBC 126. The remaining three bits indicate RPC slot errors for the egress bus planes and CRC errors. Conditions that cause an RPC slot error, as well as a number of other errors detected within egress BIF 125*b* are discussed below in the section entitled "Network Data Fault Coverage; STM Transport".

Output control 242*h* also performs a discriminator function, which controls A/B plane selection and output data steering. A/B plane selection and steering for STM subframes are based on data in STM table 242*i*. A/B plane selection for STM subframes is discussed below in the section entitled "Network Data Redundancy Control". A/B plane selection and steering for iPL subframes are discussed below in the section entitled "Control Data Transport and Fault Coverage".

The RPC discriminator function of output control 242*h* detects and reports a number of error conditions. An iPL plane error is generated if the iPL destination addresses received on the two planes do not match. An STM number error is generated if more than 170 subframes are programmed for STM data.

FIGS. 25A and 25B illustrate the RPC discriminator function. FIG. 25A is a truth table for the discriminator logic. The 7 columns on the left (Conditions) indicate the status of parameters that affect the selection (read from A or B plane) and steering (written to STM or iPL FIFO) of egress subframes. These parameters are defined in FIG. 25B. An "X" in FIG. 25A indicates that the state of that parameter is a "don't care".

Referring again to FIG. 23, egress BIF 125*b* has a data formatter 237 that receives data from RPC 236. Data formatter 237 has two FIFOs (even and odd), to which data are written using signals generated by output controller 242*h* of RPC 236. Data are read from the FIFOs by data formatter logic. The frame phase of the data is based on a formatter frame signal received from RPC 236. When data is read from the two FIFOs, the start-of-frame signal is monitored to determine that the signals from the FIFOs are in phase. A FIFO data alignment error is generated if the start-of-frame signals are not aligned. The parity bit that covers the 32-bit data is also monitored as data is read from the FIFOs and a data formatter parity error is generated when an error is detected. Both error bits are available to the local OBC 126.

Data formatter 237 has subframe counters that count the number of STM subframes received within an egress bus frame using start-of-packet, start-of-frame, and end-of-frame signals. When the number of subframes is fewer than expected, the remainder of the frame is stuffed with idle subframes.

Data formatter 237 strips the STM subframe headers and CRC-8 fields of the subframes. It converts the 32-bit data streams read from its FIFOs to a RAM-compatible 10-bit STM channel format (see FIG. 7). Parity is generated over the 8 data bits and the PV bit of each channel. A new parity bit is inserted into the parity position of each channel. Two streams of 10-bit STM channels are transported to time slot interchange (TSI) 238.

FIG. 26 illustrates TSI 238 of egress BIF 125*b*. TSI 238 receives two streams (odd and even) of STM channels from data formatter 237. Each stream transports 4096 DS0 channels for a total of 8192 channels. The data streams are composed of STM channels received on the egress bus and Idle channels generated by data formatter 237. Channels carried on each data stream are sequentially written into data mode TSI RAMs 238*a*. The channels are sequentially written using RAM addresses generated by data mode TSI RAMs 238*a*. Each of the TSI RAMs 238*a* can accommodate 4096 channels. Channels are randomly read from data mode TSI RAMs 238*a* using a control mode TSI RAM 238*b*. The control mode TSI RAM 238*b* has a control location for each of the 4096 output timeslots supported by TSI 238. Control data is written into the control locations by OBC 126. The control data is sequentially read using internally generated addresses, and data read from the control locations are used to address locations in data mode TSI RAMs 238*a*. Channels read from these TSI RAMs 238*a* are inserted into the associated timeslot at the output. In this manner, TSI 238 implements a non-blocking 8192 to 4096 DS0 switch.

Referring again to FIG. 23, STM channels (10-bit channels carrying DS0 signals in STM datagrams) from TSI 238 are received by egress application interface (EAP) 239.

EAP 239 also receives a frame signal from data formatter 237 and an enable signal from RPC 236. The enable signal enables the EAP 239 to start processing the received data, and the frame signal indicates the phase of the data stream. The frame signal is carried through EAP 239 and loaded into the egress STM FIFO 239*a* with the data. A maximum of 4096 channels can be accommodated by EAP 239. An egress channel number register determines the actual number of channels supported by a particular application. This register is loaded by OBC 126 during initialization of delivery unit 10.

EAP 239 checks and strips parity and PV bits from the received channels. Parity is generated over the extracted 8-bit DS0 channels and the DS0 channels with parity are loaded into egress STM FIFO 239*a* for transport to the application circuit. PV and parity errors are registered in a status register in EAP 239 for access by OBC 126. The frame signal is monitored and any errors detected are also reported in this status register.

EAP 239 performs a PV monitoring function, implemented as a state machine. This permits it to track channels regardless of their locations in egress subframes, as well as to monitor the PV code for each channel regardless of whether the PV superframes are in phase from channel to channel. Thus, a PV mechanism is provided for each channel (potentially 4096 channels) without global synchronization across channels.

For each channel, EAP 239 monitors PV bits on a bit by bit basis. PV RAM 239*b* stores an expected 20-bit PV code for each of the channels processed by EAP 239. The expected PV code and a PV valid bit are loaded into PV RAM 239*b* by OBC 126 via EAP 239. Parity is generated over data written into PV RAM 239*b* and is checked when data is read out. Parity errors are registered as PV RAM parity errors in the status register.

The PV state machine function of EAP 239 determines the frame phase within the 48 frame PV superframe for each active channel by monitoring for 24 consecutive zeros followed by a one (start bit) (see FIG. 8). Detection of a stuck PV bit is detected by monitoring for 25 consecutive zeros or ones. Once the PV superframe phase is established for a channel, any error in the framing pattern is reported as a PV sync error in the status register. The detection of a stuck PV bit is also reported as a PV sync error.

The current state, including the frame position and synchronization status, for each active channel is maintained in PV state table RAM 239*c*. The table location is updated by the PV state machine of EAP 239 as each channel is processed. A parity bit is generated over the 8 bit data field and written with the data as PV state table RAM 239*c* is updated. Parity is checked when data is read from RAM 239c and any error is registered as a PV state table parity error in the status register. A PV state table parity error is also reported when an error is detected in the course of off-line accesses by OBC 126. Data stored in PV state table RAM 239c are used by the PV state machine of EAP 239 for acquiring synchronization, monitoring the framing pattern, and locating and verifying PV codes.

After synchronization is achieved, the PV valid bit (frame 26 of the PV superframe; see FIG. 8) and the PV valid bit stored in PV RAM 239b are monitored. If both PV valid bits are set, the received PV code is compared with the expected PV code in PV RAM 239b. Monitoring of the PV code is inhibited if either of the PV valid bits is not set. PV errors are reported in a register accessible by OBC 126. Fault coverage associated with PV monitoring is discussed further in the section entitled "Network Data Fault Coverage; STM Transport".

After EAP 239 terminates the STM channels and extracts DS0 signals, the DS0 signals are available to the card's application circuit for processing.

7.2 Network Data Paths; BCM Transport

Figure 27:
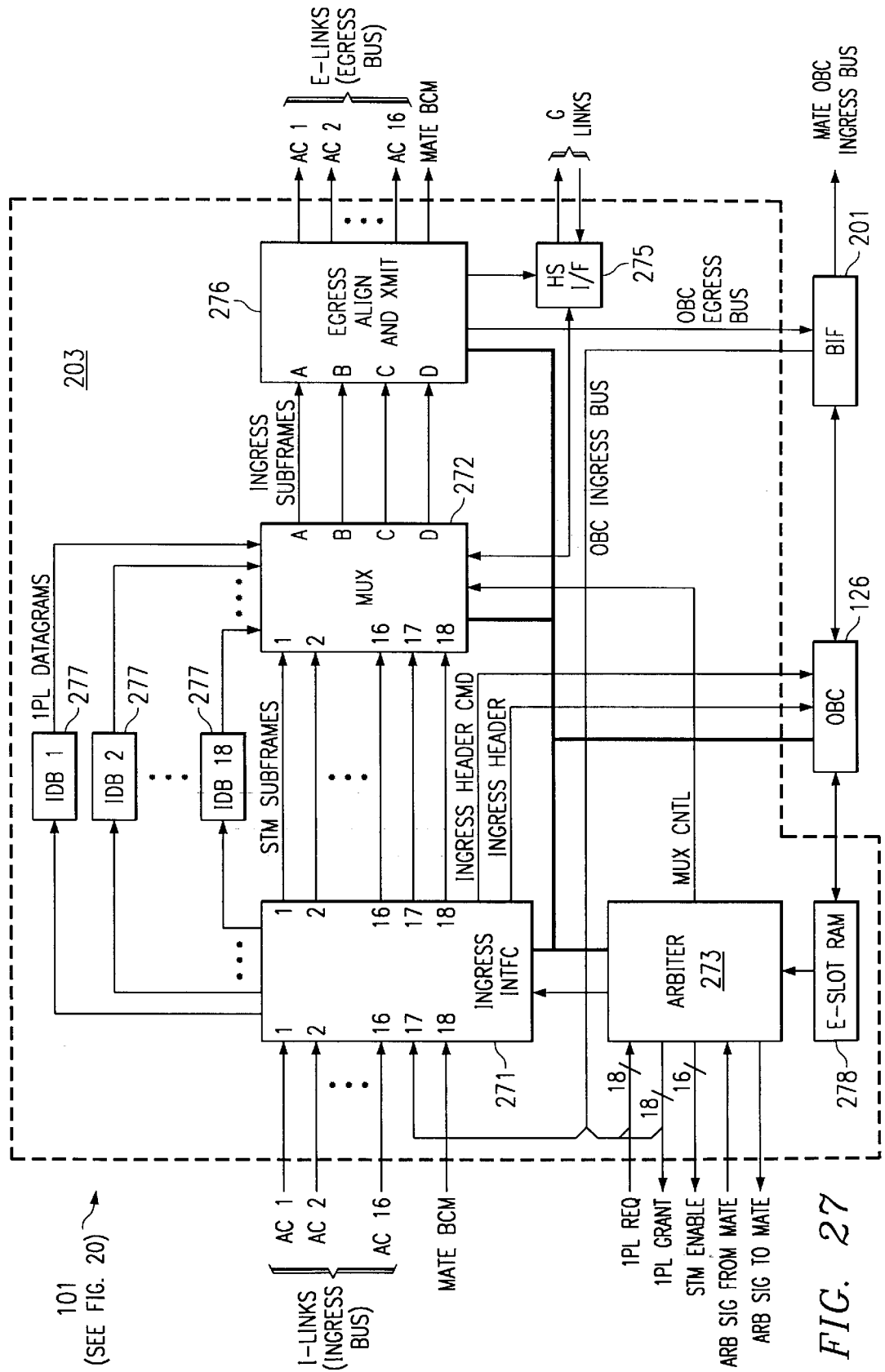
FIG. 27 illustrates network data transport within the BCM.

FIG. 27 illustrates network data transport within BCM 101. The OBC of BCM 101 is implemented with the SBB common OBC circuit with the addition of a LLMB interface 136 (see FIGS. 12 and 13A). OBC 126 communicates with other cards of delivery unit 10 by originating and terminating iPL subframes that carry control messages. BIF 201 is a subset of the common BIF 125, in that it handles iPL subframes but not STM subframes. As explained in the section entitled "Control Data Transport and Fault Coverage", iPL datagrams from OBC 126 are sent through BCM 101 and distributed back to BCM 101 as well as to application cards 102–106.

BCM 101 has an ingress interface 271, which terminates a maximum of 18 ingress buses. The ingress bus connections include a connection from the local BIF 201, from the BIF of the mate BCM 101, and connections from as many as 16 application cards. Connections from application cards transport both STM and iPL datagrams but the connection from the local BIF 201 and mate BIF transport only iPL datagrams. Clock and frame signals are monitored for each ingress bus and detected errors are made available to mux 272 and to OBC 126.

Ingress interface 271 extracts the ingress bus header (see FIG. 4) and makes it available to OBC 126. The header's command field and command address field are decoded and appropriate signals are sent to OBC 126 when a command addressed to the BCM 101 is received. Subframes received on all of the active ingress buses are retimed to the local BCM timebase 204 and transported to mux 272. Various error detection functions of ingress interface 271 are discussed below in the section entitled "Network Data Fault Coverage; STM Transport".

Certain fields of the received subframes are monitored to assure data integrity and proper synchronization of the application cards. Specifically, for STM subframes, the PTI, egress slot number, and CRC fields (see FIG. 7) are monitored. The expected PTI and egress slot number are passed to ingress interface 271 by arbiter 273. The received PTI and egress slot number are compared to the expected values. A CRC-8 code is calculated and compared with the received CRC-8. When errors are detected, they are registered for access by OBC 126. Errored subframes are replaced with an Idle subframe in mux 272.

Mux 272 receives subframes from ingress interface 271. It may also receive subframes from expansion shelf 10b via a HS interface (HS I/F) 275. Received subframes are multiplexed to four buses (A, B, C and D) by four multiplexer circuits in mux 272, under control of signals generated by arbiter 273. Subframes on the four buses are transported to the egress align and transmit unit 276, which maps them to the egress bus.

Mux 272 applies STM subframes from the 16 application cards in its local shelf directly to its registers for access by its four multiplexer circuits. iPL datagram buffers (IDBs) 277 store local iPL subframes until they are selected for transmission. An IB 277 capable of storing one subframe is provided for each of the 18 ingress buses. Data received from an expansion shelf contains both STM and iPL subframes because arbitration has been accomplished by the BCM 101 of the expansion shelf. Subframes received from the expansion shelf are applied directly to registers in the same way as STM subframes. Each of the four multiplexer circuits of mux 272 has access to the STM data registers associated with its local shelf, the expansion shelf data register, and the IDBs 277, such that non-blocking access to the A, B, C and D buses is achieved.

Mux 272 loads the output of each multiplexer circuit into a separate 64-byte subframe buffer, where the 8-bit ingress data path is converted to a 16-bit egress data path. When no input datagram is selected for an egress slot or when an error is registered for a STM datagram, an Idle datagram is inserted in the subframe buffer. The Idle datagram is loaded from registers in mux 272 that are maintained by OBC 126. The CRC-8 for Idle datagrams is generated by OBC 126 and loaded into the Idle datagram registers with the header and payload fields. In this manner, Idle subframe insertion is under control of OBC 126.

Egress align and transmit unit 276 creates egress frames by multiplexing subframes received on the four buses generated by mux 272 into the frames. Frame signals received with the four mux data streams are compared to detect framing errors, and any errors are reported to OBC 126. Each egress frame is created based on timing signals received via local timebase 124 (see FIG. 20). Received timing signals are monitored, and errors are reported to OBC 126. Egress align and transmit unit 276 inserts the egress frame pattern into the frame pattern field of the frame header (see FIG. 4). It inserts the frame count generated by local timebase 124 (see FIG. 20) into the header's frame count field. Data for the header's device address, command code, and message data fields (see FIG. 4) are read from a buffer loaded by OBC 126. It is at this point, that software-defined control messages (typically from unit controller 104 to BCM 101) may be inserted so as to provide an alternative to iPL transport for control messages. The CRC code of each egress subframe (see FIGS. 7 and 9) is monitored and errors are registered for access by OBC 126.

Egress frames assembled by egress align and transmit unit 276 are fanned out for transport on 19 buses. Sixteen egress buses and associated timing signals are connected to sixteen slots for application cards in the local shelf.

Also, an egress bus is connected to BIF 201 for transport to the local OBC 126, an egress bus is connected to the mate BCM 101, and an egress bus is connected to HS I/F 275 for communication with an expansion shelf 10b.

BCM 101 has an arbiter 273, which controls assignments of STM subframes to egress subframes. It also controls access to both the ingress and egress busses for iPL subframes, as discussed below in the section entitled "Control Data Transport and Fault Coverage".

For STM subframes, each copy of BCM 101 (A and B) independently allocates the subframes for egress transport based on a table stored in E-slot RAM 278. E-slot RAM 278 provides a control word for each of the 202 egress subframes. The control word contains a STM bit, which indicates that the associated egress subframe can transport STM data, and a source field, which indicates the source ingress bus for the STM subframe. When the STM bit is set, the numbers 0 through 15 identify one of the 16 application cards as the source. When the source field value is greater than 15, the source is the expansion shelf 10*b*. When the STM bit is not set, an iPL datagram may be selected for transport in the subframe. As stated above, each egress frame has a number of subframes for STM datagrams and a number of subframes for iPL datagrams (see FIG. 6).

Arbiter 273 accesses E-slot RAM 278 prior to the occurrence of the egress subframe, and, if the STM bit is set, sends out an STM enable signal on the ingress bus identified by the source field. The STM enable signal is used by an application card to assure that the ingress subframe assignments for STM subframes, as defined by that card and by BCM 101, agree. In operation, an application card's ingress BIF 125*a* accesses a local STM enable table to obtain a local assignment, compares its assignment with the STM enable signal from BCM 101, and registers an error if the two signals do not agree.

When a subframe arrives at ingress interface 271, arbiter 273 delivers an arbiter control signal to ingress interface 271 and to mux 272. The arbiter control signal to ingress interface 271 includes an STM enable bit, the I-link number, and the E-slot number of the egress subframe. The arbiter control signal to mux 272 includes an STM enable bit and the I-link number. Because four egress subframes are processed simultaneously by four circuits of mux 272, four sets of arbiter control signals are sent during each ingress subframe time. At ingress interface 271, the value of the STM enable bit and value of the E-slot number from arbiter 273 are compared to the PTI field and egress slot number in the header of the incoming subframe identified by the I-link number. Errors are generated if the corresponding fields do not match. At mux 272, the arbiter control signal associated with a particular egress subframe is sent to the multiplexer circuit assigned to that subframe. If the STM enable bit of the mux arbiter control signal is set, STM data from the ingress bus identified by the I-link number (or data from expansion shelf 10*b*) are selected for transport on the egress bus.

As explained below in the section entitled "Control Data and Fault Coverage", arbiter 273 also assigns iPL subframes to egress slots. In this manner, BCM 101 receives ingress bus frames containing both iPL and STM datagrams from all application cards 102–106. It combines subframes from four different application cards (on four ingress frames) onto the egress bus. Thus, the bandwidth on the ingress side (50 8-bit channels×25.92 MHZ) is multiplexed to the bandwidth on the egress side (202 16-bit channels×51.84 MHZ) (see FIGS. 5 and 6). The egress bus capacity is 8160 channels carried in egress frames(see FIG. 18). The capacity of an application card to receive egress frames is defined by the card's egress BIF 125*b* capacity of 4096 channels (see FIG. 23).

If delivery unit 10 has one or more expansion shelves, such as shelf 10*b*, BCM 101 uses high speed links for intershelf communications. Egress frames are transported between the two shelves on fiber optic media operating at 1.03 gigabits. A high speed link interface (HS I/F) 275 is composed of an egress formatter, a serial transceiver, an optical converter, and a dual port buffer. In the outbound direction, HS I/F 275 translates egress bus signals to a 16-bit data stream compatible with the low speed side of a G-link for transport on the high speed links. The G-link converts the parallel data stream to a bit serial data stream. The optical converter converts the electrical signal to an optical signal for transport to the expansion shelf 10*b*. For signals received from another shelf, HS I/F 125 converts them from optical to electrical, translates them to a 16-bit wide data stream, extracts the egress frame, and formats the subframes for delivery to mux 272 via the dual port buffer.

7.3 Network Data Paths: OTM Transport

As described above in connection with FIG. 14, in the inbound direction, OTM 102 terminates OC-3 SONET signals. It terminates section and line overhead fields and maps the three STS-1 payloads into STS-1P frames. In the outbound direction, it maps STS-1 SPE data carried in three STS-1P frames into an STS-3 frame. Low level administration, maintenance and control functions for OTM 102 are provided by a standard OBC 126 (see FIGS. 12 and 13), which communicates with unit controller 104 via BCM 101 using iPL datagrams. BIF 143 of OTM 102 is a subset of the standard BIF 125 because it accommodates iPL datagrams but not STM (DS0 network data) datagrams.

Figure 28:
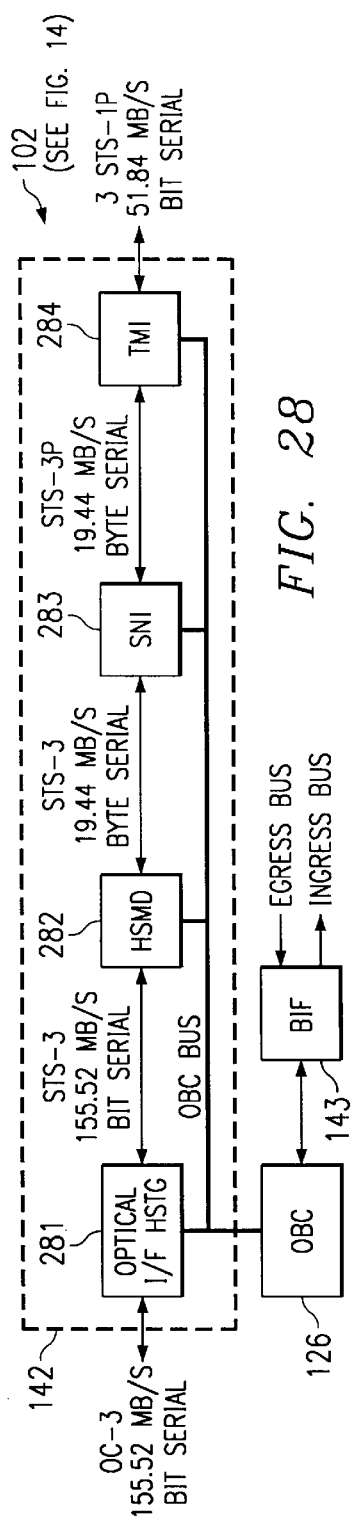
FIG. 28 illustrates network data transport within the OTM.

FIG. 28 illustrates network data transport through OTM 101. In the inbound direction, an optical transceiver 281 receives an OC-3 signal and converts it to a bit-serial data stream. A 155.52 MHZ clock is recovered. The received power level and loss-of-signal (LOS) are monitored and made available to OBC 126 via an A/D converter. The bit-serial data stream and recovered clock are transported to high speed multiplex/demultiplex (HSMD) 282. In the outbound direction, optical transceiver 281 uses a laser driver modulated by a bit-serial data stream from HSMD 282 to generate the OC-3 signal. The laser bias point, the transmitted optical power, and the transceiver temperature are monitored and made available to OBC 126 through an A/D converter.

HSMD 282 receives the inbound 155.52 Mb/s bit stream and associated clock from optical interface 281 and converts the bit-serial data into byte-serial data for transport to synchronous network interface (SNI) 283. In the outbound direction, HSMD 282 receives a 19.44 Mb/s byte-serial data stream from SNI 283 and converts the byte-serial data to 155.52 Mb/s bit-serial data for transmission to optical interface 281.

Synchronous network interface (SNI) 283 generates and terminates STS-3 signals on the network side and generates and terminates STS-3P signals on the system side. More specifically, in the inbound direction, SNI 283 receives a STS-3 signal from HSMD 282 via a byte-serial data stream with a 19.44 MHZ clock. The section and line overhead are terminated and path overhead is monitored for performance and alarms. The non byte-aligned signal from HSMD 282 is framed and optionally unscrambled. Loss-of-signal (LOS), loss-of-frame (LOF), and section and line BIP-8 are monitored. Filtering of K1 and K2 line overhead bytes is provided and the results are passed to OBC 126 for automatic protection switch (APS) processing. Other fields of the section and line overhead are made available to OBC 126 via appropriate registers. After path processing, the three STS-1 frames are multiplexed to a STS-3P signal for transport to TMI 284. Proprietary signals carried in the STS-3P overhead field, used for error detection, are discussed below in the section entitled "Standards-Based Fault Coverage; Detailed".

SNI 283 interprets the received STS pointer (Hi and H2) to locate the STS-1 SPEs for path monitoring. The following STS path monitoring capability is provided for each of the three STS-1 signals: 1) An 8 register set is provided for monitoring the J1 trace. 2) An OBC register stores the expected C2 signal label. The received signal label is compared to the expected value. Miscompares are reported to the OBC 126. 3) Access to all STS path overhead fields by the OBC 126 is provided. Parity is generated over the byte wide STS-3P data streams as the data is transmitted from the SNI. The byte serial data and associated parity, frame sync, J1 sync, and SPE indicator signals are transported to the TMI 284 using a 19.44 MHZ clock.

In the outbound direction, SNI 283 receives a STS-3P signal from TMI 284 via a byte-serial data stream with a 19.44 MHZ clock. Associated parity, frame sync, J1 sync, and SPE indicator signals are received with the data. The parity signal is monitored and the result is made available to OBC 126. The frame sync is used to locate the section and line overhead fields of the STS-3P signal. The J1 sync and SPE indicator are used to locate the STS-1 SPEs. A failure of timing signals received from TMI 284 causes PAIS to be generated outbound. SONET section and line overhead fields are inserted into the STS-3P frame to create a standard STS-3 frame. H1, H2 and H3 bytes received from TMI 284 are transmitted through SNI 283 as received but other section and line overhead fields are overwritten. Values for A1, A2, B1 and B2 are generated by SNI 283. The source for other bytes of the section and line overhead is generally provided by registers controlled by OBC 126. Certain outbound STS path overhead fields are also overwritten by SNI 283. Because H4 contains the multiframe indication, it is not overwritten. B3 is generated by hardware circuits and bits 1 through 4 (REI-P) of the G1 field are hardware generated if the REI-P function has been enabled. Other bits in the G1 field are sourced by registers controlled by OBC 126. All other STS path overhead fields are sourced by OBC-controlled registers.

Triple matrix interface (TMI) 284 generates and terminates a STS-3P signal on the network side. It generates and terminates three STS-1P signals on the system side. The primary inbound function of TMI 284 is the retiming of the STS-1 SPEs to system timing. The primary outbound functions are the monitoring of redundant STS-1P signals and the selection of one of the signals for processing and multiplexing to the outbound STS-3P.

More specifically, in the inbound direction, TMI 284 receives a STS-3P signal from SNI 284 on a byte-serial data stream operating at 19.44 Mb/s. A parity bit covering the 8 data bits, a frame sync, a J1 sync, and a SPE indicator are transported with the STS-3P data. The frame sync is used to locate the proprietary STS-3P overhead byte in the C1 section overhead position. The J1 sync and SPE indicator signals are used to locate the STS-1 SPEs. The role of TMI 284 in monitoring the parity bit and the proprietary STS-3P overhead byte are discussed below in the section entitled "Standards-Based Fault Coverage; Detailed".

TMI 284 creates three pseudo STS-1 frames based on system timing. The 3 STS-1 SPEs are mapped into the newly created frames through an elastic buffer using SONET pointer processing. The overhead fields defined for proprietary STS-1P frames are initialized for each frame. The section and line overhead contain A1, A2, H1, H2, and H3 fields consistent with the SONET standard. Proprietary signals are inserted in the B2 and K1 fields on the line overhead. EC-BIP covering the STS-1P Line is inserted into the B2 field and a control code is inserted into the K1 field. The broadband channel identification (BCID) code defined for STS-1P frames is not used. The control code contains the STAI bit that controls the automatic protection switch (APS) function provided at STSMs 103, discussed below in the section entitled "Network Fault Coverage; Detailed".

The STS-1P frames generated on TMI 284 are converted to a bit serial format and transmitted to the STSMs 103 at a 51.84 Mb/s rate. For redundancy, duplicated copies of the three signals are generated for transport to the redundant (A and B) copies of STSMs 103.

In the outbound direction, TMI 284 receives a STS-1P signal from the A and B copies of each of the 3 STSMs 103 connected to OTM 102. All six of the received signals are framed to determine the phase of the signal. The phase of the signals are aligned with the local TMI outbound timebase through elastic buffers so that error-free plane switching can be accomplished. Received clock errors, frame errors, and EC-BIP are monitored for each signal. One copy of each of the three STS-1P signals is selected as the active copy, based on the results of the error monitoring. outbound fault coverage is discussed below in the section entitled "Network Data Fault Coverage; Detailed". The 3 STS-1P signals are multiplexed to a STS-3P signal for transport to SNI 283 on a byte-serial data stream. Parity is generated across the bytes of the data stream and the parity bit, a frame sync, a J1 sync and a SPE indicator are transmitted with the data.

TMI 284 has a servo circuit, which permits a variable off-set between inbound and outbound framing. The off-set can be defined to minimize transport delay through OTM 102.

7.4 Network Data Paths; STSM Transport

Figure 29:
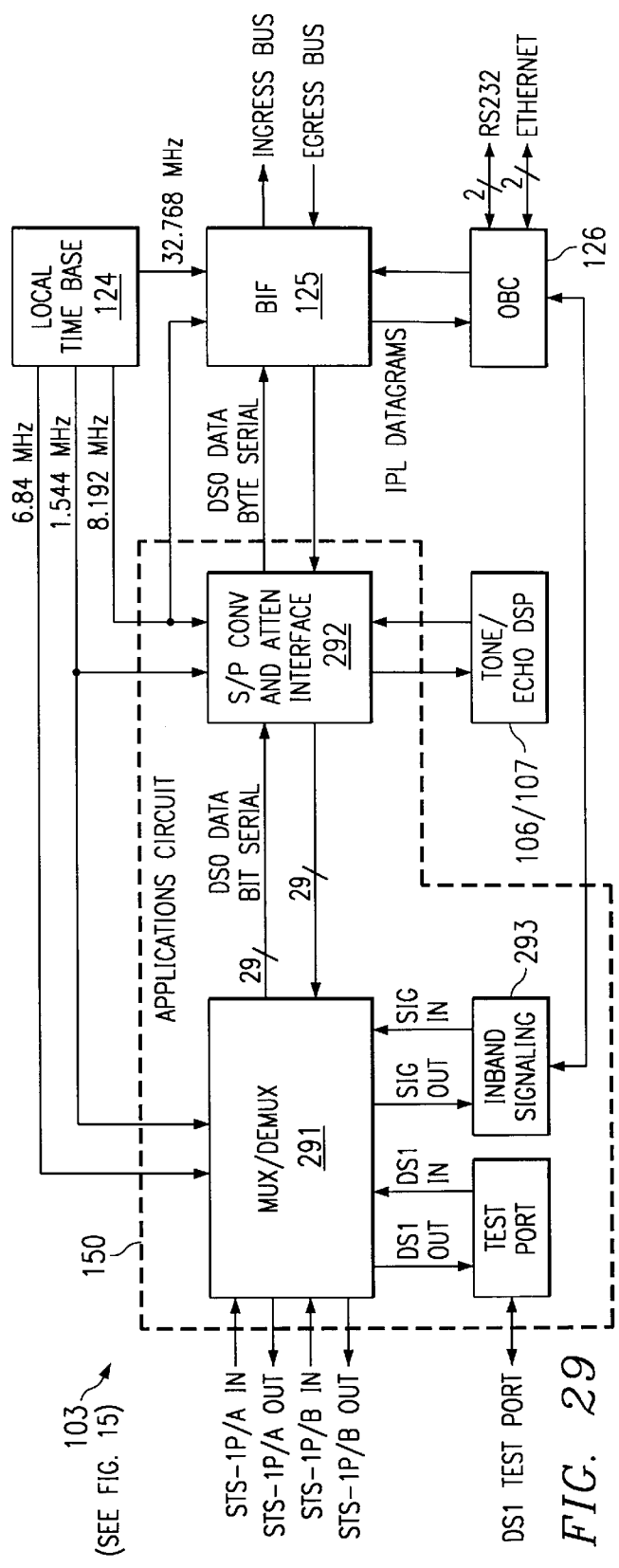
FIG. 29 illustrates network data transport within an STSM.

FIG. 29 illustrates network data transport within an STSM 103. As stated above in connection with FIGS. 1 and 15, in the inbound direction, STSMs 103 terminate the payloads of STS-1P signals arriving from OTM 102 and extracts DS0 signals carried in the payload using mux/demux 291. Extracted DS0 signals are transported to serial/parallel (S/P) converter and attenuation interface unit 292 on 28-bit serial data streams. In the outbound direction, DS0 signals are received at mux/demux 291 from converter/attenuator 292 on serial data streams. DS0 signals are processed through several multiplex levels for mapping into the outbound STS-1P signals.

Figures 30, 31A, 31B:
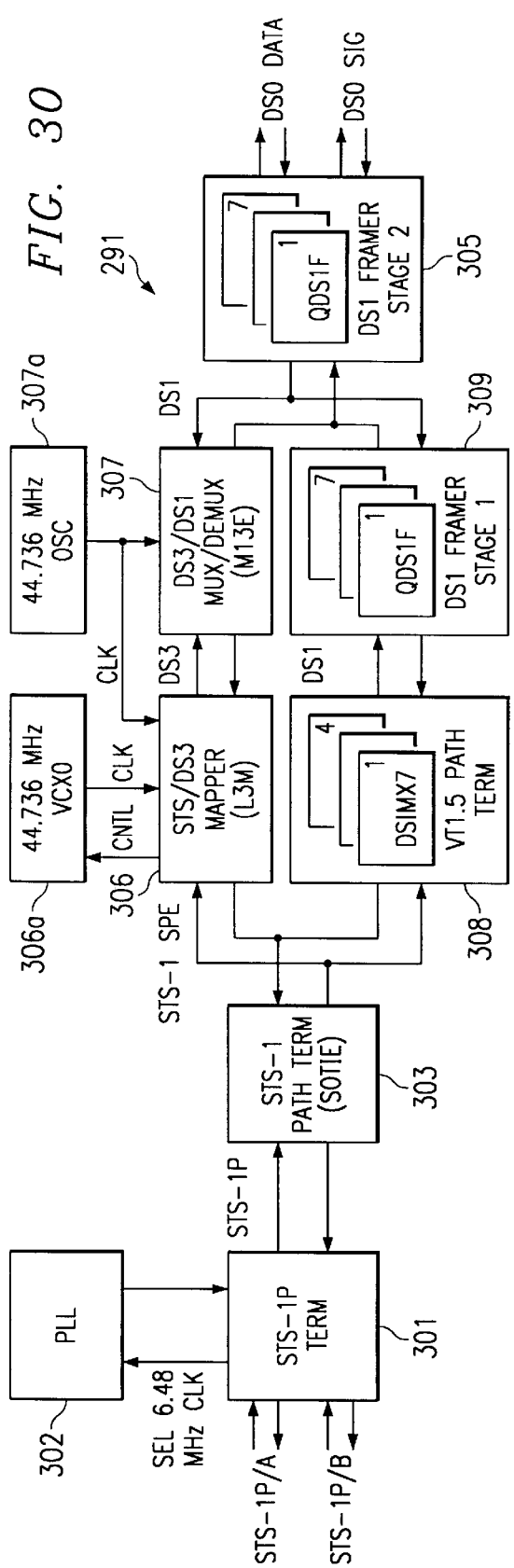
FIG. 30 is a block diagram of the mux/demux of FIG. 29.
FIG. 31A illustrates the "channel word" format for matrix transport.
FIG. 31B illustrates the superframe bit sequence for PIBs (path integrity bits) for matrix transport.

FIG. 30 is a block diagram of the mux/demux 291 of FIG. 29. Mux/demux 291 processes three types of payloads: 1) STS-1 SPEs carrying DS3 signals; 2) asynchronously mapped VT1.5 signals, and 3) byte-synchronously mapped VT1.5 signals. All three payload types are processed through STS-1P terminator 301, STS-1 path terminator 303, and stage 2 DS1 framer 305. SPEs carrying DS3 signals are processed through STS/DS3 mapper 306 and DS3/DS1 mux/demux 307. SPEs carrying VT1.5 frames are processed through VT1.5 path terminator 308 and stage 1 DS1 framer 309. The VT1.5 path terminator 308 and stage 1 DS1 framer 309 operate in different modes depending on the VT1.5 mapping.

STS-1P terminator 301 has two primary functions: 1) conversion between the STS-1P signals connected to OTM 102 and the STS-1 signals connected to STS-1 path terminator (SOT1E) 303, and 2) A/B plane selection for STS-1P signals received from the redundant OTM 102. Thus, STS-1P terminator 301 is a termination point for the proprietary STS-1P signals that connect STSMs 103 to OTM 102. It provides inbound redundant plane selection and APS, based on control signals generated by OBC 126 and the status of the received signals. It supports full section and line termination and performance monitoring (PM) capability in the outbound direction. Full STS-1 path PM is also provided by the STS-1P terminator 301. However, a limited selection of the capability is used for internal fault coverage since STS-1P terminator 301 is an intermediate transport point within delivery unit 10.

For the inbound data path, STS-1P terminator 301 receives an STS-1P signal from the A and B copies of OTM 102. The frame pattern carried in A1 and A2 is located to determine the phase of the received signals. The phase of the received signals is aligned with local timing through elastic buffers. One of the 51.84 MHZ clocks (A or B) received with the inbound STS-1P signals is selected and used to derive a 6.48 MHZ clock. This clock is then used as a reference to PLL 302, which generates a 51.84 MHZ clock that provides inbound timing.

STS-1P terminator 301 monitors a number of error conditions on both copies of the received STS-1P signals.

The fault coverage provided by STS-1P terminator 301 is discussed below in the section entitled "Network Data Fault Coverage; Detailed". STS-LP terminator 301 terminates proprietary STS-IP overhead and creates a pseudo STS-1 signal (non-standard section and line overhead) for transport to SOT1E 303. The A1, A2, H1, H2 and H3 fields of the STS-1P frames are valid. The B1 and B2 fields are inserted by hardware circuits. The content of the J0/Z0, E1, F1, D1–D12, K1, K2, Z1, Z2 and E2 fields are controlled by OBC 126 through registers provided in STS-1P terminator 301, but these fields are ignored by SOT1E 303. The resulting STS-1 frame is converted from byte-serial format to bit-serial format and transported to SOT1E 303.

For the outbound data path, STS-1P terminator 301 receives a STS-1 SPE carried in a bit serial STS-1 frame format from SOT1E 303. STS-1P terminator 301 provides full STS-1 section and line termination and STS-1 path performance monitoring capability, but a subset of the capability is used for internal fault coverage. Fault coverage performed by STS-1P terminator 301 is discussed below in the section entitled "Network Data Fault Coverage; Detailed". The received signal is framed and the STS pointer is interpreted to locate the SPE overhead. STS-1P terminator 301 inserts the STS-1 framing pattern into the A1 and A2 fields. EC-BIP is calculated and inserted into the B2 field. STS-1P control and BCID data are inserted into the K1 and K2 fields, respectively, to create the STS-1P frame. The STS-1P signal is transmitted to the A and B copies of OTM 102 on separate bit serial data streams.

STS-1P path terminator (SOT1E) 303 terminates (inbound) and originates (outbound) STS-1 SPEs. SOT1E 303 provides section and line termination capability in both directions of transport, but it operates in an SPE-only mode. STS-1 path termination and path performance monitoring are also provided. Only B3 of the path overhead is monitored because path performance monitoring is performed on the OTM 102.

More specifically, in the inbound direction, SOT1E 303 receives pseudo STS-1 signal from STS-1P terminator 301 on a bit-serial data stream. This signal is framed and the pointer is interpreted to locate the STS-1 SPE. The BIP-8 code carried in B3 is monitored and the result is reported through two error counters. An 8 bit counter provides a block error count and a counter provides a raw bit error count for access by OBC 126. The bit-serial data stream is converted to a byte serial data stream for transport to STS/DS3 mapper 306 and to VT1.5 path terminator 308. A parity bit calculated across the 8 data bits of the data stream is transmitted with the data. A 6.48 MHZ clock, C1/J1/V1 position indicator (V1 based on H4) and a SPE indicator are also transmitted with the inbound data.

In the outbound direction, SOT1E 303 receives a STS-1 SPE and associated parity on a byte serial data stream from either STS/DS3 mapper 306 or from VT1.5 path terminator 308, depending on the type of payload carried. DS3 mapped SPEs are received from STS/DS3 mapper 306 and VT1.5 mapped SPEs are received from VT1.5 path terminator 308. A 6.48 MHZ clock, C1/J1/V1 position indicator (V1 for VT1.5 mapped SPEs), and a SPE indicator are also received with the outbound data. Parity received with the data is monitored and detected errors are registered for access by OBC 126. The synchronization signals received with the data are monitored to locate the transport and path overhead fields. The B3 field is monitored for internal fault detection and B3 errors are accumulated for access by OBC 126. For VT1.5 mapped SPEs, the H4 field is generated based on the V1 indicator received from VT1.5 path terminator 308. The H4 field is based on an OBC-controlled register for DS3 mapped SPEs. Other fields of the path overhead, with the exception of B3, are inserted from registers controlled by OBC 126. The REI and RDI fields of the G1 byte are not generated at SOT1E 303. The G1 and other fields of the path overhead are overwritten at OTM 102, where inbound path PM is processed. STS-1 path BIP-8 is re-generated and inserted into the B3 field. The H1, H2 and H3 fields of the STS-1 line overhead are generated based on the synchronization signals received with the outbound data. The STS-1 frame generated by SOT1E 303 is transported to STS-1P terminator 301, bit-serially with an associated 51.84 MHZ clock.

STS/DS3 mapper (L3M) 306 is used for DS3 mapped STS-1 SPEs. In the inbound direction, the DS3 signal is extracted from the SPE. In the outbound direction, a DS3 signal is mapped into a STS-1 SPE.

More specifically, for the inbound data path, STS/DS3 mapper 306 receives the STS-1 SPE from SOT1E 303 on a byte-serial data stream with parity. A 6.48 MHZ clock, C1/J1/V1 position indicator, and a SPE indicator are also received with the inbound data. Parity is monitored and detected errors are registered for access by OBC 126. The SPE bytes are extracted from the STS-1 frame using the J1 and SPE indicator signals and the DS3 signal is extracted from the SPE. The "O" bits of the DS3 mapping are accessible through a 2 bit buffer. The extracted data are written into an elastic buffer in a desynchronizer circuit. Data are read from this buffer using a smoothed 44.736 MHZ clock locked to the average rate of the received DS3 data via VCXO 306*a*.

The DS3 signal and associated clock are transmitted to the DS3/DS1 mux/demux 307 bit-serially.

For the outbound data path, STS/DS3 mapper 306 receives a DS3 signal and associated clock L3M from the DS3/DS1 mux/demux 307 on a bit-serial data stream. A STS-1 frame format with a fixed pointer is created based on system timing. The received DS3 signal is mapped into the STS-1 SPE and "O" bits of the mapping are inserted from a fixed 2-bit register controlled by OBC 126. The BIP-8 signal is generated and inserted in the B3 position of the STS-1 path overhead. Other positions of the path overhead may be inserted from registers controlled by OBC 126. STS-1 path overhead other than B3 is overwritten by SOT1E 303. The STS-1 frame is transmitted to SOT1E 303 on a byte-serial data stream. A 6.48 MHZ clock, parity covering the byte wide data path, a C1/J1 indicator, and a SPE indicator are transmitted with the signals to identify the STS-1 frame and SPE phase.

DS3/DS1 mux/demux 307 terminates DS3 signals. The M13 and C-bit parity modes are supported. In the inbound direction, DS1 signals are extracted from the DS3 frames for transport to DS1 framer 305. In the outbound direction, DS1 signals received from the DS1 framer 305 are mapped into a DS3 signal.

Specifically, for the inbound data path, DS3/DS1 mux/demux 307 receives a bit serial DS3 signal and associated clock from mapper 306. The received signal is framed and DS3 overhead bits and the 28 DS1 signals are extracted. Fault coverage by mux/demux 307 is discussed below in the section entitled "Network Data Fault Coverage; Detailed". Each of the 28 extracted DS1 signals are transmitted to DS1 framer 305. The DS1 signals are transmitted on a bit serial data stream with an associated clock.

In the outbound direction, DS3/DS1 mux/demux 307 receives 28 DS1 signals and associated clocks from the stage 2 DS1 framer 305. A DS3 frame, 4 DS2 frames, and associated overhead fields are generated using a clock received from a 44.736 MHZ oscillator 307a. The DS1 signals are mapped into DS2 frames using bit stuffing for frequency justification. The DS2 signals are mapped into the DS3 frame and DS3 overhead fields are inserted. The DS3 signal is then transmitted to STS/DS3 mapper 306 with an associated 44.736 MHZ clock signal.

For inbound transport, DS1 framer (stage 2) 305 receives DS1 signals and clocks from DS3/DS1 mux/demux 307 or from DS1 framer (stage 1) 309, depending on the type of payload carried in the STS-1 SPE. DS1 signals are framed and DS1 performance monitoring (PM) is provided. The following conditions are detected: 1) DS1 AIS, 2) DS1 yellow, 3) DS1 OOF/LOF, 4) DS1 SEF, 5) DS1 COAF, 6) DS1 frame slip indication, 7) DS1 frame errors (using a 9-bit error counter), 8) DS1 CRC errors for ESF (using a 9-bit error counter). Channel-associated signaling is extracted from the DS0 signals and transported to inband signaling unit 293 for processing. The DS0 signals are extracted and aligned with local timing (derived from system timing) using buffers. The aligned signals are transported to converter/attenuator 292 on a serial data stream operating at 1.544 Mb/s.

In the outbound direction, DS1 framer (stage 2) 305 receives DS0 channels from S/P converter and attenuator 292 on a serial data stream at a 1.544 (DS1) rate. The rate of the outbound DS1 signals is locked to system timing. Signaling information received from inband signaling unit 293 is inserted into the signaling positions of the outbound DS0 channels. For ESF signals, the CRC signal is generated and the CRC codes and FDL messages created by OBC 126 are mapped into the frame bit of the DS1 frames. DS1 AIS and DS1 yellow alarm signals are generated on command by OBC 126. DS1 framer 305 is capable of processing 28 DS1 signals, such that so that 7 ASICs are used to implement Stage 2 DS1 framer 305.

VT1.5 path terminator 308 terminates STS-1 SPE signals that are VT1.5 mapped. It supports byte synchronous and asynchronous mapping of DS1 signals into VT1.5 SPEs. Mixed byte synchronous and asynchronous mapped VT1.5 signals are supported within constraints imposed by the SONET standard. VT1.5 path terminator 308 terminates 28 VT1.5 signals, and four ASICs may be used to implement it.

In the inbound direction, VT1.5 path terminator 308 receives STS-1 SPEs from STS-1 path terminator 303 on a byte-serial data stream with a parity bit covering the 8 data bits. A 6.48 MHZ clock, a C1/J1/V1 position indicator, and a SPE indicator are also received with the inbound data. Parity is monitored and detected errors are registered for access by OBC 126. The location of the STS-1 SPE bytes and the multiframe phase of the VT1.5 signals are determined using the C1/J1/V1 and SPE indicators. The VT pointers are interpreted to locate the VT SPEs. The V5 byte of the VT1.5 path overhead (POH) is processed for error detection and PM. OBC read/write register access to the J2, Z6 and Z7 overhead bytes is provided. Counters are provided for counting raw BIP-2 and FEBE errors. Signal label mismatch and signal label=0 indicators are provided for access by OBC 126. An OBC capture register is also provided. Indications are provided for the V5 RDI and RFI/Yellow indicators. For byte synchronous mapping, the DS0 signals carried in the DS1 frames and the framing bits and channel associated signaling bits carried in fields defined by the byte synchronous mapping are extracted from the frame for transport to Stage 2 DS1 framer 305. The DS0 signals are transported on one bit-serial data stream per DS1 signal and the signaling and framing information are transported on separate companion bit-serial data streams. A common clock signal is transmitted for timing the two data streams. For asynchronous mapping, the DS1 signals are extracted from the VT1.5 SPEs and transported intact with embedded framing and signaling information. Each DS1 signal is transported to Stage 2 DS1 framer 305 on a bit-serial data stream.

For the outbound data path and byte synchronous mapping, VT1.5 path terminator 308 receives DS0 channels from Stage 2 DS1 framer 305 in a bit-serial DS1 frame format and receives framing and signaling information on a separate bit-serial data stream using a common clock signal. It creates VT1.5 frames based on system timing. The DS0 signals, signaling information, and framing information are byte synchronously mapped into VT1.5 SPEs. The DS0 signals are mapped into the VT1.5 frames using fixed VT pointers because the DS0 signals and the VT1.5 frames are both based on system timing. For asynchronous mapping, intact DS1 signals are received from Stage 2 DS1 framer 305, but the signaling bit stream is not used. As with byte synchronous mapping, fixed VT pointers are generated for the VT1.5 frames. The received DS1 signals are asynchronously mapped into VT1.5 SPEs. Overhead fields are generated and inserted into the VT POH fields. The BIP-2, FEBE and RDI fields are calculated. Data to be inserted into other fields within the V5 byte and J2, Z6 and Z7 bytes are read from OBC-controlled registers. A pseudo STS-1 frame is generated based on system timing and the VT1.5 frames are mapped into the STS-1 SPE. Since the STS-1 frame and the VT frames are both based on system timing, a fixed relationship exists between the STS-1 frame and the STS-1 SPE so that the STS-1 pointer inserted at STS-1 path terminator 303 has a fixed value. The STS-1 frame is transmitted to STS-1 path terminator 303 on a byte-serial data stream with the C1/J1/V1 and SPE indicator signals. A parity bit calculated over the 8 data bits is also transmitted with the data.

Stage 1 DS1 framer 309 does not terminate DS1 signals, but provides intermediate processing between the VT1.5 path terminator 308 and Stage 2 DS1 framer 305. Stage 1 DS1 framer 309 operates in a different mode for byte synchronous and asynchronous VT1.5 /DS1 mappings. Stage 1 DS1 framer is capable of processing 28 DS1 signals, such that 7 ASICs are used to implement stage 1 DS1 framer 309.

For the inbound data path, stage 1 DS1 framer 309 receives inbound DS1 data from VT1.5 path terminator 308. For byte synchronous VT1.5 /DS1 mappings, the DS0 data and the associated framing and signaling information for the DS1 signal are received on separate bit serial data streams using a common clock. A standard DS1 superframe is created by inserting framing and signaling bits into appropriate bit positions within the superframe based on received framing and signaling information. For asynchronous VT1.5 /DS1 mappings, the DS1 signals are received intact and the signaling link is not used. Stage 1 DS1 framer 309 operates in a transparent mode where the received signal is passed through unchanged. In either case, an intact DS1 signal is transported to the Stage 2 DS1 framer 305 on a bit serial data stream.

For the outbound data path, Stage 1 DS1 framer 309 receives an intact DS1 signal is received from Stage 2 DS1 framer 305 on a bit serial data stream. For byte synchronous VT1.5 /DS1 mapping, framing and signaling information are extracted from the DS1 signal. The DS0 channels and associated framing and signaling information are transported to VT1.5 path terminator 303 on separate bit serial data streams per DS1. For asynchronous VT1.5 /DS1 mapping, the DS1 signal received from Stage 2 DS1 framer 305 is passed through transparently.

Referring again to FIG. 29, at converter/attenuator 292, inbound signals are converted from the bit-serial data streams received from mux/demux 291 to a byte-serial data stream for transport to BIF 125. The reverse conversion is made in the outbound direction. Parity signals carried with the data signals are transported between converter/attenuator 292 and BIF 125. PROMs in converter/attenuator 292 provide attenuation capability for both inbound and outbound channels. Attenuation A-law/mu-law conversions and fixed data pattern generation are also provided. An interface to DSPs 106 and 107 is provided for supporting tone detection, tone generation, and echo cancellation. The 96 DS0 channels are multiplexed with other inbound channels for transport to BIF 125. Outbound tone channels are de-multiplexed from the outbound data stream and transmitted to DSPs 106/107.

Inbound DS0 signals are mapped into STM subframes at BIF 125 for transport to other cards of delivery unit 10. Outbound DS0 signals arrive at STSMs 103 in STM subframes carried on an egress bus (E-link). The DS0 signals are extracted from the STM subframes at BIF 125 for transport to mux/demux 151 via S/P converter and attenuation unit 153. DS0 channels are transported to and from BIF 125 in 17 STM datagrams (816 DS0 channels). The DS0 channels are composed of 672 network traffic channels, 24 test channels (T1 test port), 24 Idle channels and 96 tone channels.

Inband signaling unit 293 receives inbound signaling extracted by mux/demux 291. This signaling is carried in the signaling bits (A and B or A, B, C and D signaling) of the DS1 frames. Within inband signaling unit 293, signaling bits are mapped into a dual port RAM where they can be accessed. Inband signaling unit 283 processes the signaling bits and passes signaling change indications and collected rotary digits to OBC 126. Outbound signaling information generated by inband signaling unit 293 under the control of OBC 126 is written into an outbound dual Port RAM for transport to mux/demux 291. The signaling information is inserted into the signaling bit positions of the outbound DS0 channels.

7.5 Network Data Transport; MTXI Transport

Referring again to FIGS. 1, 16, and 17, matrix interface (MTXI) 105 provides the interface between delivery unit 10 and switching system 11. In the inbound direction, MTXI 105 terminates STM datagrams carrying network data (DS0) channels. It extracts and maps the DS0 payloads into matrix transport channels for transport to switching matrix 11a. In the outbound direction, MTXI 105 terminates transport channels arriving from matrix 11a and maps the DS0 signals into STM datagrams for transport within delivery unit 10.

FIG. 31A illustrates the "channel word" format for matrix transport. Each channel word has 10 bits, consisting of 8 network data bits, a framing/signaling (F/S) bit, and a path integrity bit (PIB). MTXI 105 does not operate on the framing/signaling (F/S) bit; this bit is set to zero in the inbound direction and is used for PV verification in the outbound direction. The PIB mechanism is provided to verify the integrity of data and that proper connections are maintained within matrix 11a.

FIG. 31B illustrates the superframe bit sequence for PIBs. The PIBs are a combination of parity bits, a matrix path verification (PV) code, and a halt bit. These PIBs are transported over a 24 frame superframe. For the first 16 frames, the PIE contains is a PX bit, which is odd parity and PV bits XOR'd. Parity is calculated over the 8 network data bits and the F/S bit. The PV bit is from a 16-bit PV code generated within MTXI 105 for each channel. As stated above, this matrix PV code is different from the STM PV codes used by the standard BIF 125 for transport within delivery unit 10. The first bit of the PV code is used for the PIE in frame 1 of the superframe, the second bit is used in frame 2, etc, for the 16 PV code bits. The P bits are odd parity bits. As explained below, the halt bit is a per-channel fault isolation bit, and is used to synchronize fault isolation routines.

Figure 31C:
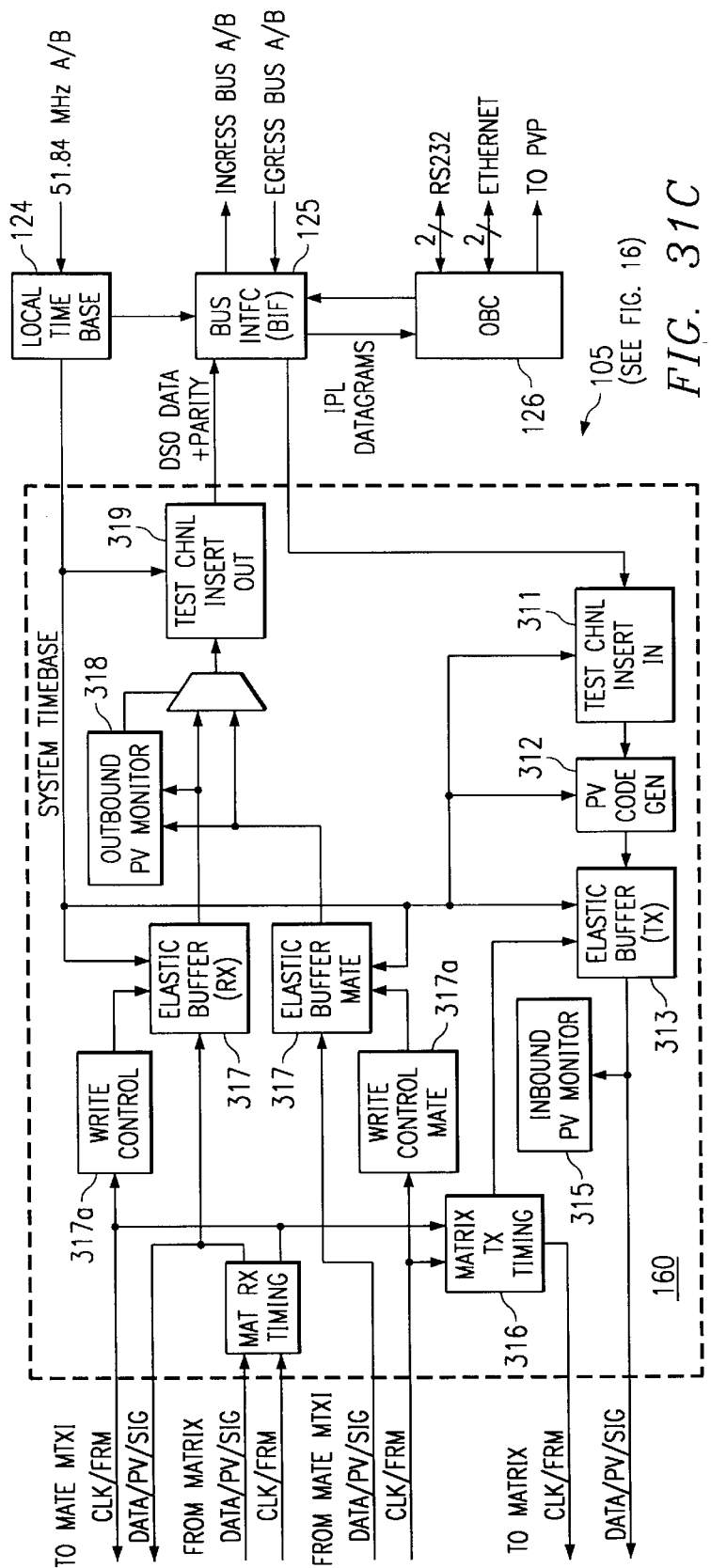
FIG. 31C illustrates network data transport within the MTXI.

FIG. 31C illustrates MTXI 105 with emphasis on network data transport. The local timebase 124, bus interface (BIF) 125, and OBC 126 are the standard circuits discussed above in connection with FIG. 12. BIF 125 provides access to the ingress and egress buses, and transports STM subframes as well as iPL subframes. The iPL subframes provide communication between MTXI's OBC 126 and unit controller 104. MTXI 105 is subordinate to unit controller 104 for administration, control, and most maintenance functions. As explained below, application circuit 160 performs format conversions and error monitoring.

In the inbound direction, MTXI 105 receives STM subframes from BCM 101 at its BIF 125 (egress BIF 125b; see FIG. 23) on the redundant (A and B) egress bus. BIF 125 selects one of the planes (A or B), terminates the STM subframes, and extracts the network data. Parity and STM PV codes are monitored, and any errors are registered for access by OBC 126. The network data are transmitted to inbound test channel inserter 311 on a byte-serial data stream.

The data stream connecting BIF 125 with inbound test channel inserter 311 operates at 16.384 MHz and carries 2048 network data channels. If enabled, test channel inserter 311 removes every 64th channel and replaces it with a test channel. Thus, of the 2048 channels transported by MTXI 105, 2016 are network data channels and 32 may be test channels. The data is then delivered to PV generator 312.

Figure 31D:
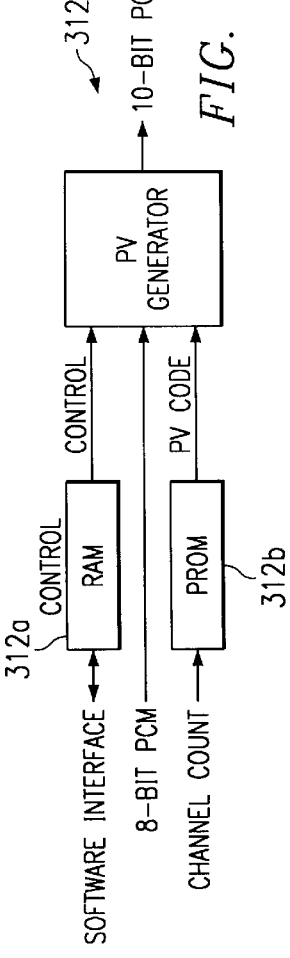
FIG. 31D illustrates the PV generator of FIG. 31C.

FIG. 31D illustrates PV generator 312 in further detail. It sets the F/S bit to zero and inserts the PIB. For frames 1–16, PV generator 312 reads the PV code from PROM 312b, based on the channel number. In frames 1–16, PV generator 312 computes parity over the 8-bit network data and the F/S bit, then XOR's the computed parity with the PV code to produce the PIB. The other PIB bits of the superframe are filled as described in connection with FIG. 31B. For any channel, software can set the halt bit in RAM 312a, such that PV monitor 315 will respond by suspending error detection on a that channel until the halt bit returns to zero.

Referring again to FIG. 31C, the 10-bit channels (8 bits of network data, the F/S bit, and the PIE for each channel) are read to transmit buffer 313, using timing signals generated by local timebase 124. Data is read from transmit buffer 313 for transport to switching matrix 11a using timing signals derived from matrix 11a. Clock and frame signals are transmitted with the data.

Inbound PV monitor 315 isolates single channels for PV verification, with the output loopbacked to elastic buffer 313 for stand-alone testing. PV monitor 315 is software-controlled to monitor a single channel over a 24 frame superframe. It may be implemented as an ASIC using a FPGA, having a 24-frame storage capacity for the selected channel under test. Network data is stored during the superframe period, during which path verification is initiated using the halt bit.

In the outbound direction (from matrix 11a after being switched by matrix 11a), matrix transport channels are received from the associated plane of matrix 11a (the A copy of MTXI 105 is connected to the A plane). There are 2048 10-bit channels, with a clock and frame signal, at a 16.384 MHz rate. The received data and timing signals are buffered for transport to the mate MTXI 105.

Figure 31E:
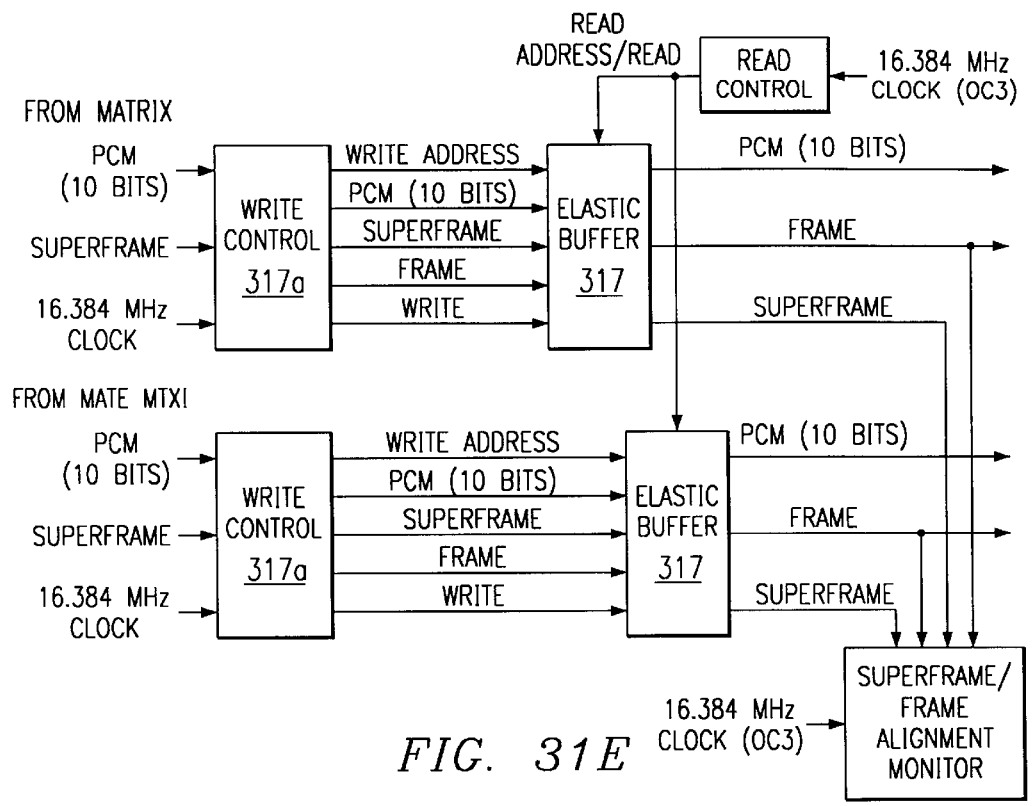
FIG. 31E illustrates the receive buffers of FIG. 31c.

FIG. 31E illustrates receive buffers 317 in further detail. Each buffer 317 is a dual-ported SRAM, providing up to a frame depth of storage. The timebase of switching matrix 11a is used for writing. The timebase of MTXI 105 (received via BCM 101) is used for reading. Both writing and reading are at 16.384 MHz. For writing to buffers 317, a write address is generated from a counter in write controller 317a. The counter ranges from 0 to 2047 and is reset to 0 every frame and superframe. Thus, if a frame error occurs, the channels from the redundant planes will be re-aligned at the next frame. A frame is generated from the superframe and is written into buffers 317 along with the 10-bit data and superframe. The read address for buffers 317 is generated from a counter ranging from 0 to 2047. The data begins to be read after an offset of clocks to ensure that skews between planes are absorbed. When reading from buffers 317, the frames and superframes from each plane are monitored for channel alignment verification. Thus, receive buffers 317 absorb skew between the redundant planes of matrix 11a, and are read such that the two data streams are phase aligned. The phase alignment enables error-free plane switching to be accomplished.

Referring again to FIG. 31C, outbound PV monitor 318 monitors the PIB codes of data received from both planes of matrix 11a, and errors are registered for access by OBC 126. As discussed below in the section entitled "Network Data Redundancy Control", signals are selected from one of the matrix planes based on the results of the PIB monitoring.

Figure 31F:
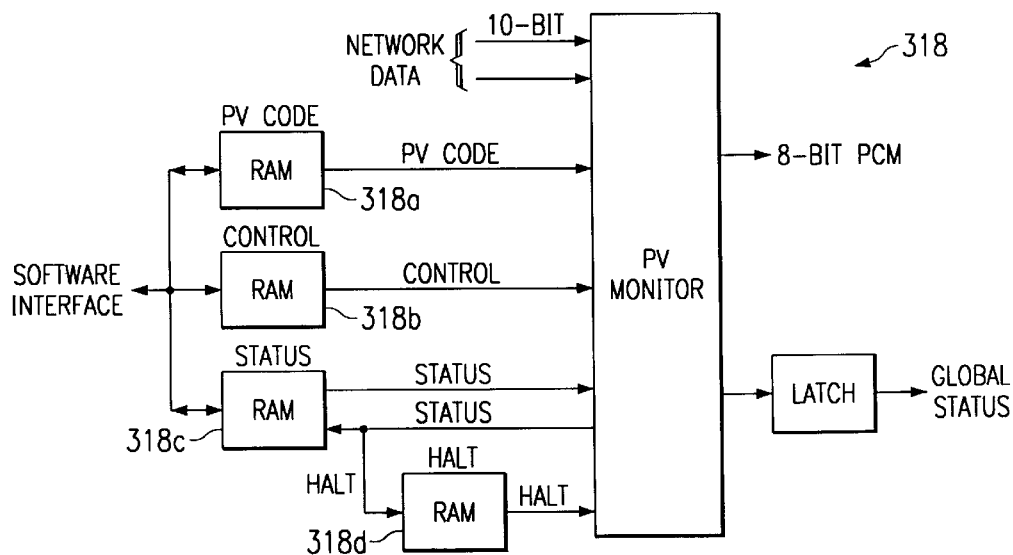
FIG. 31F illustrates the PV monitor of FIG. 31C.

FIG. 31F illustrates PV monitor 318 in further detail. PV monitor 318 operates continuously on all channels, on both planes. For each channel, PV monitor 318 is activated by software with an enable signal from RAM 318b. The PV code that is used to verify the PIB is written by software and read from RAM 318a, based on the channel count and frame count. PV monitor 318 then calculates the PIB based on the 10-bit data and verifies the received PIB (A and B), writing any errors into a status byte in RAM 318c. In frames 1–16, PV monitor 318 computes parity over the network data bits and the F/S bit, then XORs computed parity with the PV bit. The result is compared with the received PIB. In frames 17–23, PV monitor 318 checks only parity. Any per-channel error condition sets a corresponding global error latch, which is reported in the status byte.

In the outbound direction, the halt bit is read from RAM 318d, which has 2048 locations, one for each channel. The halt bit data is referenced during PV monitoring. For each channel and plane combination, PV monitor 318 suspends detection of errors, without affecting current error status, if either the respective enable bit is not set or the respective halt bit is set. When enable is not set, halt is not detected or reported. The PIB and F/S bits are dropped, and the 8-bit network data channels are passed to test channel inserter 319.

Referring again to FIG. 31C, test channel inserter 319 can insert 32 test channels into outbound channels. Parity is calculated over the DS0 data and the DS0 data and associated parity is transmitted to BIF 125. The datastream comprises 2048 9-bit parallel channels at 16.384 MHZ, based on timing from BCM 101.

Within BIF 125 (ingress BIF 125a; see FIG. 23), the parity bit is monitored and stripped and STM channels are created for carrying the DS0 channels. An STM PV code is generated for each channel and parity is generated over the DS0 data and the PV bit. The STM channels are mapped into STM subframes for transport to BCM 101 via the ingress bus.

FIG. 31G illustrates inbound timing, from MTXI 105 to switching matrix 11a. As stated above, data is written to elastic buffer 313 based on timing provided by delivery unit 10. Data is read from buffer 313 and delivered to switching matrix 11a based on timing provided by switching matrix 11a. FIG. 31H illustrates outbound timing, from switching matrix 11a to MTXI 105. As stated above, data is written to elastic buffers 317 based on timing of switching matrix 11a received with the data. The remaining outbound data path is synchronized to this delivery unit timing.

For both writing to buffers 313 and reading from buffers 317, the delivery unit timing is at a 16.384 MHZ rate. This clock is derived from the 51.84 MHZ clock received from BCM 101 via the MTXI's BIF 125.

As indicated above, framing is aligned for data integrity, but is performed differently for each data path direction. In the inbound direction, BIF 125 provides a frame to accompany the data. PV code generator 312 uses this frame to generate the PV code associated with switching matrix 11a. This frame accompanies the data to elastic buffer 313 and is transmitted to switching matrix 11a. In the outbound direction, a superframe is received from matrix 11a. From the superframe, a frame is generated and both are written to buffers 317. The frame also initializes the read address. The frames are read out of buffers 317 and monitored for plane misalignments. The data from buffers 317 are accompanied by the frame signal to BIF 125, which uses this signal to align the data to the ingress frame.

7.6 Network Data Transport: DSP Transport

FIG. 32 is a block diagram of DSP card 106 or 107. As stated above, both types of cards use the same basic circuitry, although the configuration and programming of card 106/107 may be different depending on whether it is used for scan processing or echo cancellation. The following description applies to both except where expressly stated.

Local timebase 124, BIF 125, and OBC 126 are common SBB circuits, discussed above in connection with FIGS. 12 and 13. OBC 126 communicates with the superordinate unit controller 104 via iPL datagrams. The application circuit 180 of DSP card 106/107 (see FIG. 18) has a DSP engine 321, an egress channel interface 322, an ingress channel interface 323, and a control interface 324.

Figure 33:
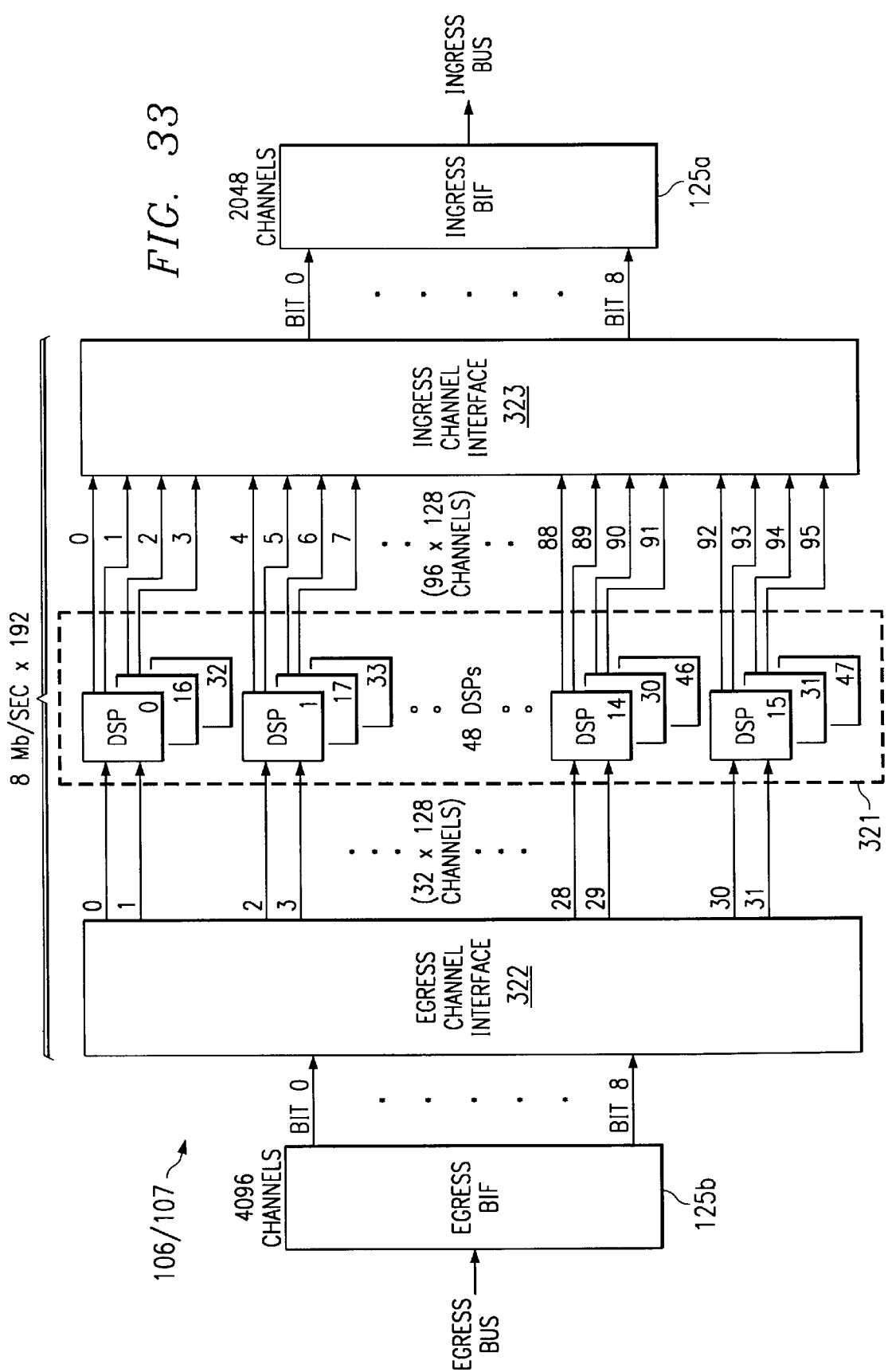

FIG. 33 illustrates network data transport within DSP card 106/107. Egress BIF 125b extracts DS0 channels from STM subframes and provides a byte-serial data stream carrying 4096 channels per frame period. Each 9-bit "channel word" out of egress BIF 125 has 8 channel bits and a parity bit.

Egress channel interface 322 provides the format conversions necessary for connecting the DS0 channels to DSP engine 321. It checks parity generated across the DS0 data by egress BIF 125b and registers errors for access by OBC 126. It reformats the channel data of the channel words into 32 serial data streams with each data stream carrying 96 DS0 channels per frame period. Thus, the input capacity to DSP engine 321 is 3072 channels (32×96 channels).

Referring again to FIGS. 32 and 33, DSP engine 321 has 48 DSP processors (DSPs). For the echo function, all 48 DSPs are used. For the scan function, a minimum of 22 DSPs are used. Pairs of data streams are multi-dropped to groups of three DSP processors so that 16 DSP groups are formed. Each of the DSP groups has access to a maximum of 192 DS0 channels.

DSP engine 321 has four functional interfaces: to OBC 126, to egress channel interface 322, to ingress channel interface 323, and to timing circuitry.

The OBC interface provides the path from OBC 126 to the DSPs for code download, configuration and command messages, and OBC interrupt information. Other data, such as tone detection channel data, may be provided depending on the application of DSP card 106/107. The OBC interface uses a host interface circuit associated with each DSP, which is designed to permit a host processor to interface to the DSP. As explained below, the OBC interface is via control interface 124 and additional logic associated with DSP engine 321 that manages connections to all 48 DSPs. This logic separates the interface bus into six separate busses with eight DSPs on each.

The interface between DSP engine 321 and egress channel interface 322 provides the network channel data to the DSP engine 321 for processing. The channel data is provided to each DSP via enhanced synchronous serial interfaces configured in a network mode. This mode permits the reception of 32 timeslots per frame sync signal. The timeslots are configured for the maximum capacity (32 bits each) to permit 4 channels per timeslot to be received, but only 24 bits (3 channels) are accessible to the DSP internally. As stated above, a total of 3072 of the 4096 egress channels are available to DSP engine 321.

The interface between DSP engine 321 and ingress channel interface 323 outputs the channel data from the DSPs. Up to 192 usable egress channels are output from each DSP via its enhanced synchronous serial interface. This mode permits the transmission of up to 32 timeslots per frame sync signal. The timeslots are configured for the maximum size (32 bits) to permit four channels per timeslot to be transmitted but only 24 bits (3 channels) are valid. As explained below, a total of up to 1536 of the 2048 ingress channels can be transmitted to BIF 125.

The timing interface provides a common DSP clock to DSP engine 321. This clock is derived from local timebase 124 (see FIG. 18). The timing interface also provides a frame sync pulse to a maskable interrupt pin on each DSP.

Ingress channel interface 323 concentrates the channels generated by DSP card 106. Specifically, each 6 data streams from a DSP group are connected to a concentrator circuit, which concentrates the 6 data streams to one data stream carrying 96 channels. Therefore, only one of the 6 data streams can transport data for any given data slot. The 16 concentrated data streams have a total capacity of 1536 DS0 channels. The 1536 channels are then mapped to a byte-serial data stream for transport to ingress BIF 125a. Parity is calculated across the 8 data bits and transported with the data.

At the ingress BIF 125a, the parity bit is tested and stripped and STM PV and parity are generated. The STM channels are then mapped into STM datagrams for transport on the A and B copies of the ingress bus.

8. Network Data Fault Coverage

Fault coverage mechanisms for network data can be divided into three basic categories: 1) STM transport fault coverage, that is, fault coverage defined by the SBB-LS architecture of delivery unit 10; 2) standards based fault coverage, that is, fault coverage defined by transport standards such as SONET, DS3, DS1, etc.; and 3) switching matrix fault coverage, that is, fault coverage defined for the transport channels of switching matrix 11.

Figure 34:
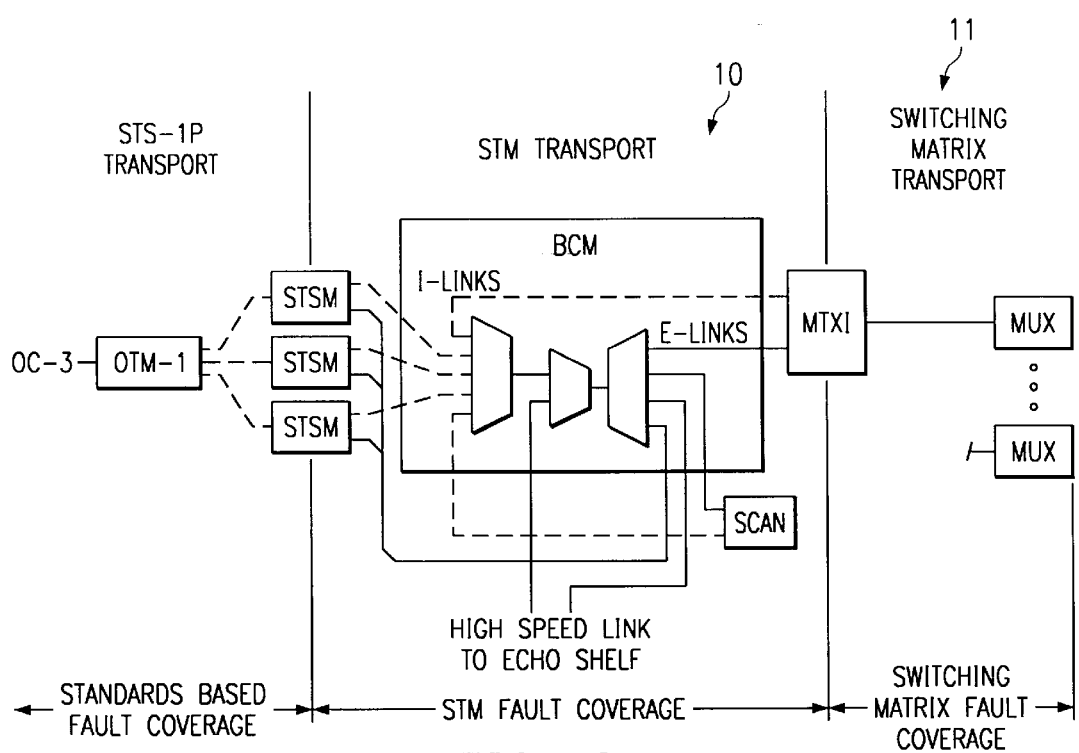
FIG. 34 illustrates partitioning of fault coverage for the delivery unit.

FIG. 34 illustrates the physical partitioning of the three types of fault coverage. STM transport fault coverage applies to the transport of network data through the BIFs 125 of application cards (STSM 103, MTXI 105 and DSP 106) and through BCM 101. When delivery unit 10 has an expansion shelf, STM transport fault coverage mechanisms also cover the transport of data between the two shelves. Standards-based fault coverage mechanisms cover the demux/mux circuits of OTM 102 and STSMs 103. Switching matrix fault coverage mechanisms cover the application circuitry of MTXI 105.

8.1 Network Data Fault Coverage; STM Transport

Figure 35:
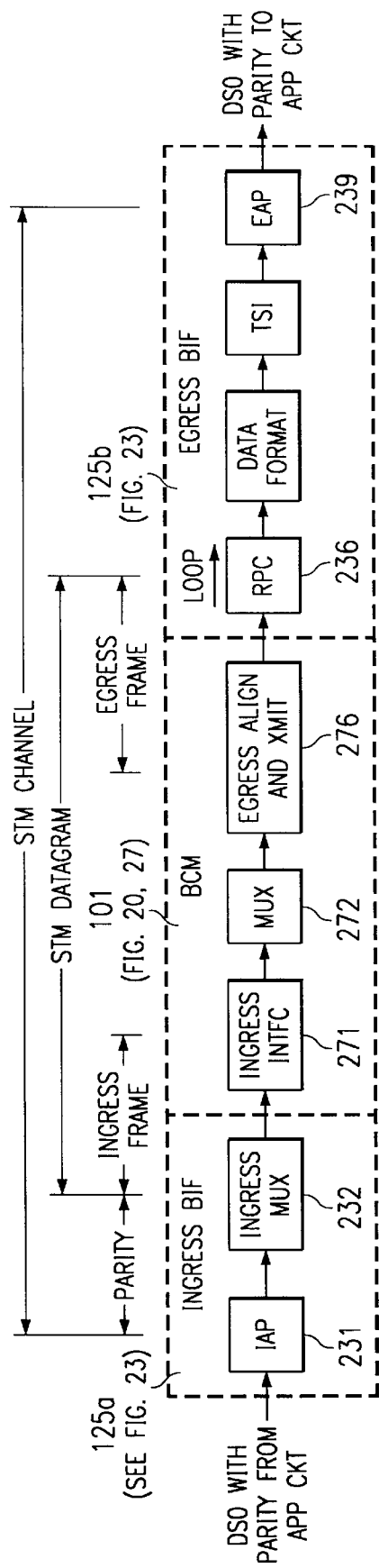
FIG. 35 illustrates the STM transport fault coverage of FIG. 34.

FIG. 35 illustrates STM transport fault coverage. The participating circuits are standard SBB-LS STM transport circuits, namely the ingress BIF 125a of a first application card, BCM 101, and the egress BIF 125b of a second application card. The STM transport function of these circuits is discussed above in connection with FIGS. 23, 24, and 27.

DS0 channels are transported between application circuits and the local IAP 231 or local EAP 239 on byte-serial data streams. A parity bit covering the 8 data bits is transported with the data. Parity generated by the application circuit is tested and terminated at IAP 231. Parity generated by EAP 239 is tested and terminated at the application circuit.

STM channels are created at IAP 231. Overhead in STM channels provides end-to-end DS0 fault coverage across the STM partition. STM channels contain 10 bits consisting of an 8-bit data field used to carry the DS0 channels, a path verification (PV) bit, and a parity bit covering the other 9 bits (see FIG. 7). The PV bit transports a unique code for each STM channel over a 48 frame superframe (see FIG. 8). As discussed in the section entitled "Network Data Transport; BIF Transport", PV codes assure that proper connections are maintained through the STM transport paths, and are monitored and terminated at EAP 239. The parity bit does not provide end-to-end coverage; the only points where the parity bit is monitored are at ingress STM FIFO 232a and at TSI 238.

STM channels are mapped into STM subframes at ingress mux 232. Thus, STM channels are transported from an ingress BIF 125a to an egress BIF 125b, via BCM 101, in STM subframes. STM subframes provide fault coverage additional to that provided by the STM channel protocol described in the preceding paragraph. STM subframe header fields have a PTI field, slot number field, and CRC-8 code field (see FIG. 7). The RPC 236 of the egress BIF 125b terminates STM subframes and monitors header fields for error conditions. As explained below in this section, subframe header error conditions (CRC-8, slot number, and PTI errors) are monitored by BCM 101 as well as by RPC 236 of egress BIF 125b. The monitoring of STM subframe headers at BCM 101 permits faults detected in the header fields to be isolated to a field-replaceable unit.

STM subframes generated at ingress mux 232 are transported to BCM 101 in ingress frames. An ingress frame has a header and 50 ingress subframes (see FIGS. 4 and 5). At BCM 101, ingress subframes are mapped into egress frames for transport to all application cards. Egress frames have a header and 202 egress subframes (see FIGS. 4 and 6).

Ingress and egress frames use a common header format (see FIG. 4). A framing pattern field provides synchronization for ingress and egress frames. Some transport frame level fault detection is provided for certain types of faults by the framing pattern. Errors detected in the framing pattern are reported as EFEP pattern errors at the receiving circuits and an out-of-frame condition is declared for persistent framing errors.

Referring now to the specific STM transport fault coverage circuits of FIG. 35, one local fault coverage as mechanism is at ingress BIF 125*a*. Application cards 102–107 can generate a maximum of 2048 STM channels for transport on the ingress bus. A variable number of STM channels may be generated by its local IAP 231, depending on the application. A signal is sent with channels transported from the IAP 231 to the ingress mux 232 for identifying timeslots that actually contain STM channels. Circuits in the ingress mux 232 count the number of channels received within a frame period and the count is compared to the expected value contained in a register maintained by the OBC 126. An ingress channel number error is registered for access by the OBC 126 if the two numbers do not match.

Ingress mux 232 monitors parity transported with STM channels and reports errors. Clock and frame signals received with STM channels are monitored and errors are registered. For parity monitoring, data is written into STM FIFO 232*a* (see FIG. 23) with parity. Parity is tested as the data is read from FIFO 232*a* for loading into an STM subframe buffer and detected errors are registered. A register bit controlled by OBC 126 can be set to invert the parity bit written into FIFO 232*a* to force a parity error, and thereby permit parity error reporting to be tested.

Ingress BIF 125*a* detects three types of STM arbitration errors and reports them to OBC 126: 1) An ingress arb error is registered when a STM enable signal and an iPL grant are received from BCM 101 for the same ingress subframe; 2) An ingress arb STM error is registered when the STM enable signals received from the A and B copies of BCM 101 do not agree; 3) An ingress STM enable invalid condition is reported when a conflict is detected between the enable signal read from the local bus slot enable table and the STM enable signal received from the BCM 101.

Another local fault mechanism is at BCM 101. As described above in connection with FIG. 27, ingress bus frames arriving at BCM 101 are terminated at the ingress interface 217. The error conditions listed below are detected at ingress interface 217 and reported to the local OBC 126: 1) An application card not present error is reported when the presence signal received from the associated card slot does not indicate that a card is installed; 2) An ingress clock error is registered for a particular ingress Bus when a failure of the associated clock is detected; 3) An ingress frame error occurs when the frame signal received with each ingress bus frame is monitored and a framing error is detected; 4) A PTI error is reported when the PTI code received in a subframe header does not match an expected PTI value; 5) An egress slot number error is reported when the slot number in a subframe header does not match an expected slot number; 6) A CRC error is registered when an error is detected in the CRC-8 field of a received subframe. The expected PTI and slot number values are passed to ingress interface 217 from arbiter 273. The CRC-8 value is calculated at BCM 101 for comparison with the received CRC-8 code.

From the BCM's mux 272, subframes are transported to the egress alignment and transmit circuit 276 on four buses and two frame signals are transmitted. The relative phase of the frame signals is monitored at the egress alignment and transmit circuit 276 and an error is registered when the frame signals are not in phase. The subframes are inserted into egress frames created within the egress alignment and transmit circuit 276.

Local fault coverage mechanisms are also used at the egress BIF 125*b*. Egress signals arriving at RPC 236 are framed using the frame signal received with the data. Errors detected in the framing pattern by the RPC's EFEPs 241 (see FIG. 24) are reported as EFEP pattern errors. Framing information recovered from the received signal is monitored using framing information generated by the local timebase. An EFEP frame error is reported if the two frame indications are not in phase. The EFEPs 241 also report device address errors.

Three additional synchronization errors listed below are detected and reported by the RPC 236. 1) An RPC skew error is reported when the skew between data received from the A and B copies of BCM 101 exceeds the maximum permitted as defined by a maximum skew register. 2) An RPC alignment error is reported when data read from the A and B copies of sync buffers 242*a* (see FIG. 24) are not in phase. 3) An RPC frame error is reported when the number of clocks counted between successive egress bus frames is incorrect.

A number of other error conditions detected and reported to the OBC 126 by the RPC 236 are: 1) An RPC slot error is reported when the value received in the bus slot number of the STM subframe header does not match the bus slot count registered by RPC 236. 2) An RPC PTI error is registered if an invalid PTI code is detected. 3) An RPC PTI plane error is registered if the codes received on the A and B planes do not match. 4) An RPC STM error is registered when the STM bit is set in the corresponding entry in the STM table but the received PTI code does not indicate a STM subframe. 5) An RPC CRC plane error is registered when correct CRC values are received for a STM subframe received on the A and B egress buses but the two values do not match. 6) An RPC CRC error is registered when one of the received CRC-8 codes is in error.

An ingress-to-egress loop-back is provided in RPC 236 to be used in conjunction with the on-line fault coverage mechanisms for off-line fault isolation procedures. Data being transmitted on the ingress bus is loaded into a loop-back buffer 242*d* in the RPC 236 (see FIG. 24). Subframes stored in the loop-back buffer 242*d* can be selected instead of subframes received on the egress buses under control of OBC 126. This loop-back facility may be used to test many of the circuits on an application card independently of other elements of the subsystem.

At egress BIF 125*b*, STM data is transported from RPC 236 to the STM FIFOs in data formatter 237 on 32-bit wide data streams. Parity is generated across the 32 data bits and transmitted with the data. The data, parity, and framing information are loaded into the STM FIFOs. Two FIFOs (odd and even) are provided and data received in successive STM subframes are alternately written into the odd and even FIFOs. The parity and framing information is monitored as the data is read from the FIFOs. The following two error conditions are registered for access by the OBC 126. 1) A data formatter parity error is reported when a parity error is detected. 2) A FIFO data alignment error is reported when the start-of-frame signals read from the odd and even FIFOs are not in phase.

At data formatter 237, the transport format of the data is converted from 32-bit data streams to 10-bit data streams. The parity bit defined for STM channels is regenerated and the channels are switched to EAP 239 via TSI 238. At EAP 239, STM channels are terminated, the DS0 signals are extracted, and parity and PV codes are tested. The frame signal received from data formatter 237 is also monitored and any parity or synchronization errors are reported in the status register. DS0 channels extracted from STM channels are written into egress STM FIFO 239a along with a parity bit generated across the DS0 data.

PV monitoring is described above in the section entitled "Network Data Transport; BIF Transport". With regard to path verification, the following errors can be reported by EAP 239: 1) A PV RAM parity error is reported if a parity error is detected when reading a PV value from PV RAM 239b; 2) A PV state table parity error is reported if a parity error is detected when reading state information from state table RAM 239c; 3) A PV sync error is reported when an error is detected (after frame sync is achieved) in a framing bit of the PV frame; and 4) A PV error is reported when an error is detected in the PV code. PV sync errors and PV errors are reported in a PV error channel register in EAP 239. This register stores the channel number, an A/B source bit, and the type of error being reported (sync or PV).

8.2 Network Data Fault Coverage: Standards-Based De-Multiplex

Figure 36:
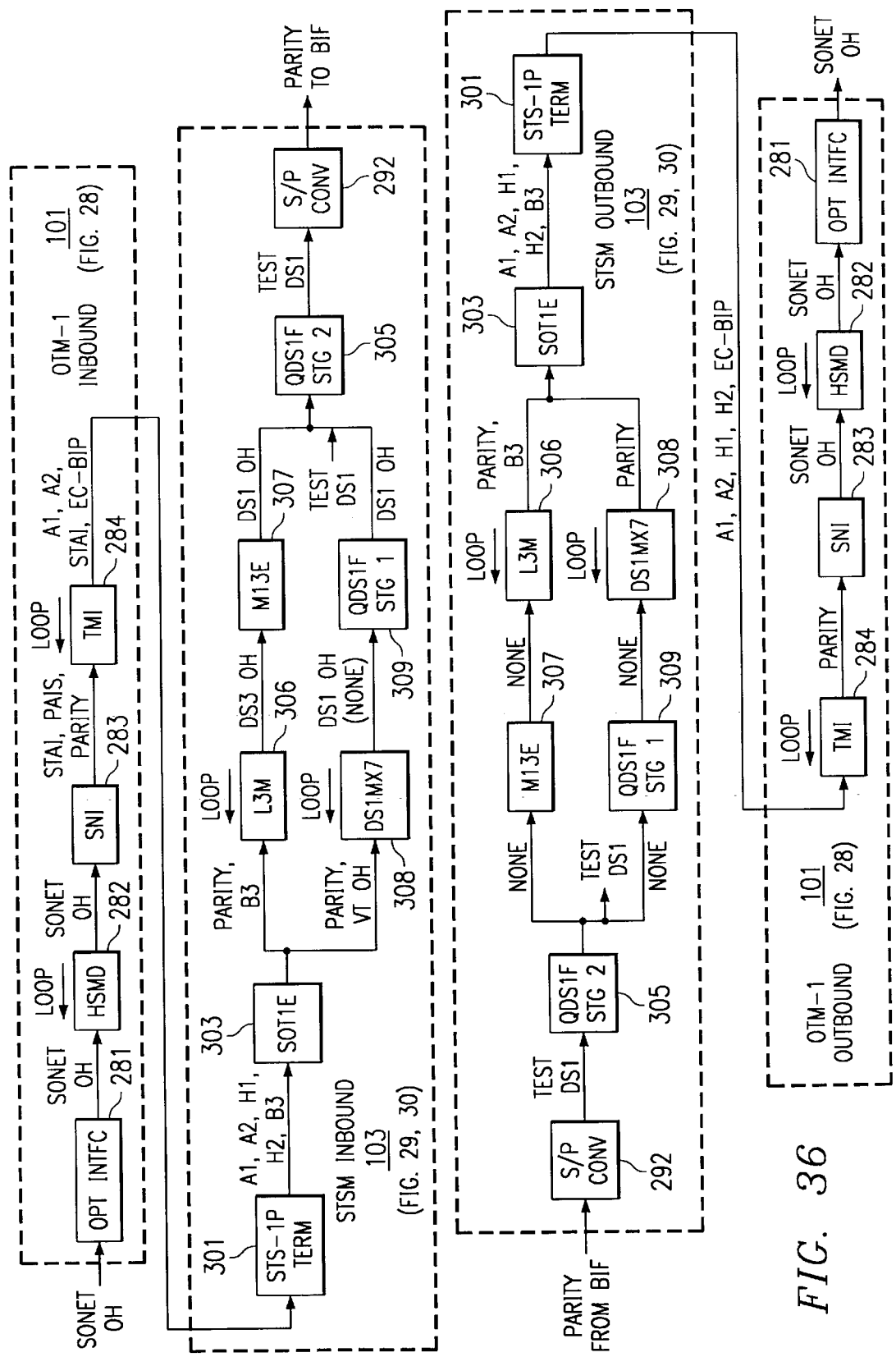
FIG. 36 illustrates the standards based fault coverage of FIG. 34.

FIG. 36 illustrates standards based fault coverage within delivery unit 10. As stated above, the standards-based fault coverage mechanisms are implemented in OTM 102 and STSMs 103.

In the inbound direction, as discussed above in connection with FIG. 28, OTM's SNI 283 terminates section and line overhead fields of the STS-3 signals received on the OC-3 spans. The STS-1 path is not terminated but path performance monitoring is performed. Because the STS-1 Path overhead (POH) is monitored but not terminated, the POH can be used for internal fault detection. The B3 field is used for fault coverage of the STS-1 SPE to the point where the STS-1 path is terminated. (For DS3 mapped STS-1 SPEs, termination is at L3M 306 of STSM 103. For VT mapped STS-1 SPES, termination is at SOT1E 303 of STSMs 103.) The STS-1 SPEs are transported from the SNI 283 to TMI 284 in a proprietary STS-3 frame.

TMI 284 generates pseudo STS-1 frames with valid framing and STS-1 pointers based on system timing. STS-1P signals are created by adding proprietary fields to the frames. The STS-1 SPEs are mapped into the STS-1P frames using SONET pointer processing. The transport of signals from OTM 101 to STSMs 103 is covered by the proprietary EC-BIP field and the B3 field of the STS-1 POH.

At STSM 103, the STS-1P frames are terminated at the STS-1P terminator 301. The STS-1 SPE is mapped into a pseudo STS-1 frame for transport to the SOT1E STS-1 path terminator 303. The frame will contain a valid frame and a valid payload pointer. The B3 field of the STS-1 POH will be used to cover the SPE for the transport from the STS-1P terminator 301 to SOT1E 303. The STS-1 path is terminated at the SOT1E 303 and the payload is transmitted to the DS3 mapper (L3M) 306 or the DS1 mapper (DS1MX7) 308 depending on the type of payload carried. For DS3 mapped SPEs, the SPE is processed by the L3M 306. The transport to the L3M is still covered by the B3 field. The DS3 signal is extracted from the STS-1 SPE by the L3M 306 and the DS3 signal is transmitted to the DS3/DS1 mux/demux (M13E) 307. The transport of data from the L3M 306 to the mux/demux 307 is only covered by DS3 overhead fields. Therefore, no direct internal fault coverage is provided for the inbound transport to the mux/demux 307.

The term "direct fault coverage" as used herein refers to mechanisms that are available for on-line fault coverage. Off-line techniques that use loop-back and test channel facilities are not considered "direct fault coverage". In general, discrimination of internal/external faults can not be accomplished for path segments that do not provide direct internal fault coverage. For example, it can not be directly determined whether a error detected at the mux/demux 307 is a result of a far-end fault or a fault within the STSM 103. In the absence of internal errors, it is assumed that an error detected on a DS3 signal at the mux/demux 307 was caused by a far-end fault.

At mux/demux 307, the DS3 signal is terminated and DS1 signals are extracted from the DS3 payload. The quality of the DS3 signal is determined by monitoring DS3 and DS2 framing to detect out-of-frame (OOF) and loss-of-frame (LOF) conditions and by monitoring P-bit parity to determine a bit error rate. Extracted DS1 signals transported to DS1 framers (QDS1F-Stage 2) 305 are covered only by DS1 overhead carried in the frame bit. As with the DS3 signal, direct discrimination between near-end and far-end faults for errors detected at DS1 framer 305 is not accomplished. DS1 signals are terminated within the DS1 framer 305 and extracted DS0 signals are transported to the S/P converter 153. No direct fault coverage means is provided for the DS0 signals transmitted to the S/P converter 292. However, the paths can be tested off-line using DS0 signals extracted from the test DS1. After the DS0 signals are converted for byte-serial transport, a parity bit is generated and transported to BIF 125 with the DS0 signals for internal fault coverage.

VT mapped STS-1 SPEs are processed through the DS1 Mapper (DS1MX7) 308 and stage 1 DS1 framer (QDS1F) 309. The VT1.5 signals are terminated within the DS1MX7 308, and a number of VT overhead fields are monitored to determine the VT1.5 signal quality. Errors that determine the quality of the terminated signal include the loss-of-pointer and the BIP-2 code carried in the VT path overhead. Delivery unit 10 does not discriminate (internal/external) faults for errors detected for the VT1.5 signals terminated at DS1MX7 308. Processing of VT1.5 SPEs is dependent on the type of DS1 mapping. For asynchronous mapped VT1.5 signals, intact DS1 signals are extracted from the VT payload and transported transparently through the stage 1 DS1 framer 309 to the Stage 2 DS1 framer 305. Fault coverage for this path is restricted to that provided by the DS1 overhead. The same considerations discussed above for DS1 signals extracted from DS3 signals apply to DS1 signals extracted from VT1.5 SPEs. For byte-synchronous mapped VT1.5 signals, DS0 signals and DS1 framing and signaling are extracted from the VT1.5 SPEs. DS1 framing and signaling are transported to the stage 1 DS1 framer 309 on links separate from the links that transport the DS0 signals. Therefore, no direct fault coverage is afforded the DS0 signals as they pass from the DS1MX7 308 to stage 1 DS1 framer 309. The framing and signaling information is recombined with the DS0 signals within stage 1 DS1 framer 309 to create intact DS1 signals. Operation within and beyond the stage 1 DS1 framer 309 is independent of the type of mapping employed (DS3, asynchronous VT1.5, or byte synchronous VT1.5).

8.3 Network Data Fault Coverage; Standards-Based Multiplex

Referring to FIG. 36, in the outbound direction, DS0 signals with parity are received at the S/P converter of an STSM 103. The parity bit is tested and stripped at S/P converter and the DS0 signals are transported to the stage 2 DS1 framer 305 on individual bit-serial data streams. As with the inbound direction, no direct fault coverage mechanism is provided but the paths can be tested off-line using test DS1 signals.

DS0 signals received at stage 2 DS1 framer 305 are mapped into DS1 frames created by the framer 305. Since no provision is made for directly testing DS1 signals before they are mapped into higher level signals, no direct fault coverage of the DS1 signals is provided for any of the three mappings supported. The same condition is true for the DS3 signal created by DS3/DS1 mux (M13E) 307.

For a DS3 mapped STS-1 SPE, the DS3 signal is mapped into a STS-1 SPE at STS/DS3 mapper (L3M) 306, and B3 of the STS-1 POH is calculated and inserted. The STS-1 SPE is then mapped into a pseudo STS-1 frame created by L3M 306. B3 is used for internal STS-1 SPE fault coverage at STS-1 path terminator (SOT1E) 303 and for the remainder of the outbound transport path. The STS-1 SPE is transported to SOT1E 303 with parity to provide additional internal fault coverage.

For VT mapped STS-1 SPES, DS1 signals are mapped into VT1.5 signals created by VT1.5 path terminator (DS1MX7) 308. Because DS1MX7 308 does not generate STS-1 POH, the transport to SOT1E 303 is only covered by parity. Parity transported with the data is tested and the STS-1 POH, including B3, is generated and inserted into the appropriate fields by the SOT1E 303.

SOT1E maps STS-1 SPEs into pseudo STS-1 frames with valid framing (A1 and A2) and STS-1 pointers (H1 and H2), for transport to the STS-LP terminator 301. Therefore the framing signals, the STS-1 pointers signals, and B3 are available to be used for internal fault coverage for the remainder of the outbound transport paths. 5 STS-1 framing, the STS-1 pointer, and B3 are monitored by STS-1P terminator 301. Errors are reported to the OBC 126. An EC-BIP code is generated and inserted into the B2 field of the line overhead to create a STS-1P frame. STS-1 SPEs are transported to the TMI 284 on the OTM 102 in the STS-1P frames.

TMI 284 monitors STS-1 framing, the STS-1 pointer, and EC-BIP. STS-1P signals are multiplexed to a STS-3P frame and parity is generated and transported to SNI 283 with the data stream carrying the STS-3P signal. Because STS-1 overhead is not monitored by SNI 283, fault coverage for the transport to SNI 283 is restricted to parity. SNI 283 inserts STS-3 section and line overhead fields overwrites some of the STS-1 POH fields. Data transported to HSMD and optical interface 281 are in standard SONET format. No internal transport fault coverage is provided in the outbound direction beyond SNI 283.

8.4 Switching Matrix Fault Coverage

Channels of switching matrix 11a associated with delivery unit 10 originate and terminate in MTXI 105. The primary fault coverage mechanism for these matrix channels is the path integrity bit (PIB) carried with the channels. Details of the switching matrix transport format, as well as fault coverage, are discussed above in the section entitled "Network Data Transport; MTXI Transport".

8.5 DSP Fault Coverage

DSP cards 106 and 107, which are used to implement scan and echo cancellation, connect to the ingress and egress buses via their standard BIF 125. The STM fault coverage mechanisms described above in the section entitled "Network Data Transport; BIF" apply to the DSPs BIF 125.

Referring to FIG. 32, DS0 channels are transported between BIF 125 and the ingress/egress 322 on byte-serial data streams. Parity is transmitted with the data for both directions of transport. Parity is monitored and errors are reported by ingress/egress FPGA 322 for inbound transport. Parity is monitored by a circuit in BIF 125 for data transmitted in the outbound direction.

DS0 channels are transmitted between the ingress/egress FPGA 322 and the DSP engine 321 on serial links. No direct fault coverage means is provided to the serial links.

8.6 Expansion Shelf Fault Coverage

STM and iPL subframes are transported between BCM 101 in the primary shelf 10a and BCM 101 in expansion shelf 10b in egress frames. The Egress frames are mapped into a high speed serial link format (G-Links) for transport on an optical medium.

Referring to FIG. 27, BCMs egress formatter 275 provides the interface to the G-Links. The primary fault coverage mechanism for the expansion shelf interconnection is the CRC codes carried in the subframes. Conditions defined for detection and reporting at egress formatter 275 are: 1) A CRC error indicates that the CRC value received in a subframe does not match the calculated CRC value. 2) A link frame error indicates that an incorrect number of clocks were received since the last link frame pulse was detected. 3) A link ready indicates that the G-Link is ready, has data available, and an error has not been detected in the control sequence. 4) A mux frame error indicates that an incorrect number of clocks were received since the last mux frame pulse was detected.

The status of a number of parameters associated with the G-Link and the optical interface are detected and reported to OBC 126. The parameters monitored at the G-Link are: 1) A ready for data state indicates that the transmitter is ready to transmit data. 2) A locked state indicates that the transmit PLL has locked to the 51.84 MHZ egress bus clock. The following parameters are monitored and reported to OBC 126: 1)TX optical power, 2) laser diode current, 3) TX temperature, 4) TX calibration value, 5) TX lock value, 6) RX optical power, and 7) RX calibration value.

9. Network Data Redundancy Control

Figure 37:
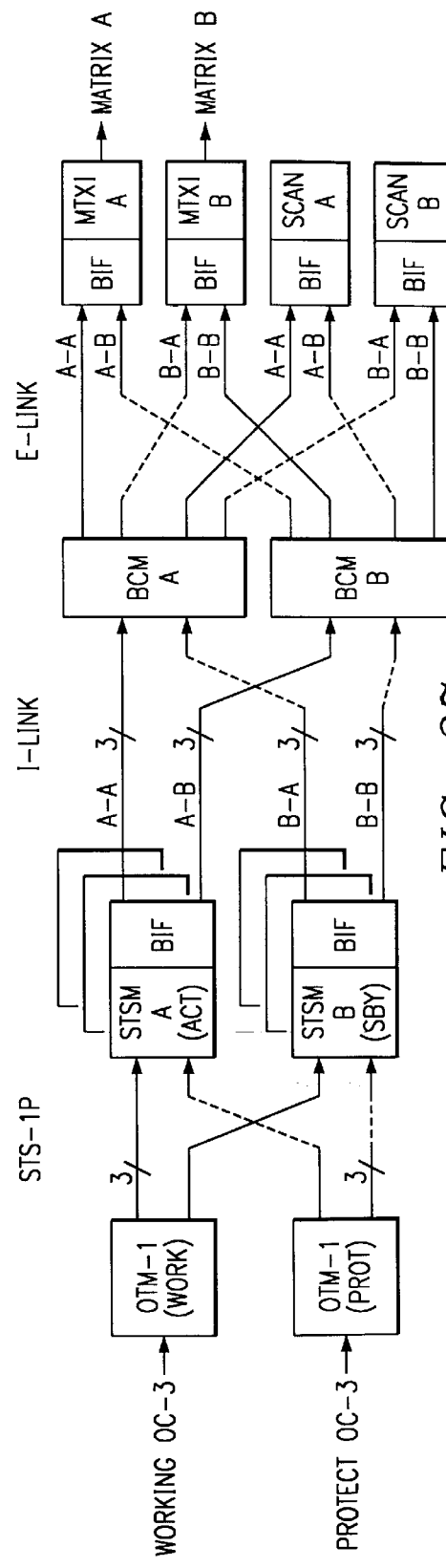

FIGS. 37 and 38 illustrates redundancy within delivery unit 10 and interconnections in the inbound and outbound directions, respectively. As explained below, the redundancy configuration permits delivery unit 10 to survive failures without loss of service as long as a failure of both copies of an element does not occur.

Cross coupling is provided between all elements. In general, the cross coupled signals are connected and controlled as follows: Each element transmits identical signals to both copies and receives signals from both copies of the redundant elements to which it is connected. At receiving circuits, both copies of the received signals are monitored to determine the signal quality. The selection of data for further processing is controlled by preference signals registered by the local OBC 126 when the received signals are of equal quality. When errors are detected on the currently active copy of received signals and no errors are being registered on the standby copy, a switch-over to the standby copy is normally executed.

A switch-over is executed automatically by hardware when switch-over conditions are met and the automatic switch-over function is enabled by the OBC 126. When an automatic switch-over is executed, the flag that enables the automatic switch-over operation is disabled by the hardware circuit. The automatic switch-over function remains disabled until it is re-enabled by OBC 126. If the switch-over conditions are met and automatic switch-over is not enabled, the switch-over is accomplished by switching the preferred designation to the signal previously designated as the standby signal. The change of the preferred copy is executed via an OBC command.

The solid lines of FIG. 37 illustrate plane selection in the inbound direction in normal operation where no errors are being reported. Both copies of STSMs 103 select data from the active OTM 102. Both copies of BCM 101 select data from the active STSM 103. Appropriate rearrangements are implemented when faults occur. The rearrangements are accomplished by executing switch-over operations at appropriate elements. After the fault causing the error condition is corrected, the inbound selections at STSM 103 and BCM 101 are rearranged to the original preferred configuration (revertive selection control).

Referring to FIG. 38, the initial preferred configuration for E-link connections between BCM 101 and STSMs 103 is planar, where STSM A selects data from BCM A and STSM B selects data from BCM B. Outbound STS-1P signals received from the active STSMs 103 are selected at OTM 102 in the initial preferred configuration. Non-revertive selection control is used for outbound data selection at both OTM 102 and STSMs 103.

The initial preferred plane selection configurations for E-link data received at MTXI 105 and scan DSP 106 and for I-link data received at BCM 101 from MTXI 105 and scan DSP 106 are planar. Non-revertive selection control is used for both directions of transport between BCM 101 and MTXI 105 and scan DSP 106.

Cross coupling of signals between MTXI 105 and switching matrix 11a is not provided, although as explained below in this section, both copies of MTXI 105 have access to signals transmitted by both matrix planes. The preferred selection configuration for inbound matrix signals is planar as indicated. Revertive selection control is used at the matrix interface of MTXI 105.

Figure 40:
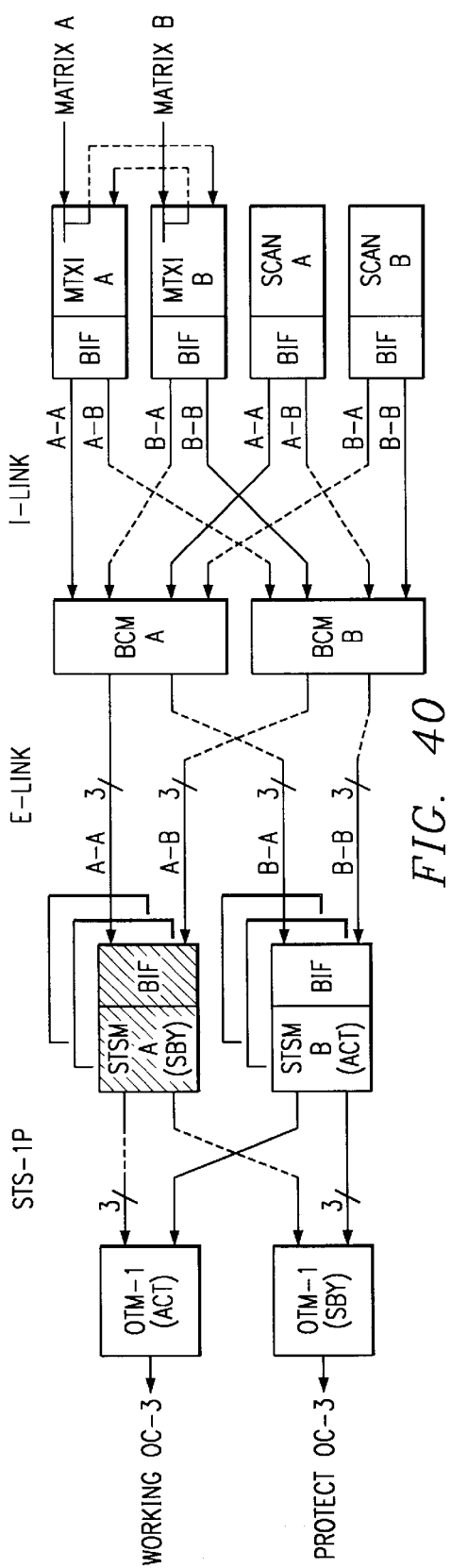

FIGS. 39 and 40 illustrate an example of subsystem connections after a failure of the A copy of STSM 103, for the inbound and outbound directions, respectively. After the failure of the A copy of STSM 103, the B copy becomes the active copy and the A copy becomes the standby copy. Inbound rearrangement is accomplished by switch-over operations at the BCM 101 and outbound rearrangement is accomplished by switch-over operations at OTM 102. Both BCM 101 and OTM 102 select data from STSM B.

Redundant OC-3 spans, designated working OC-3 and protect OC-3, are connected to copies of OTM 102. The connection arrangement between OTM 102 and STSMs 103 supports network automatic protection switching (APS) for the OC-3 spans as well as internal equipment switching. Selections of inbound STS-1P signals are made at the A and B copies of STSMs 103. Each STSM 103 monitors the following fields and selects the active signal from OTM 102 based on the result of the monitoring function: 1) STAI; 2) STS-1 framing pattern; 3) EC-BIP. This monitoring is discussed above in the section entitled "Standards-Based Fault Coverage; Detailed". A switch-over may be executed automatically or may be executed by OBC 126. When a switch-over is required at one STSM 103, the switch-over is executed for all the other STSMs 103 so that all STSMs 103 take their data from the active OTM 102.

OTM 102 selects outbound signals generated by STSMs 103. As with the inbound direction, the STS-1 framing pattern and the EC-BIP field are monitored. The status of clocks received with the outbound signals are also monitored, and a clock error (CE) is registered when an error is detected. A switch-over is executed when CE, FE, OOF, or EC-BIP error is registered for the active copy and no errors are registered for the inactive copy.

For transport to BCM 101, each other card 102–106 transmits STM subframes to both BCM copies on redundant I-links. At BCM 101, the selection of data from one copy is provided by software and an E-slot RAM (see FIG. 27). The E-slot RAM contains a control word for each egress subframe. A source field in the control word identifies the source of the STM subframe to be transported in an egress subframe, and is used to select the STM signal from one copy of a redundant application card.

STM subframes received on one of the redundant egress buses (E-links) are selected for processing by an application card. This A/B selection is made by RPC 236 of the card's egress BIF 125b (see FIGS. 23 and 24). Referring again to FIG. 24, STM subframes arriving at RPC 236 on A and B egress busses are processed independently through EFEPs 241a and synch buffers 242b, and loaded into A and B header buffers 242f and A and B data buffers 242g. Data passed to the application circuit is selected from either the A or B data buffer 242g. The selection of STM subframes is made on an individual egress subframe basis rather than on the basis of the entire egress bus. Selection control is provided through STM table 242i, which contains an entry for each egress subframe. Each location in STM table 242i has three control bits that are controlled by the local OBC 126: 1) an STM bit; 2) an STM preference plane bit; 3) an STM plane selection mode bit. Two RPC slot error bits, one for the A plane and one for the B plane, are also stored in the STM table 242i. These error bits, as well as CRC-8 error detection, are discussed above in the section entitled "Network Data Fault Coverage; STM Transport". The states of the RPC slot error bits and a CRC-8 error flag are used in conjunction with the STM preference plane bit and the STM plane selection mode bit to determine the egress plane from which an STM subframe is selected. Plane selection for a particular egress subframe is controlled by the STM preference plane bit when the STM plane selection mode bit indicates that automatic switch-over is disabled. When automatic switch-over is enabled, a switch-over is automatically executed under control of OBC 126 when an RPC slot error or a CRC-8 error is detected on the preferred plane and no error is detected on the standby plane. The STM plane selection mode bit is cleared when an automatic switch-over is executed and remains cleared until re-enabled by OBC 126.

Referring again to FIGS. 37 and 38, a planar connection arrangement (A copy to A copy and B copy to B copy) is provided for connecting MTXI 105 to the switching matrix 11a. No switch-over capability is required at matrix 11a. However, data received from matrix 11a is buffered and transmitted to the mate MTXI 105 so that both copies of MTXI 105 cards have access to data received from both planes of matrix 11a. In the outbound direction, PIB codes transported with the switching matrix channels are monitored for channels received from both planes of matrix 11a. The PIB code and the monitoring function are discussed above in the section entitled "Network Data Transport; MTXI Transport". Channels are selected from one plane based on a preferred plane bit and a plane selection mode bit controlled by OBC 126 and the status of the received signal indicated by the PIB monitor. Automatic plane switching is executed, when enabled, when an error is detected for the active plane, and when no error is registered for the inactive plane. When automatic switch-over is disabled, plane selection is controlled by the preferred plane bit.

Figure 41:
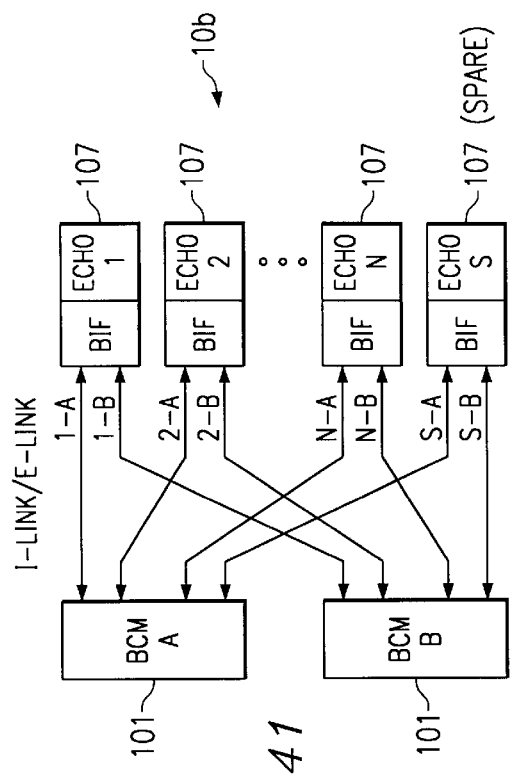
FIG. 41 illustrates redundancy within an expansion shelf of a delivery unit.

FIG. 41 illustrates redundant connections between an echo DSP 107 and its BCM 101 in expansion shelf 10b. One spare echo DSP 107 is used to back up a number of primary echo DSPs 107 in a 1 for N redundancy arrangement. Redundant plane selection of egress buses at the BIF 125 of an echo DSP 107 operates as described above for other BCM/application card connections. When a primary echo DSP 107 fails, the functions assigned to the failed card are reassigned to the spare echo DSP 107. At both copies of BCM 101, STM subframes received from the failed echo DSP 107 are replaced with STM subframes received from the spare echo DSP. The switch-over function is accomplished by OBC 126 through E-Slot RAM 278 on the BCM 101 (see FIG. 27). The address of the failed echo DSP 107 is replaced with the address of the spare echo DSP 107 in the source field of the control words associated with the affected egress subframes.

10. Control Data Transport and Fault Coverage

Figure 42:
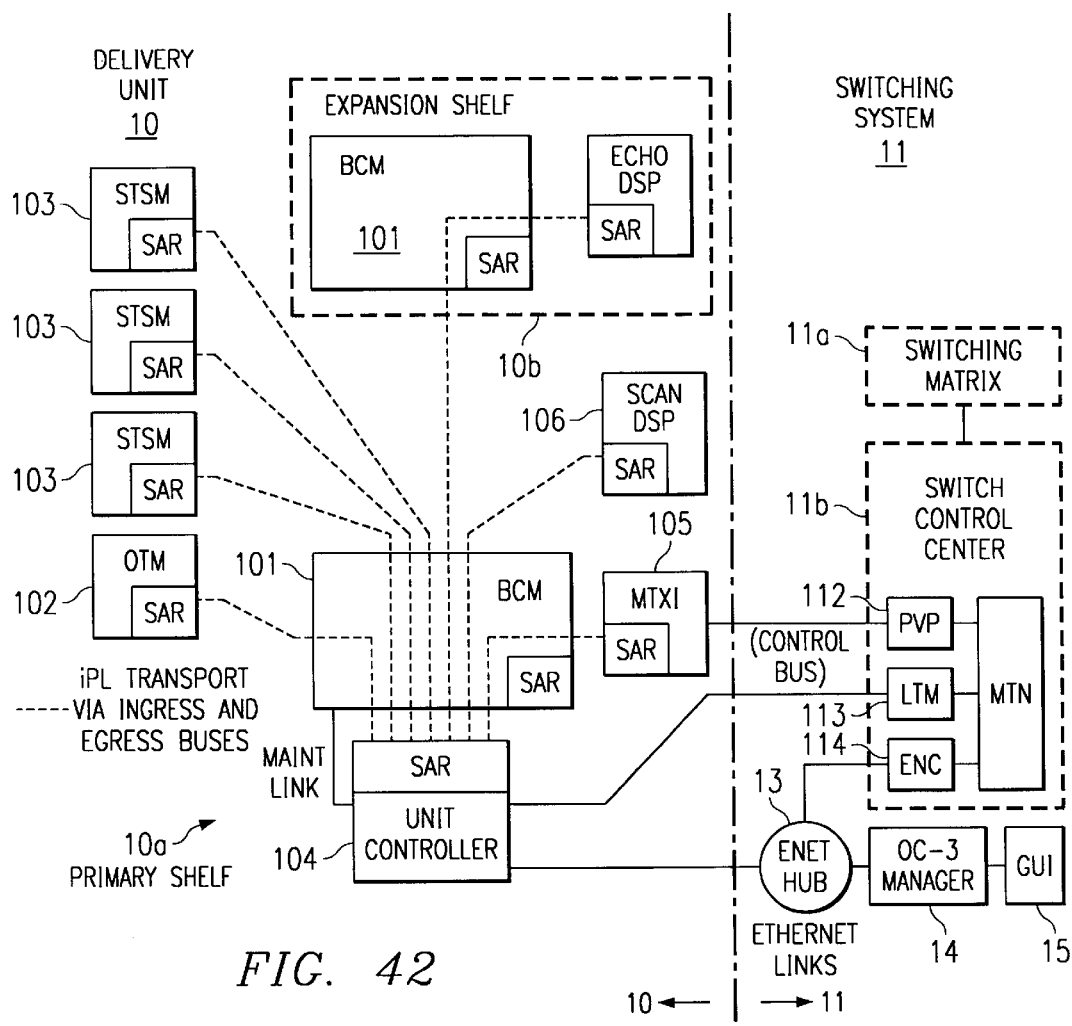
FIG. 42 illustrates control data transport within the delivery unit and between the delivery unit and the switching matrix.

FIG. 42 illustrates delivery unit 10 with emphasis on control data transport. There are two types of control transport: control transport between delivery unit 10 and switching system 11, and control transport internal to delivery unit 10. Internal control transport is normally in iPL subframes, but software-defined control messages in frame headers provide an alternate means.

To connect delivery unit 10 to the control structure of switching system 11, two types of communications media are used. An ethernet link connects unit controller 104 to the OC-3 manager 14 via an ethernet hub 13. Messages regarding subsystem administration and maintenance are transported on this ethernet link. A control bus connects unit controller 104 to the line/trunk manager (LTM) 113, and it connects MTXI 105 to PVP 112. Call processing information is transported on the unit controller/LTM link. Messages regarding path verification for switching matrix transport channels are transported on the MTXI/PVP link.

Figure 43:
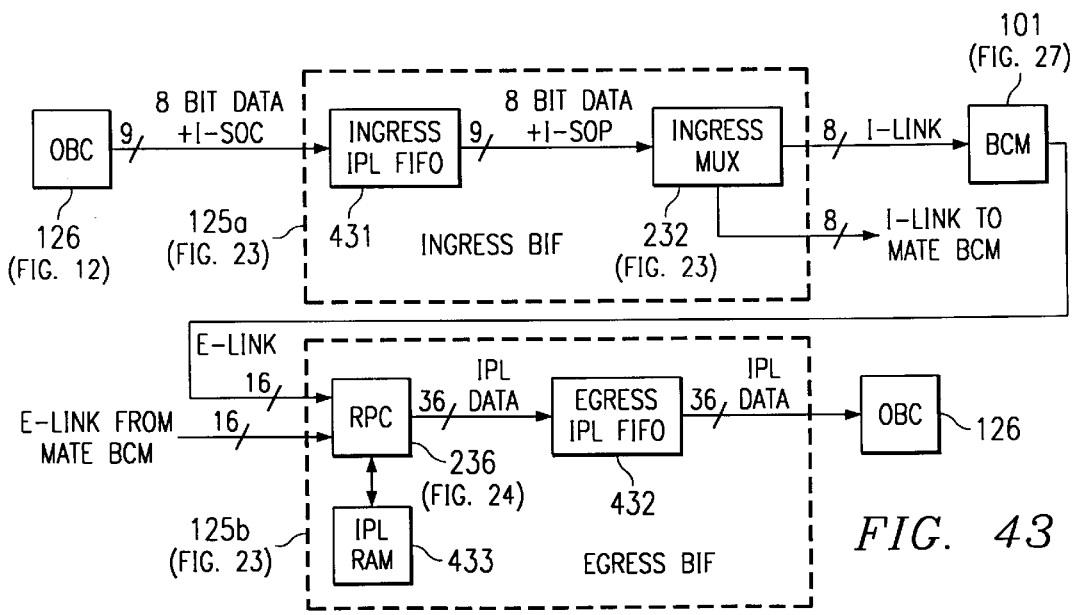
FIG. 43 further illustrates control data transport within the delivery unit.

FIG. 43 illustrates in further detail the data path for iPL subframe transport within delivery unit 10. The OBC 126 of a card (or the processor of unit controller 104) controls and monitors its card, using control messages. A control message from a card is mapped to one or more iPL datagrams, which are created and terminated in the local OBC 126. These iPL datagrams are transported in iPL subframes using the BIFs 125 of the transmitting and receiving cards, via BCM 101 (see FIG. 12). The iPL subframe format is described above in the section entitled "Data Transport Formats".

The primary fault coverage mechanism for iPL datagrams is the CRC-8 code carried in the iPL subframe. CRC-8 codes are created and terminated at OBC 126, and provide end-to-end coverage between an originating and a terminating OBC 126. The CRC-8 codes are monitored at intermediate points along the transport path to provide fault isolation when errors are detected.

For control data originating at an OBC 126, the OBC's SAR function creates and loads iPL datagrams into ingress iPL FIFO 431 of the local ingress BIF 125a. The iPL datagrams are transported from OBC 126 to ingress iPL FIFO 431 on a 9-bit data stream consisting of 8 bits of data and an ingress start-of-cell (I-SOC), which indicates the first byte in each iPL datagram. The I-SOC is carried through FIFO 431 with the data and is designated as the ingress start-of-packet (I-SOP) signal at the FIFO output. Each iPL subframe has an associated CRC-8 byte.

Ingress mux 232 (see FIG. 23) multiplexes STM and iPL subframes to the ingress bus. Ingress mux 232 has a buffer for temporary iPL datagram storage and monitors ingress iPL FIFO 431 to determine when a complete byte has been loaded. When an iPL byte has been loaded and the buffer is not full, ingress mux 232 reads data from ingress iPL FIFO 431 and writes the data into the buffer. As data is being read, ingress mux 232 checks the CRC-8 code in the iPL subframe. An error is registered for access by OBC 126 if the received CRC-8 code does not match the calculated code. The I-SOP signal is also monitored and an iPL datagram alignment error is registered if the number of data bytes between I-SOP signals is not correct. Errored iPL datagrams are discarded.

Ingress mux 232 maps iPL subframes to ingress frames, together with STM subframes, for transport to BCM 101 using the BCM arbitration protocol. Specifically, ingress mux 232 sends an iPL transport request to BCM 101 when its buffer is loaded. BCM's arbiter 273 monitors iPL requests and the status of BCM's ingress datagram buffers (IDBs) 277 (see FIG. 27). Arbiter 273 grants the request for a particular ingress bus when there is IBD space available and an ingress subframe is available for transporting the iPL datagram. Ingress mux 232 sends the datagram in the next ingress subframe following the iPL grant. Mux 232 registers an ingress iPL grant invalid error if an iPL grant is received for a subframe that is identified as a STM subframe.

At BCM 101, iPL subframes received on an ingress bus are separated from STM subframes and loaded into IDBs 277. BCM's ingress interface 271 monitors the PTI field of the subframe header and the CRC-8 field. It compares the PTI field with values stored in E-slot RAM 278, and if the PTI field does not match the expected PTI field, an error is registered with OBC 126. A CRC-8 error is registered with OBC 126 if an error is detected in the CRC-8 field. When a CRC-8 error is detected for an iPL subframe, the subframe is discarded.

BCM 101 multiplexes iPL subframes to the egress bus, together with subframes from other cards (iPL or STM) for broadcast to all cards 101–106. Specifically, when the STM enable bit for an egress subframe is not set, an iPL subframe from one of the IDBs 277 may be transported. IDB status is searched on a rotating basis to locate an IDB 277 that contains an iPL subframe. Each search starts with the IDB 277 following the one that was last selected in the rotation in order to provide equal opportunity to all application cards. When an IDB 277 containing a subframe is found, the data is enabled to the egress subframe. An Idle subframe is transmitted if no IDB 277 contains data.

In normal operation, a master/slave relationship exists between the redundant BCMs 101 for iPL arbitration. An off-line arbiter 273 is slaved to an on-line arbiter 273 for generating iPL grant signals and for selecting iPL subframes for transport within mux 272. On-line/off-line control signals are cross-coupled between the A and B copies of BCM 101, such that one copy is on-line and the other is off-line. The control signals are controlled by the respective OBCs 126. When a hardware fault condition permits both copies to be on-line, an error is registered for access by OBCs 126. The off-line arbiter 273 synchronizes to the on-line arbiter 273 and monitors the relationship between the two arbiters 273 with regard to iPL arbitration. An error is reported if the operation of the two arbiters 273 do not match. This master/slave relationship between copies of BCM 101 ensures synchronization of control messages that are transported in multiple iPL datagrams.

As an alternative to the master/slave relationship for iPL arbitration, "split mode" operation may be enabled by setting a bit in a register of BCM 101. By setting this bit on both BCMs 101, arbiters 273 are de-coupled. This permits the two copies of BCM 101 to arbitrate and transport iPL datagrams independently. The split mode operation permits delivery unit 10 to operate under two different and incompatible software applications.

At a destination application card, iPL subframes (carried on the egress bus) are received at RPC 236 of the card's egress BIF 125*b*. A and B copies of the egress bus are connected to the RPC 236. The general operation of RPC 236 for STM subframe transport is described above in the section entitled "Network Data Transport; BIF Transport". Within RPC 236, SBE (STM and iPL) subframes are processed without distinction to the point where they are written into the A and B data buffers 242*g*. Fault coverage on this portion of the BCM data path is the same as that for STM datagrams, as discussed above in the section entitled "Network Fault Coverage; STM Transport". Referring to FIGS. 23, 24, and 43, as RPC 236 reads STM and iPL subframes from data buffers 242, they are segregated. The iPL subframes are loaded into iPL egress FIFO 432.

As iPL subframes are written into buffers 242*g*, RPC 236 registers the destination address of the iPL subframe header received on both the A and B copies. The addresses are used to access the valid iPL bit for the received address in the iPL RAM 433. The valid iPL bit determines if the datagram is addressed to the local OBC 126. A valid iPL database is maintained by OBC 126. Both addresses are applied to the iPL RAM 433 and the returned valid iPL bit for each access is sent to the discriminator logic of the output control 242*h*. The valid iPL bit is used by the RPC discriminator logic (see FIGS. 25A and 25B) to determine if the iPL datagram is to be loaded into egress iPL FIFO 432 and for A/B plane selection. The destination addresses of the iPL datagram header received on the A and B plane are compared and an RPC iPL plane error is registered for access by OBC 126 if the two addresses do not match. iPL datagrams are read from the data buffers 242*g* and written into egress iPL FIFO 432 under control of output control 242*h*. A start-of-packet (SOP) bit is transmitted with the data for delimiting iPL subframes.

Egress iPL FIFO 432 transports iPL subframes addressed to the local card to OBC 126. OBC 126 reads these iPL datagrams out of FIFO 432, terminates them, and reassembles the control message.

Figure 44:
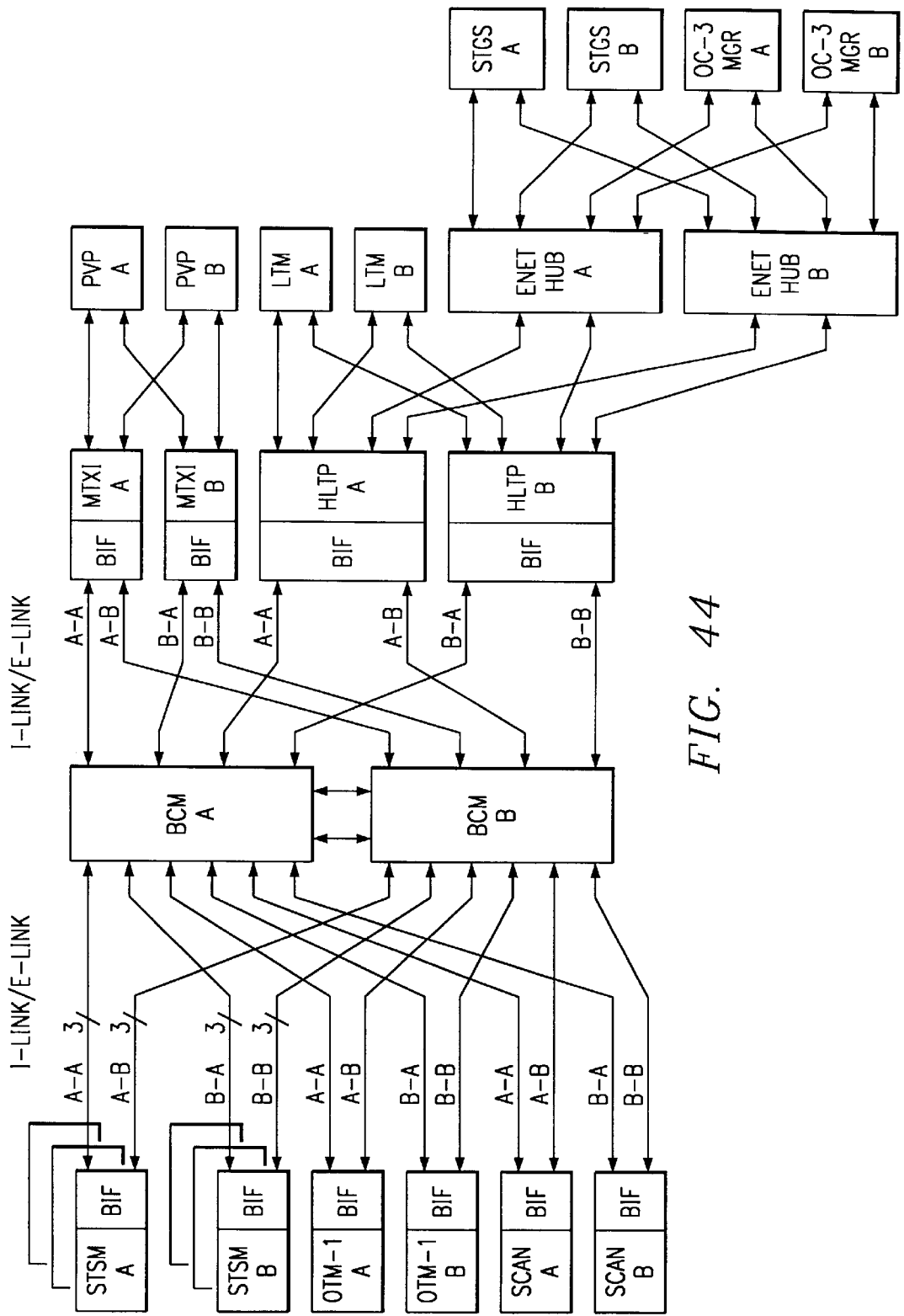
FIG. 44 illustrates redundancy within the delivery unit for control data transport.

FIG. 44 illustrates redundant interconnections within delivery unit 10 for control message transport. Because iPL subframes are carried on ingress and egress buses with STM subframes, iPL redundancy interconnections are generally the same as those described for STM subframes in the section entitled "Network Data Redundancy Control". However, there are several differences in the physical connections: 1) Network data is transported between OTM 102 and STSMs 103 in STS-1P frames, thus OTM 102 does not support STM datagram transport. However, OTM 102 is connected to ingress and egress buses for transporting iPL datagrams. 2) Unit controller 104 does not process DS0 channels and therefore is only connected to the ingress and egress buses for iPL datagram transport. 3) OBC 126 on BCM 101 communicates with application cards via iPL datagrams and therefore requires access to ingress and egress buses. Ingress and egress buses are cross connected between the A and B copies of BCM 101 to provide access to the redundant planes.

With regard to iPL datagram traffic, redundant copies of application cards 102–106 are not treated as pairs but either copy can independently initiate iPL datagrams. iPL datagrams generated by an application card are transmitted on both ingress buses in ingress subframes assigned by BCM's arbiter 273 (see FIG. 27). iPL Subframes created by either of a redundant pair of application cards are independently processed through BCM 101 for transport to the destination application cards. In normal operation, an iPL datagram arrives at a destination application card on the egress bus of both copies of BCM 101.

iPL subframes received at an application card on one of the redundant egress buses are selected for processing in a manner similar to that described for STM subframes. As for STM subframes, the A/B plane selection is made by RPC 236 (see FIG. 43). The A and B egress buses are processed independently through the front end of the RPC 236 and loaded into A and B header buffers 242*f* and A and B data buffers 242*g* (see FIG. 24).

The method of A/B selection of iPL subframes to be read from the A or B data buffers 242*g* for transport to the egress iPL FIFO 432 (see FIG. 43) differs from that used for STM subframes. The selection of iPL subframes is made on a global basis rather than on an individual egress subframe basis. Selection control is provided through a register in the output control 242*h* (see FIG. 24). The two bits that control the A/B selection are: 1) An iPL preference plane bit indicates the preferred (A or B) egress bus plane; 2) an iPL plane selection mode bit indicates the switch-over mode (automatic switch-over or preference controlled).

The CRC-8 code transported with each iPL subframe is monitored. A CRC-8 error flag is set when an error is detected. The state of the CRC-8 error flag is used in conjunction with the iPL preference plane bit and the iPL plane selection mode bit to determine the egress plane from which an iPL subframe is selected. The plane selection is controlled by the iPL preference plane when the iPL plane selection mode bit indicates that automatic switch-over is disabled. When automatic switch-over is enabled, a switch-over is automatically executed when a CRC-8 error is detected on the preferred plane and no error is detected on the standby plane. The iPL plane selection mode bit is not cleared when an automatic switch-over is executed. This means that plane selection may be switched back and forth between redundant copies under hardware control without action by OBC 126.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of transporting data in a delivery unit that interfaces telecommunications media that carries network data to a switching system that switches network data channels, comprising the steps of:

transporting network data between application modules of said delivery unit by means of ingress and egress buses, said ingress and egress buses between application modules carrying both control data and network data;

transporting control data between at least one application module and a unit controller of said delivery unit by means of ingress and egress buses, the ingress and egress buses to and from the unit controller carrying only control data;

originating a control message at a unit controller module of said delivery unit;

establishing a maintenance communications link between said unit controller module and at least one application module that is separate from any ingress and egress buses; and delivering said control message to said application module via said maintenance communications link.

2. The method of claim 1, wherein said at least one application module is a bus control module.

3. The method of claim 1, wherein said control message is a reset message and further comprising the step of resetting said application module in accordance with said reset message.

4. The method of claim 3, wherein said delivering step is performed by delivering said reset message to a microcontroller interface of said application module.

5. The method of claim 4, wherein said microcontroller interface decodes an address of said application module.

6. The method of claim 4, wherein said microcontroller interface decodes said control message.

7. The method of claim 1, wherein said establishing step is performed by means of a serial communications link.

8. The method of claim 7, wherein said communications link is RS-485 compatible.

9. The method of claim 1, wherein said establishing step is performed by means of a redundant communications link.

* * * * *